United States Patent
Hedayat et al.

(10) Patent No.: US 12,200,702 B2
(45) Date of Patent: Jan. 14, 2025

(54) ACCESS POINT METHODS AND APPARATUS RELATING TO SUPPORTING COEXISTENCE OF MULTIPLE RECEIVER/TRANSMITTERS IN A DEVICE SUPPORTING ONE OR MORE COMMUNICATIONS STANDARDS

(71) Applicant: Charter Communications Operating, LLC, St. Louis, MO (US)

(72) Inventors: Ahmad Reza Hedayat, Carlsbad, CA (US); Maulik Vaidya, Escondido, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 430 days.

(21) Appl. No.: 17/493,792

(22) Filed: Oct. 4, 2021

(65) Prior Publication Data
US 2023/0105675 A1  Apr. 6, 2023

(51) Int. Cl.
*H04W 72/20* (2023.01)
*H04W 72/51* (2023.01)
*H04W 72/541* (2023.01)

(52) U.S. Cl.
CPC .......... *H04W 72/20* (2023.01); *H04W 72/51* (2023.01); *H04W 72/541* (2023.01)

(58) Field of Classification Search
CPC .... H04W 72/20; H04W 72/51; H04W 72/541
See application file for complete search history.

(56) References Cited

U.S. PATENT DOCUMENTS

| | | | |
|---|---|---|---|
| 2013/0242833 | A1 | 9/2013 | Ahn et al. |
| 2013/0242860 | A1 | 9/2013 | Kim et al. |
| 2015/0230286 | A1 | 8/2015 | Feuersaenger et al. |
| 2016/0270037 | A1 | 9/2016 | Ji et al. |
| 2018/0310342 | A1 | 10/2018 | Patil et al. |
| 2020/0015219 | A1 | 1/2020 | Asterjadhi et al. |

(Continued)

OTHER PUBLICATIONS

Osama Aboul-Magd, IEEE 802.11ax—An Overview, Huawei Technologies, Canada, Jul. 8, 2019, pp. 1-30.

(Continued)

*Primary Examiner* — Kwang B Yao
*Assistant Examiner* — Bradley D Lytle, Jr.
(74) *Attorney, Agent, or Firm* — Straub & Straub; Michael P. Straub; Stephen T. Straub

(57) ABSTRACT

Methods and/or apparatus for reducing or avoiding (IDC) in-device coexistence problems in devices which support multiple communications protocols, e.g., WiFi and LTE, are described. In various embodiments a WiFi AP can request or require devices, e.g., STAs to report IDC information pertinent to the individual device. This is done by sending one or more trigger frames, e.g., as part of a multicast or unicast operation. Alternatively, devices can voluntarily report IDC information. The AP, e.g., WiFi AP, takes the IDC information it receives, e.g., from multiple devices, e.g., STAs, into account when scheduling UL resources to be used by the wireless devices. By taking into consideration the IDC information provided by STAs, IDC conflicts can be avoid even though a WiFi AP is scheduling resources for WiFi communication in devices which are also using resources for another communications standard, e.g., LTE, over which the AP does not have control.

20 Claims, 26 Drawing Sheets

(56) References Cited

U.S. PATENT DOCUMENTS

| | | | |
|---|---|---|---|
| 2020/0260462 A1* | 8/2020 | Elad | H04W 72/541 |
| 2021/0127405 A1 | 4/2021 | Ma et al. | |
| 2021/0243753 A1* | 8/2021 | Kim | H04W 72/0453 |
| 2022/0086906 A1 | 3/2022 | Xin et al. | |
| 2023/0091685 A1 | 3/2023 | Jiang | |

OTHER PUBLICATIONS

Alfred Asterjadhi, George Cherian, Abhishek Patil and Raja Banerjea, IEEE P802.11 Wireless LANs Comment resolutions for HT Control field (9.2.4.6.X and 10.1)—Block 3, IEEE 802.11-16/xxxxr0doc.: IEEE 802.11-16/xxxxr02, Feb. 22, 2017, pp. 1-15.

Alfred Asterjadhi, George Cherian, Abhishek Patil and Raja Banerjea, IEEE P802.11 Wireless LANs Misc for Trigger frame format, doc.: IEEE 802.11-16/xxxxr0doc.: IEEE 802.11-16/xxxxx02, Aug. 21, 2017, pp. 1-30.

* cited by examiner

TRIGGER TYPE SUBFIELD ENCODING

TRIGGER FRAME FORMAT

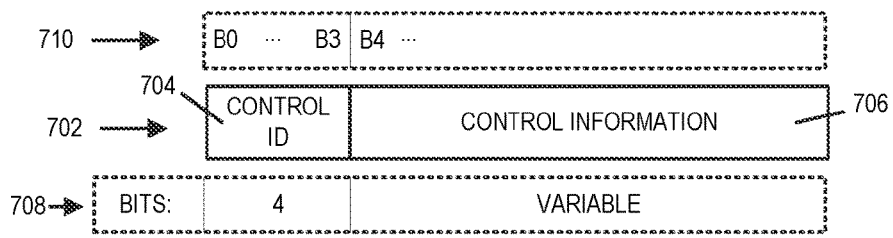

CONTROL SUBFIELD FORMAT

FIGURE 7

| CONTROL ID VALUE | MEANING | LENGTH OF CONTROL INFORMATION SUBFIELD (BITS) | CONTENT OF THE CONTROL INFORMATION SUBFIELD |
|---|---|---|---|
| 0 | TRIGGERED RESPONSE SCHEDULING (TRS) | 26 | TRS CONTROL |
| 1 | OPERATING MODE (OM) | 12 | OM CONTROL |
| 2 | HE LINK ADAPTATION (HLA) | 26 | HLA CONTROL |
| 3 | BUFFER STATUS REPORT (BSR) | 26 | BSR CONTROL |
| 4 | UPLINK POWER HEADROOM (UPH) | 8 | UPH CONTROL |
| 5 | BANDWIDTH QUERY REPORT (BQR) | 10 | BQR CONTROL |
| 6 | COMMAND AND STATUS (CAS) | 8 | CAS CONTROL |
| 7-14 | RESERVED | | |
| 15 | ONES NEED EXPANSION SURELY (ONES) | 26 | HT CONTROL FIELD OPERATION |
| CONTROL ID SUBFIELD VALUES TABLE | | | |

FIGURE 8

| TRIGGER TYPE SUBFIELD ENCODING ||
|---|---|
| TRIGGER TYPE SUBFIELD VALUE | TRIGGER FRAME VARIANT |
| 0 | BASIC |
| 1 | BEAMFORMING REPORT POLL (BFRP) |
| 2 | MU-BAR |
| 3 | MU-RTS |
| 4 | BUFFER STATUS REPORT POLL (BSRP) |
| 5 | GCR MU-BAR |
| 6 | BANDWIDTH QUERY REPORT POLL (BQRP) |
| 7 | NDP FEEDBACK REPORT POLL (NFRP) |
| 8 | IDC REPORT POLL (IDCRP) |
| 9-15 | RESERVED |

FIGURE 9

| Control ID Value (1002) | Meaning (1004) | Length of Control Information Subfield (Bits) (1006) | Content of the Control Information Subfield (1008) |
|---|---|---|---|
| 0 | TRIGGERED RESPONSE SCHEDULING (TRS) | 26 | TRS CONTROL |
| 1 | OPERATING MODE (OM) | 12 | OM CONTROL |
| 2 | HE LINK ADAPTATION (HLA) | 26 | HLA CONTROL |
| 3 | BUFFER STATUS REPORT (BSR) | 26 | BSR CONTROL |
| 4 | UPLINK POWER HEADROOM (UPH) | 8 | UPH CONTROL |
| 5 | BANDWIDTH QUERY REPORT (BQR) (WHICH TAKES INTO CONSIDERATION IDC) | 9 | BITMAP INDICATING 20MHz SUBCHANNELS AVAILABLE AT STA |
| 6 | COMMAND AND STATUS (CAS) | 8 | CAS CONTROL |
| 7 | RU OR RU(s) TO BE AVOIDED (IDENTIFIED RU IS RECOMMENDED NOT TO BE ASSIGNED TO STA FOR UL MU TX FOR THE FOLLOWING TRIGGER-BASED PPDU FRAME (OR DURING CURRENT TXOP)) | FIXED LENGTH TO IDENTIFY 1 RU OR VARIABLE LENGTH TO IDENTIFY ONE OR MORE RUs IN A LIST | IDENTIFIED RU OR A LIST OF IDENTIFIED RUs |
| 8 | RECOMMENDED RU OR RU(s) (IDENTIFIED RU (OR A SUBSET OF IT) IS RECOMMENDED TO BE ASSIGNED TO THE STA FOR UL MU TX FOR THE FOLLOWING TRIGGER-BASED PPDU FRAME (OR DURING THE CURRENT TXOP)) | FIXED LENGTH TO IDENTIFY 1 RU OR VARIABLE LENGTH TO IDENTIFY ONE OR MORE RUs IN A LIST | IDENTIFIED RU OR LIST OF IDENTIFIED RUs |
| 9 | RECOMMENDED SET OF 20MHz SUB-CHANNELS (THE BIT IN POSITION X IN THE BITMAP IS SET TO 1 TO INDICATE THAT SUB-CHANNEL X + 1 IS RECOMMENDED; OTHERWISE, IT IS SET TO 0 TO INDICATE THAT THE SUB-CHANNEL IS NOT RECOMMENDED DUE TO IDC CONCERNS) | 9 | BITMAP INDICATING WHICH 20MHzSUBCHANNELS ARE RECOMMENDED AND WHICH ARE NOT RECOMMENDED |
| 10 | RECOMMENDED UNLICENSED SPECTRUM | 2 OR 11 (11 = 2 + 9) | IDENTIFY ONE OF 2.4/5/6GHz / SUB-CHs |
| 11 | DURATION | | INDICATES RECOMMENDED DURATION |
| 12-14 | RESERVED | | |
| 15 | ONES NEED EXPANSION SURELY (ONES) | 26 | HT CONTROL FIELD OPERATION |

FIGURE 10

EXAMPLES OF: COMMUNICATING RECOMMENDED UNLICENSED SPECTRUM AND OPTIONALLY RECOMMENDED SUB-CHANNELS WITHIN THE RECOMMENDED SPECTRUM — 2302

2304 → | CONTROL ID | CONTROL INFORMATION |

2306 → | CONTROL ID VALUE = 10 | SPECTRUM ID (2 BITS) | 9 BIT SUB-CHANNEL BITMAP |

2308 →

| | | BIT 0 SUB-CH. 1 | BIT 1 SUB-CH. 2 | BIT 2 SUB-CH. 3 | BIT 3 SUB-CH. 4 | BIT 4 SUB-CH. 5 | BIT 5 SUB-CH. 6 | BIT 6 SUB-CH. 7 | BIT 7 SUB-CH. 9 | BIT 8 SUB-CH. 9 |

2310 →

2312 → | CONTROL ID VALUE = 10 | 0 | 0 |  RECOMMEND USE 2.4 GHz UNLICENSED SPECTRUM

2314 → | CONTROL ID VALUE = 10 | 0 | 1 |  RECOMMEND USE 5 GHz UNLICENSED SPECTRUM

2316 → | CONTROL ID VALUE = 10 | 1 | 0 |  RECOMMEND USE 6 GHz UNLICENSED SPECTRUM

2318 → | CONTROL ID VALUE = 10 | 1 | 0 | 0 | 0 | 0 | 1 | 1 | 1 | 1 | 0 | 1 |  RECOMMEND USE SUB-CHANNELS {4, 5, 6, 7, 9} OF 6 GHz UNLICENSED SPECTRUM

FIGURE 23

ACCESS POINT METHODS AND APPARATUS RELATING TO SUPPORTING COEXISTENCE OF MULTIPLE RECEIVER/TRANSMITTERS IN A DEVICE SUPPORTING ONE OR MORE COMMUNICATIONS STANDARDS

FIELD

The present application relates to methods and apparatus for supporting in-device coexistence (IDC) of multiple receivers and/or transmitters, e.g., in a device supporting multiple communications standards.

BACKGROUND

In some prior art systems, WiFi transmitters, e.g., 802.11 transmitters, of a device may refrain from transmission when the cellular, e.g., LTE, receiver of the device performs specific downlink processing, e.g. during Physical Downlink Control Channel/Physical Downlink Shared Channel (PDCCH/PDSCH) processing. This avoids leakage of the WiFi transmitted signal to the LTE/NR receiver of the device. Such an approach to avoiding leakage between different elements of a device supporting WiFi and LTE is possible in cases where the WiFi operation in the existing device is entirely decided by the WiFi transmitter, e.g., after the WiFi receiver performs CSMA/CA and wins the contention. In such known WiFi systems the transmission of the WiFi device is not scheduled by the WiFi access point (AP). By temporarily refraining from transmission, the WiFi device does not cause any change or alter any procedure at the AP receiver but similarly refrains at its discretion from transmitting using WiFi at particular points in time to avoid causing interference with LTE communication also being supported by the device.

IEEE 802.11ax and 802.11be are WiFi standards that will be introducing uplink (UL) OFDMA and Multi-user, multiple-input, multiple-output (UL MU-MIMO) technology. This technology will allow a Wi-Fi access point to communicate with multiple devices simultaneously. It is proposed that in such systems an AP will schedule uplink transmission from multiple WiFi non-AP stations (STA), each for a given portion of the unlicensed channel and for a prescribed duration.

By moving uplink transmission timing and resource decisions from the transmitting STA device to the AP which is interacting with multiple WiFi devices (e.g., STAs), the above approach of allowing the WiFi device to make uplink decisions is not possible since the UL resource allocation decision point has been moved to the WiFi AP. Unfortunately, in existing systems the AP lacks detailed information about potential IDC conflicts since it does not have access to information about a WiFi device's use or planned use of LTE or other wireless technologies. The possibility of a WiFi AP assigning a device uplink resources, e.g., time and/or frequency resources, which will cause IDC problems or which will need to be left unused can lead to inefficient and wasteful allocation of uplink resources particularly in UL OFDMA and/or UL MU-MIMO WiFi modes of operation. This can reduce system and resource use efficiency.

In view of the above it should be appreciated that there is a need for methods and/or apparatus which can facilitate the efficient assignment of uplink resources when UL OFDMA and/or UL MU-MIMO WiFi modes, e . . . , 802.11ax/be UL OFDMA and/or UL MU-MIMO of operation, are to be supported. In particular, it would be desirable if methods and/or apparatus could be developed which could be used to provided APs useful IDC information and/or which would allow uplink resources to be allocated in a manner that reduces or avoids IDC interference problems in devices which support WiFi in addition to one or more other communications standards, e.g., LTE standards.

SUMMARY

Methods and/or apparatus for reducing or avoiding (IDC) in-device coexistence (IDC) problems in devices which support multiple communications protocols are described. The methods are well suited for use with devices that support WiFi, e.g., 802.11ax and/or 802.11be, in addition to another communications standard, e.g., an LTE standard. The methods and/or apparatus are particularly well suited for UL OFDMA and/or UL MU-MIMO WiFi modes of operation in which a WiFi Access Point (AP) is responsible for allocating uplink resources to one or more devices, e.g., stations (STAs), which support one or more other communications technologies or standards, e.g., LTE, which may suffer conflicts depending on what resources a device (STA) uses for uplink transmissions.

In various embodiments a WiFi AP can request or require devices, e.g., STAs to report IDC interference information pertinent to the individual device. This can be done by sending one or more trigger frames, e.g., as part of a multicast or unicast operation, to one or a set of devices. Alternatively, the devices can voluntarily report IDC information to the WiFi AP. The AP, e.g., WiFi AP, in various embodiments receives IDC information from one or more devices and then takes the received IDC information into account when scheduling UL resources to be used by the wireless devices, e.g., STAs. By taking into consideration the IDC information provided by STAs, UL IDC conflicts can be avoided since the AP is provided information about which resources may/will cause IDC problems for particular reporting devices. Thus, the AP can avoid IDC conflicts even though the AP does not have control over resource utilization by the non-WiFi transmitter and/or receiver in a device.

Various features are directed to a novel trigger frame which requests, e.g., instructs, STAs to provide, an IDC report providing IDC conflict information.

IDC information can be, and sometimes is, reported in a variety of formats. For example, wireless devices can report preferred resource units (RUs), preferred channels (which may and sometimes does include 20 MHz subchannels) and/or frequencies they would like to be assigned for UL communication since such resources avoid and/or minimize IDC problems that might otherwise be encountered if the reporting device is assigned other resources, e.g., UL resources to be used to communicate with the AP. Similarly, a device may report resources to be avoided for IDC conflict reasons, e.g., RUs, frequencies and/or channels which the device does not want to be assigned and/or should be avoided, because of IDC concerns.

In some but not necessarily all embodiments when an AP does not receive IDC information from a device that was sent a trigger frame which is sent to trigger the sending of IDC information, the AP interprets the lack of an IDC report or IDC information corresponding to the device as an indication that the device does not have any IDC conflicts that should be taken into consideration when the AP schedules the allocation of resources, e.g., UL resources, to the devices or devices from which IDC information was not received.

Based on received IDC information the AP, in some embodiments, assigns UL resources to one or more wireless devices, e.g., STAs, taking into consideration the requested/preferred resources (if any) indicated by particular wireless devices as well as resources (if any) which wireless devices requested were to be avoided. In this way individual wireless devices can be, and sometimes are, assigned resources they requested or indicated to be preferred for IDC reasons while avoiding resources which they indicated were not desired or which were to be avoided for IDC reasons. Since in most cases different devices will report different IDC resource preferences or resources to be avoided the AP can allocate resources in an efficient manner with the individual devices being allocated WiFi uplink resources that avoid or minimize IDC conflicts. This is particularly beneficial in embodiments where UL OFDMA and/or UL MU-MIMO is being supported since in at least some such cases resources are allocated to multiple devices.

Various features and embodiments relate to operation of wireless devices, e.g., STAs, which include multiple transceivers, e.g., corresponding to different communications standards, e.g., WiFi and LTE standards. Other features relate to access point operation, e.g., operation of a WiFi AP which is responsible for allocating uplink communications resources to devices which also support another communications standard, e.g., LTE.

An exemplary method of operating a first wireless device including a cellular transceiver and a WiFi transceiver, in accordance with some embodiments, comprises: detecting an actual or potential in-device coexistence (IDC) problem in said first wireless device; performing one or more of: i) identifying resource units (RUs) which are preferred for IDC reasons; ii) identifying channels (e.g., 20 MHZ sub-channels) which are preferred for IDC reasons; iii) identifying resource units (RUs) to be avoided for IDC reasons, iv) identifying channels (e.g., 20 MHZ sub-channels) to be avoided for IDC reasons; and communicating IDC information to an access point.

A method of operating an access point, in accordance with some embodiments, comprise: transmitting a trigger frame to a first wireless device to trigger transmission of in-device coexistence (IDC) information to the access point; receiving from the first wireless device, first wireless device IDC information identifying one or more of: i) resource units (RUs) which are preferred by the first wireless device for IDC reasons; ii) channels (e.g., 20 MHz sub-channels) which are preferred by the first wireless device for IDC reasons; iii) resource units (RUs) to be avoided by the first wireless device for IDC reasons, iv) channels (e.g., 20 MHz sub-channels) to be avoided by the first wireless device for IDC reasons; and allocating uplink channel resources to one or more wireless devices based on received IDC information, said one or more wireless devices including said first wireless device, said received IDC information including said first wireless device in-device coexistence (IDC) information.

Not all features described in the summary are included in all embodiments. Numerous variations and features are possible with some of the various additional contemplated features and embodiments being described in the detailed description included below.

BRIEF DESCRIPTION OF THE FIGURES

FIG. 7 is a drawing illustrating control subfield format, which includes a control ID subfield and a control information subfield.

FIG. 8 is a table illustrating control ID subfield values, a meaning of each control ID subfield value, a length of the control information subfield, and information identifying the content of the control information subfield.

FIG. 9 is a table which illustrates exemplary trigger type subfield encoding, which includes a novel in-device coexistence (IDC) report poll (IDCRP) trigger frame variant, in accordance with an exemplary embodiment.

FIG. 10 is a table illustrating exemplary control ID subfield values, a meaning of each control ID subfield value, a length of the control information subfield, and information identifying the content of the control information subfield in accordance with an exemplary embodiment; and the table includes control ID subfield values used to communicate IDC information including: i) information identifying resource unit(s) to be avoided, ii) information identifying recommended resource unit(s), and iii) information indicating a recommended set of 20 MHz sub-channels.

FIG. 23 is a drawing illustrating various examples of communicating control subfields communicating in-device coexistence (IDC) information indicating recommended unlicensed spectrum, optionally indicating recommended sub-channels within the recommended unlicensed spectrum, in accordance with various exemplary embodiments.

DETAILED DESCRIPTION

Figure 1:
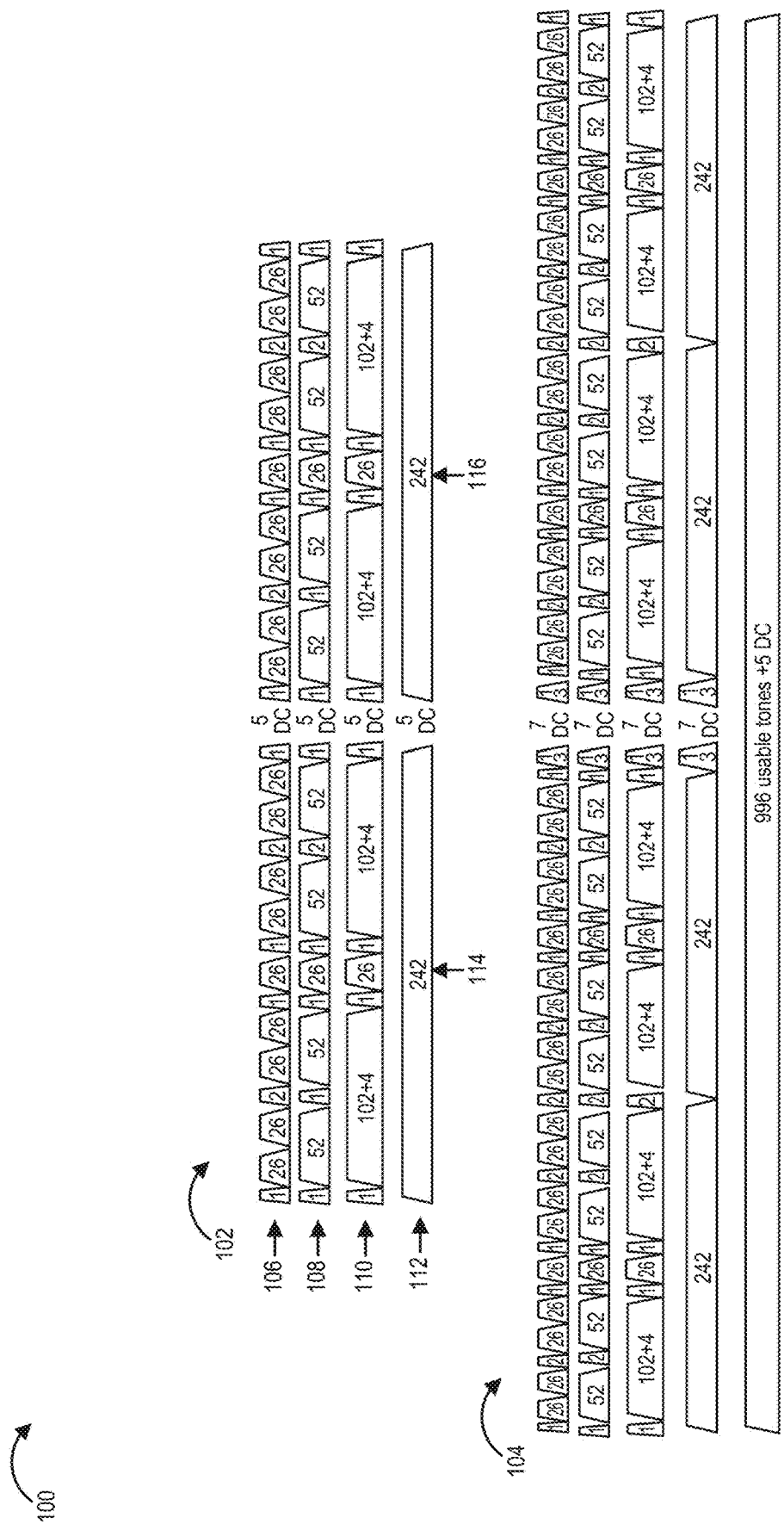
FIG. 1 includes a drawing which illustrates resource unit (RU) partitions for a 40 MHZ bandwidth and resource unit (RU) partitions for a 80 MHz bandwidth, in IEEE 802.11ax and IEEE 802.11be standard specifications.

IEEE 802.11 (WiFi) technologies and 3GPP Long Term Evolution (LTE) Licensed-Assisted Access (LAA) and New Radio-Unlicensed (NR-U) operate in unlicensed spectrum of 5 GHz and 6 GHz.

A device, e.g. a smartphone, is very likely to have both WiFi and LAA/NR-U technologies, and it could happen that both technologies use the same/overlapping unlicensed channel(s).

The received signal of either of above technologies, e.g. WiFi, is several orders of magnitude smaller than the transmitted signal of the other technology, e.g. NR-U. Even considering antenna isolation between the two technologies, the leakage of the NR-U transmitted signal appears in the path of the WiFi received signal. With the leaked signal being orders of magnitude stronger than the WiFi received signal, it would be very difficult for the receiver to process and decode the received signal.

Similarly, the leakage from the WiFi transmitter of the device could appear as a stronger interference in the received path of the NR-U receiver of the device when it is processing Physical Downlink Control Channel (PDCCH) or Physical Downlink Shared Channel (PDSCH).

To ensure that transmission of one technology does not affect the reception of another technology, the device incorporates in-device coexistence (IDC) mechanisms.

In some prior arts, the WiFi transmitter of a device may refrain from transmission when the cellular receiver of the device performs specific downlink processing, e.g., during PDCCH/PDSCH processing. This avoids any leakage of the WiFi transmitted signal at the LTE/NR receiver. This is possible thanks to WiFi operation principle where the transmission of the device is entirely decided by the WiFi transmitter (after the WiFi receiver performs Carrier-Sense Multiple Access with Collision Avoidance (CSMA/CA) and wins the contention). The transmission of the WiFi device is not scheduled by the WiFi access Point (AP). By temporarily refraining from transmission, the device does not cause any change or alter any procedure at the AP receiver.

IEEE 802.11 ax and 802.11be introduced UL OFDMA and UL MU-MIMO (collectively referred to a UL-MU), where an AP schedules uplink transmission from multiple WiFi non-AP stations (STAs), each for a given portion of the unlicensed channel for a prescribed duration.

The above-mentioned prior-art solution does not work for 802.11ax/be UL MU operation, hence new IDC methods are required for the situations where the device is engaged in OFDMA/MU-MIMO transmission. Thus, there is a need for new methods and apparatus to address IDC when an 802.11ax/be device is engaged in UL MU transmission or reception.

IEEE 802.11ax has single-user Orthogonal Frequency Division Multiplexing (OFDM) signaling and it has multi-user Orthogonal Frequency Division Multiple Access (OFDMA) signaling (both for uplink (UL) and downlink (DL)).

In OFDMA signaling, the bandwidth is partitioned to include multiple resource units. The RU naming indicates the number of tones per RU: RU26, RU52, RU106, RU242. RU26 indicates a RU of 26 tones, RU52 indicates a RU of 52 tones, RU 106 indicates a RU of 242 tones and RU 242 indicates a RU of 242 tones.

FIG. 1 includes a drawing 100 which includes a drawing 102 which illustrates resource unit (RU) partitions for a 40 MHZ bandwidth and a drawing 104 which illustrates resource unit (RU) partition for a 80 MHz bandwidth, in IEEE 802.11ax and IEEE 802.11be standard specifications. Drawing 102 of FIG. 1 shows four exemplary RU partitions for a 40 MHz bandwidth. Drawing 104 of FIG. 1 shows four exemplary RU partitions for a 80 MHz bandwidth. Similar type of partitioning is used for 20 MHz bandwidth and 160 MHz bandwidth. The number of RUs in a BW varies.

For the BW=40 MHz example of drawing 102 there are 18 RU26s (as indicated in row 106) which are indexed in a pre-known order. Alternatively, the 40 MHz bandwidth may be indexed with 8 RU52s and two RU26S (as indicated in row 108) or with 4 RU106s and two RU26s (as indicated in row 110), or with two RU242s (as indicated in row 112). Note that RU242 (114, 116) equivalently identifies a 20 MHz sub-channel.

Figure 2:
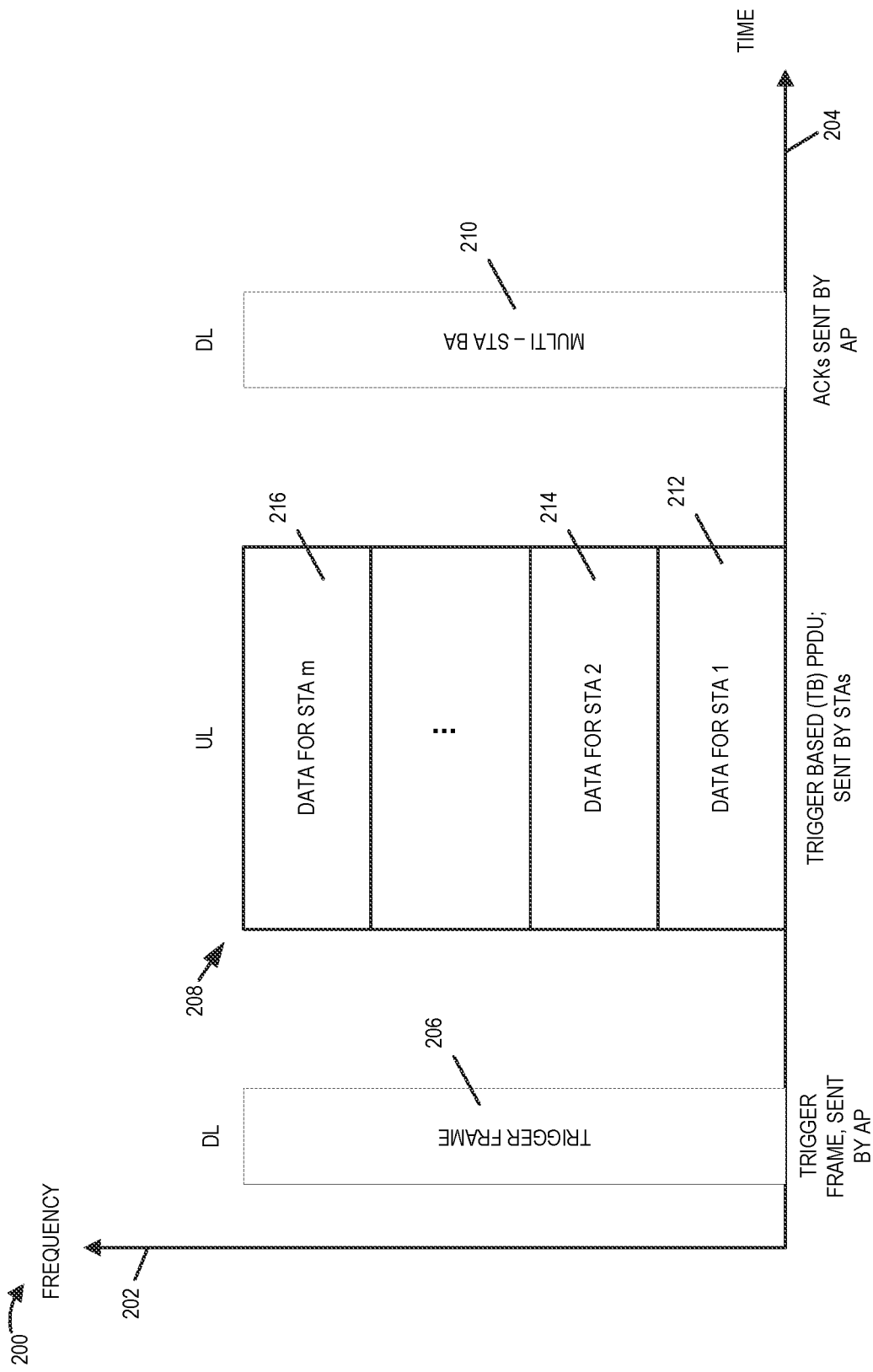
FIG. 2 is a drawing which illustrates an exemplary downlink trigger frame sent by an access point, exemplary trigger based physical layer protocol data units (PPDUs) sent by stations (STAs) to the AP, and exemplary acknowledgment signals sent by the AP to the STAs.

In 802.11ax, multi-user UL transmission is enabled by exchanging of Trigger frame (from an access point (AP)) and transmission by identified/responding stations (STAs). This is shown in drawing 200 of FIG. 2. Drawing 200 of FIG. 2 includes a vertical axis 202 representing frequency, and a horizontal axis 204 representing time. Trigger frame 206 is sent (transmitted) by the AP in the downlink. Trigger based (TB) Physical layer Protocol Data Units (PPDUs) 208 are send by STAs in the uplink including data for one or more STAs (data for STA 1 212, data for STA 2 214, . . . , data for STA m 216). Acknowledgements (ACKs) 210 are sent by the AP in the downlink.

Figure 3:
FIG. 3 is a table which illustrates trigger type subfield encoding.

FIG. 3 is a table 300 showing a few identified varieties of trigger frames and the Trigger Type subfield encoding corresponding to each type of trigger frame. First column 302 of table 300 lists trigger type subfield value and second column 304 of table 300 lists trigger frame variant. A Trigger Type subfield value of 0 indicates Basic. A Trigger Type subfield value of 1 indicates Beamforming Report Poll (BFRP). A Trigger Type subfield value of 2 indicates MU-BAR. A Trigger Type subfield value of 3 indicates MU-RTS. A Trigger Type subfield value of 4 indicates Buffer Status Report Poll (BSRP). A Trigger Type subfield value of 5 indicates GCR MU-BAR. A Trigger Type subfield value of 6 indicates Bandwidth Query Report Poll (BQRP). A Trigger Type subfield value of 7 indicates NDP Feedback Report Poll (NFRP). Trigger Type Subfield values of 8-15 are reserved.

Figure 4:
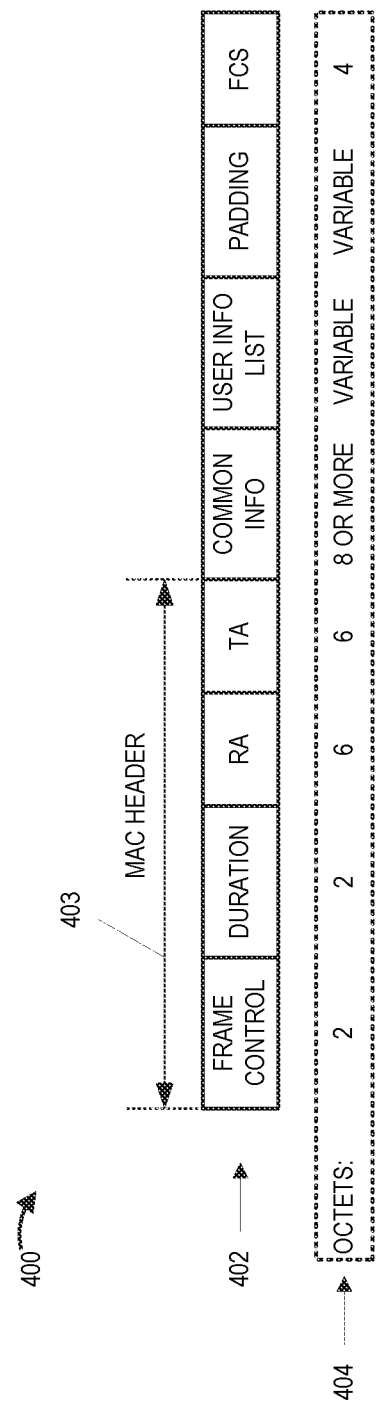
FIG. 4 is a drawing which illustrates trigger frame format.

FIG. 4 is a drawing 400 illustrates fields in a Trigger frame format message 402 and the corresponding number of bits 404 for each field. The Trigger frame format message 402 includes a MAC header 403, which includes a frame control field of 2 octets of bits, a duration field of 2 octets of bits, a RA field of 6 octets of bits, and a TA field of 6 octets of bits. The trigger frame format message 402 further includes a Common Info field of 8 or more octets of bits, a User Info field of variable length, a padding field of variable length and a FCS field of 4 octets of bits.

Figure 5:
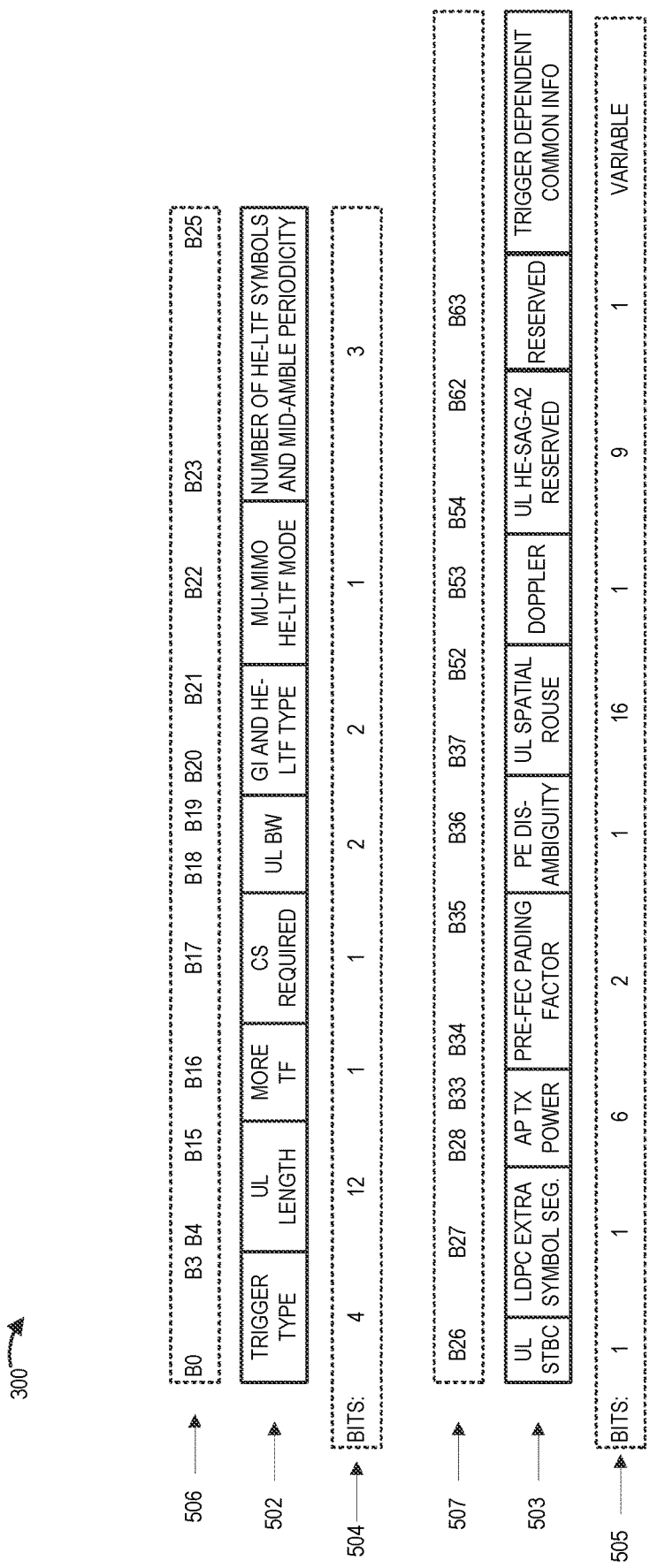
FIG. 5 is a drawing which illustrates common information field format, which is part of trigger frame format.

FIG. 5 is a drawing 500 which illustrates fields within Common Field 502 of the Trigger frame format message 402, the corresponding number of bits 404 for each field within the Common Field 502, and the corresponding bit designations 506 for each field within the Common field. The Common field 502 includes a trigger type field of 4 bits (B0 . . . B3), a UL field of 12 bits (B4 . . . B15), a MORE TF field of 1 bit (B16), a CS Required field of 1 bit (B17), an UL BW field of 2 bits (B18, B19), a GI and HE-LTF type field of 2 bits (B20, B21), a MU-MIMO HE-LTF mode field of 1 bit (B22) and a number of He-LTF symbols and mid-amble periodicity field of 3 bits (B23 . . . B25), an UL STBC field of 1 bit (B26), a LPDC extra symbol SEG. field of 1 bit (B27), and AP TX power field of 6 bits (B28 . . . B 33), a pre-FEC padding factor field of 2 bits (B34 . . . B35), a PE Dis-ambiguity field of 1 bit (B36), and UL spatial Rouse field of 16 bits (B37 . . . B52), a Doppler field of 1 bit (B53), an UL He-SAG-A2 field of nine bits (B54 . . . B63), a Reserved field of 1 bit (B63) and a trigger dependent common info field of variable length.

Figure 6:
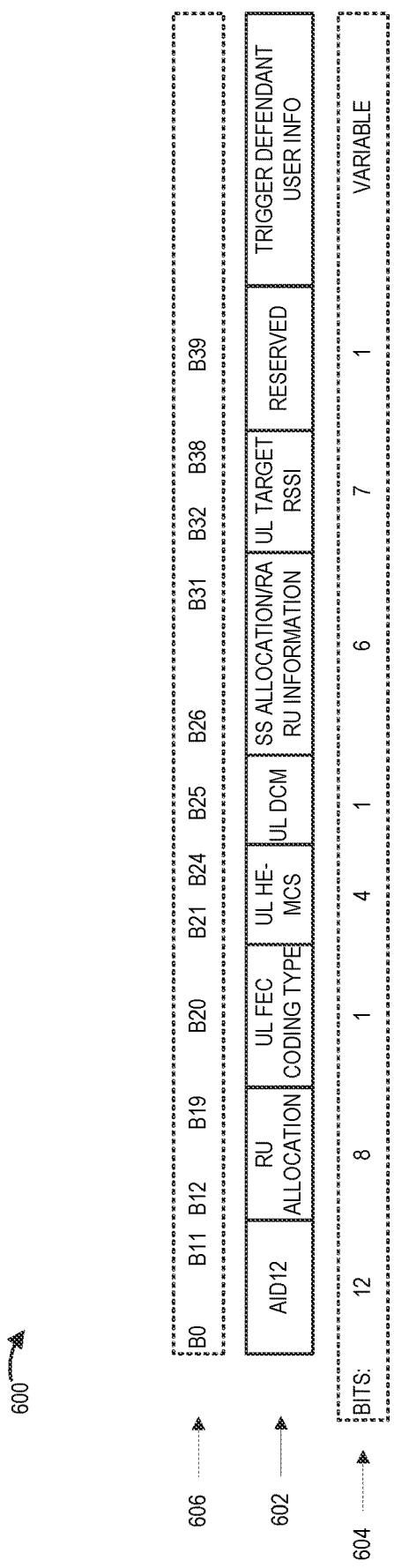
FIG. 6 is a drawing illustrating user info field format, which is part of trigger frame format.

FIG. 6 is a drawing 600 which illustrates fields within User Info Field 602 of the Trigger frame format message 402, the corresponding number of bits 604 for each field within the User Info Field 602, and the corresponding bit designations 606 for each field within the User Info field. The User Info field 602 includes an AID12 field of 12 bits (B0 . . . B11), a RU Allocation field of 8 bits (B12 . . . B19), an UL FEC Coding Type field of 1 bit (B20), an UL HE-MCS field of 4 bits (B21 . . . B24), an UL DCM field of 1 bit (B25), a SS Allocation/RA RU information field of 6 bits (B26 . . . B31), an UL target RSSI field of 7 bits (B32 . . . B38), a Reserved field of 1 bit (B39) and a Trigger Defendant User Info field of variable length.

Within the trigger frame format, the "Common info" is applicable to the whole upcoming trigger-based (TB) frame. For the individual resource portions assigned to a STA, the separate field "USER Info List" is used.

In IEEE 802.11ax/be, the control signaling within MAC header was extended to have a variable structure. A 4-bit Control ID subfield specifies the type of control information being carried. Drawing 700 of FIG. 7 illustrated Control subfield format. The control subfield 702 includes a Control ID portion 704 and a Control information portion 706. Row 708 lists bit definitions and Row 710 lists the number of bits in each control subfield portion. The control ID portion 704 includes 4 bits designated B0, B1, B2 and B3. The control Information portion 706 includes a variable number of bits starting with designated bit B4.

FIG. 8 is a table 8 00 which lists several types of control information that can be exchanged between an access point (AP) and a non-AP station (STA). Column 802 of table 8 00 includes control ID values. Column 804 includes information identifying the meanings corresponding each of the control ID values. Column 806 includes information specifying the length of the control information subfield bits corresponding to each of the control ID values. Column 808 includes information identifying the content of the control information subfield.

Control ID value=0 corresponds to Triggered response scheduling (TRS). Control ID value=0 corresponds to a control information subfield of 26 bits, and the content of the control information subfield is TRS Control information.

Control ID value=1 corresponds to Operating mode (OM). Control ID value=1 corresponds to a control information subfield of 12 bits, and the content of the control information subfield is OM Control information.

Control ID value=2 corresponds to HE link adaptation (HLA). Control ID value=2 corresponds to a control information subfield of 26 bits, and the content of the control information subfield is LHA Control information.

Control ID value=3 corresponds to Buffer status report (BSR). Control ID value=3 corresponds to a control information subfield of 26 bits, and the content of the control information subfield is BSR Control information.

Control ID value=4 corresponds to UL power headroom (UPH). Control ID value=4 corresponds to a control information subfield of 8 bits, and the content of the control information subfield is UPH Control information.

Control ID value=5 corresponds to Bandwidth query report (BQR). Control ID value=5 corresponds to a control information subfield of 10 bits, and the content of the control information subfield is BQR Control information.

Control ID value=6 corresponds to Command and status (CAS). Control ID value=6 corresponds to a control information subfield of 8 bits, and the content of the control information subfield is CAS Control information.

Control ID values 7-14 are Reserved.

Control ID value=15 corresponds to Ones need expansion surely (ONES). Control ID value=15 corresponds to a control information subfield of 26 bits, and the content of the control information subfield is HT Control field operation Control information.

The Control Information subfield in a BQR Control subfield contains a bandwidth query report (BQR) used for bandwidth query report operation to assist 802.11ax/be MU transmission. The formation of the subfield consists of 8-bit "Available Channel Bit-map" and 2 reserved bits.

The Available Channel Bitmap subfield contains a bitmap indicating the subchannels available at the STA transmitting the BQR. Each bit in the bitmap corresponds to a 20 MHz subchannel within the operating channel, with the least significant bit (LSB) corresponding to the lowest numbered operating subchannel. The bit in position X in the bitmap is set to 1 to indicate that the sub-channel X+1 is idle; otherwise, it is set to 0 to indicate that the subchannel is busy or unavailable. Availability of each 20 MHz subchannel is based on the Energy Detect (ED)—based Clear Channel Assessment (CCA) and is reported for the 20 MHz subchannels location in the operating channel of the reporting STA when the channel is idle.

The next-generation of 802.11/WiFi technology, 802.11be, is under development. The main candidate features that have been discussed are: larger bandwidth (e.g., 320 MHz) and more efficient utilization of non-contiguous section, multi-band/multi-channel aggregation and operation, 16 spatial streams and Multiple Input Multiple Output (MIMO) protocols and enhancements, Multi-Access Point (AP) Coordination (e.g., coordinated and joint transmission), enhanced link adaptation and retransmission protocol (e.g., Hybrid Automatic Repeat Request (HARQ)), and if needed, adaptation to regulatory rules specific to 6 GHz spectrum.

One of the features that has been agreed to for 802.11be is the support for multi-link devices (MLDs). An example of MLD operation is concurrent transmission and reception by a multiband access point (AP) or non-AP device on lines spanning the 2.4 GHz, 5 GHz, and 6 GHz frequency bands. Downlink (DL) and Uplink (UL) frames can be transmitted and received simultaneously over the links. Each of the STAs belonging to a MLD performs independent channel access over their links to transmit frames. An example with two MLD devices and three links spanning 2.4 GHZ, 5 GHz and 6 GHz unlicensed bands is shown below. The benefits of MLD include improved traffic load balancing across frequency band, concurrent transmission and reception for peak throughput, and reduced MAC overhead due to one-step multi-link negotiation and setup.

A first exemplary embodiment will now be described. The 3GPP New Radio-Unlicensed (NR-U) unit and the WiFi (802.11ax/be) unit happen to operate at the same, overlapping or adjacent unlicensed channel(s). The 802.11ax/be unit may operate with 20/40/80/160 MHz bandwidth (802.11be unit may also operate with 320 MNz bandwidth in 6 GHz). The NR-U unit may operate with 20/40/80 MHz bandwidth.

The associated AP sends a Trigger that address the 802.11ax/be unit. The 3GPP unit happens to be (during Discontinuous Reception (DRX) on duration and) processing NR-U or (LAA) downlink signals and channels, e.g., Physical Downlink Control Channel (PDCCH), Physical Shared Downlink Channel (PSDCH) or other vital DL signals.

In order to minimize the leakage from the 802.11ax/be transmitter to the 3GPP NR-U/LAA receiver, the 802.11ax/be unit responds to the Trigger frame with a suggested subset of the unlicensed channel to be used by the AP for subsequent scheduling of the UL MU transmission. Various way for specifying the subset are possible and will be described below.

If no subset of the unlicensed channel can be chosen, the 802.11ax/be unit may refrain from responding to the Trigger frame despite the unlicensed channel being cleared (e.g., from Listen before talk/clear channel assessment (LBT/CCA) perspective).

An 802.11ax/be device may respond with one of the following control subfield in response to a Trigger frame with trigger type BQRP or trigger type BSRP. The 802.11ax/be device may add the following new/modified control subfield in addition to the control subfields specified by the 802.11ax specification.

Alternatively, a new trigger type may be defined as follows and used:

Trigger type=IDC report poll (IDCRP),

Trigger type subfield value=TBD0 (e.g., where TBD0 is a value from 8-15).

FIG. 9 is a table 900 showing a identified varieties of trigger frames and the Trigger Type subfield encoding corresponding to each type of trigger frame for one exemplary embodiment. First column 902 of table 900 lists trigger type subfield value and second column 904 of table 900 lists trigger frame variant. Table 900 of FIG. 9 is similar to table 300 of FIG. 3; however, new trigger type, IDC report poll (IDCRP) has been added, with corresponding Trigger Type subfield value=8. The remaining values 9-15 are still reserved. Row 906 identifies the Buffer Status Report Poll (BSRP) Trigger Frame type variant with corresponding Trigger Type subfield value=4. Row 908 identifies the Bandwidth Query Report Poll (BQRP) Trigger Frame type variant with corresponding Trigger Type subfield value=4. Row 910 identifies the IDC report poll (IDCRP) Trigger Frame Type variant, with corresponding Trigger Type subfield value=8.

An AP sends a Trigger frame, e.g. with variant BQRP, with variant BSRP, or with variant IDCRP, to evaluate if the responding STAs have to perform IDC. A responding non-AP STA responds with one of the following control subfields.

A new control subfield in some embodiments, is used to identify a RU to be avoided.

Control ID value=TBD1 (e.g., a value from 7-14).

Meaning: The identified RU is recommended no to be assigned to the 802.11ax/be STA for UL MU transmission for the following trigger-based Physical Protocol Data Unit (PPDU) frame (or during current transmission opportunity (TXOP).

A new control subfield, in some embodiments, is used to identify a recommended to be assigned to the 802.11ax/be STA for UL MU transmission for the following trigger-based PPDU frame (or during the current TXOP).

Several of the above control subfields, in some embodiments, are used to provide a list of RUs. Alternately, the control subfield, in some embodiments, are revised to include several RUs.

In some embodiments, a duration subfield is added to the above described control subfields to indicate a recommended duration. The recommended duration is, e.g., in units of 1 ms, 5 ms, 10 ms, etc.

In some embodiments, a new control subfield is used to identify a recommended set of 20 MHz sub-channels.

Control ID value=TDB3 (e.g., a value from 7-14)

Length=9 bits. Each bit corresponds to a 20 MHz channel (from potentially a max 320 MHz channel) with the least significant bit (LSB) corresponding to the lowest numbered operating subchannel.

Meaning: The bit in position X in the bitmap is set to 1 to indicate that the sub-channel X+1 is recommended; otherwise, it is set to 0 to indicated that the subchannel is not recommended due to IDC concerns.

A duration subfield, in some embodiments, is added to indicate a recommended duration, e.g. in units of 1 ms, 5 ms, 10 msec, etc.

In some embodiments, the existing bandwidth query report (BQR) is revised as follows:

Control ID value=5

Length=9 bits

The Available Channel Bitmap subfield contains a bitmap indicating the subchannels available at the STA transmitting the BQR. Each bit in the bitmap corresponds to a 20 MHz subchannel within the operating channel, with the Least Significant Bit (LSB) corresponding to the lowest numbered operating subchannel. The bit in position X in the bitmap is set to 1 to indicate that the subchannel X+1 is idle and the channel does not cause any IDC issue; otherwise, it is set to 0 to indicate that the subchannel is busy or unavailable or the device has IDC issues to use the subchannel. Availability of each 20 MHz subchannel is based on the Energy Detect (ED)—based Clear Channel Assessment (CCA) and is reported for the 20 MHz subchannels located in the operating channel of the reporting STA when the channel is idle. The determination for in-device coexistence is implementation-based.

It may be possible that an 802.11be multi-link device (MLD) STA experiencing situations described in this invention. The solutions previously described are also available for such MLD STD. Additionally, an MLD STA can indicate RUs or 20 MHz sub-channels of other bands to the AP for a better IDC experience.

For instance, consider that a MLD STA has active association with a MLD AP on 2.4 GHz, 5 GHz and 6 GHz spectrum. If the STA is experiencing in device leakage (or wants to avoid in-device leakage) from/to NR-U (e.g., in 5 GHz), the MLD STA may suggest RUs in the corresponding 2.4 GHz or 6 GHz channel that the MLD STA is associated with the MLD AP. In fact, it may happen that there is no suitable RUs or 20 MHz sub-channel in the 5 GHz channel and the STA recommends to the AP to allocate RUs for MU UL using the recommended RUS or recommended sub-channel(s) (for a prescribed duration).

A new control subfield may be, and in some embodiments is, used to identify a recommended unlicensed spectrum (and potentially a set of 20 MHz sub-channels).

Control ID value=TBD4 (e.g., a value from 7-14). In one exemplary embodiment the control ID value=10.

Length=max 11 bits.

The first two bits identify one of 2.4/5/6 GHz unlicensed spectrum (e.g., 00=2.4 GHz, 01=5 GHz, 10=6 GHz). The STA may, and sometimes does, simply recommend an alternative unlicensed spectrum (and avoids recommending RUs or 20 MHz sub-channels). If so, this control subfield would only have length 2.

Note that if 2.4 GHzm the STA and the AP are associated with one of three 2.4 GHz channels (CH1, CH 6 and CH 11). Hence no additional clarification for a recommended 20 MHz sub-channel is needed.

However, if 5 GHz or 6 GHz, additional 9 bits may be, and sometimes are, provided where each bit corresponds to a 20 MHz channel (from potentially a max 320 MHz channel) with the LSB corresponding to the lowest numbered operating subchannel.

Meaning: The bit in position X in the bitmap is set to 1 to indicate that the sub-channel X+1 is recommended; otherwise, it is set to 0 to indicate that the subchannel is not recommended due to IDC concerns.

FIG. 10 is a table 1000 which lists several types of control information that can be exchanged between an access point (AP) and a non-AP station (STA) in accordance with an exemplary embodiment, e.g., sent from a STA to an AP. Column 1002 of table 1000 includes control ID values. Column 1004 includes information identifying the meanings corresponding each of the control ID values. Column 1006 includes information specifying the length of the control information subfield bits corresponding to each of the control ID values. Column 1008 includes information identifying the content of the control information subfield.

Table 1000 of FIG. 10 is a revised version of Table 8 of FIG. 8, which includes new entries corresponding to features in accordance with some embodiments of the present invention. The rows corresponding to control ID values of: 0-4, 6, and 15 are the same in both tables 800, 1000, and have already been described with regard to Table 8 of FIG. 8.

Row 1010 corresponds to control ID value=7. Control ID value=7 corresponds to resource unit (RU) or RU(s) to be avoided. The meaning is that an identified RU is recommended not to be assigned to STA for UL MU transmission for the following trigger-based PPDU frame (or during current TXOP). In some embodiments, the control information subfield conveys information identifying a single RU. In some such embodiments, the control information subfield is a fixed length to convey RU ID information. In some embodiments, the control information subfield conveying information identifying a list RUs. In some such embodiments, the control information subfield is a variable length, with the length of the subfield being dependent upon the number of RUs in the list of RUs.

Row 1012 corresponds to control ID value=8. Control ID value=8 corresponds to recommended resource unit (RU) or recommended RU(s). The meaning is that an identified RU (or a subset of it) is recommended to be assigned to the STA for UL MU transmission for the following trigger-based PPDU frame (or during current TXOP). In some embodiments, the control information subfield conveys information identifying a single RU. In some such embodiments, the control information subfield is a fixed length to convey RU ID information. In some embodiments, the control information subfield conveying information identifying a list RUs. In some such embodiments, the control information subfield has a variable length, with the length of the subfield being dependent upon the number of RUs in the list of RUs.

Row 1014 corresponds to control ID value=9. Control ID value=9 corresponds to recommended set of 20 MHz sub-channels. The meaning is that: a bit in position X in the bitmap is set to 1 to indicate that sub-channel X+1 is recommended; otherwise, it is set to 0 to indicate that the sub-channel is not recommended due to IDC concerns. The length of control information in the subfield is 9 bits. Each bit in the sub-field indicates whether a 20 MHz subchannel is recommended to be used or not recommended to be used, based on IDC concerns.

Row 1016 corresponds to control ID value=5. Control ID value=5 corresponds a bandwidth query report (BQR) in accordance with the present invention. (In this embodiment, the BQR report takes into consideration IDC.) The length of the control information subfield is 9 bits. The content of the control information subfield is a bitmap indicating 20 MHz sub-channels available at the STA, which transmitted the BQR. The Available Channel Bitmap subfield contains a bitmap indicating the subchannels available at the STA transmitting the BQR. Each bit in the bitmap corresponds to a 20 Mhz subchannel within the operating channel, with the Least Significant Bit (LSB) corresponding to the lowest numbered operating subchannel. The bit in position X in the bitmap is set to 1 to indicate that the subchannel X+1 is idle and the channel does not cause any IDC issue; otherwise, it is set to 0 to indicate that the subchannel is busy or unavailable or the device has IDC issues to use the subchannel. Availability of each 20 Mhz subchannel is based on the Energy Detect (ED)—based Clear Channel Assessment (CCA) and is reported for the 20 MHz subchannels located in the operating channel of the reporting STA when the channel is idle. The determination for in-device coexistence is implementation-based.

Row 1016 corresponds to control ID value=10. Control ID value=10 corresponds to recommended unlicensed spectrum, which identifies one of 2.4 GHz, 5 GHz, or 6 GHz, in accordance with the present invention. The length of the control information subfield is up to 11 bits. The first two bits identify one of 2.4/5/6 GHz unlicensed spectrum (e.g., 00=2.4 GHz, 01=5 GHz, 10=6 GHz). The STA may, and sometimes does, simply recommend an alternative unlicensed spectrum (and avoids recommending RUs or 20 MHz sub-channels). If so, this control subfield would only have length 2. Note that if 2.4 GHz is identified, the STA and the AP are associated with one of three 2.4 GHz channels (CH1, CH 6 and CH 11). Hence no additional clarification for a recommended 20 MHz sub-channel is needed.

However, if 5 GHz or 6 GHz is identified, 9 additional bits (a 9-bit bitmap) may be, and sometimes are, provided where each bit corresponds to a 20 MHz sub-channel (from potentially a max 320 MHz channel) with the LSB corresponding to the lowest numbered operating subchannel.

Meaning: The bit in position X in the bitmap is set to 1 to indicate that the sub-channel X+1 is recommended; otherwise, it is set to 0 to indicate that the subchannel is not recommended due to IDC concerns.

Row 1018 corresponds to control ID value=11. Control ID value=11 corresponds to duration information. The content of the control information subfield indicates recommended duration, e.g., in units of 1 ms, 5 ms, 10 msec, etc.

In some embodiments, a duration control information is communicated following any: of RU to be avoided information, RUs to be avoided information, recommend RU information, recommended RU(s) information, recommended set of 20 MHz subchannels information, recommended unlicensed spectrum information, or BQR information.

In some embodiments, instead of including a separate duration subfield, with its own control ID value, e.g., 10), the duration information is communicated as a sub-field which is included (e.g., appended) as part of the content of the control information communicated with one or more or all of identified RU to be avoided information (for control ID value=7), identified recommended RU information (for control ID value=8), or a bitmap indicating recommended set of 20 MHz subchannel based on IDC concerns (for control ID value=9), or bitmap indicating 20 MHz subchannels available at STA as part of bandwidth query report information which takes into consideration IDC concerns (for control ID value=5).

Control IDs values 12-14 are reserved, in this example, as indicated by row 1020. It should be appreciated that RU or RUs to be avoided, recommended RU or RUs, recommended set of 20 MHz subchannels, recommended unlicensed spectrum, and duration (which corresponding to control ID bits 7, 8, 9, 10, 11) in this exemplary embodiment, may correspond to different control ID bit values from original set of reserved control ID bits (7-14) (See FIG. 8) in other exemplary embodiments.

Figure 11:
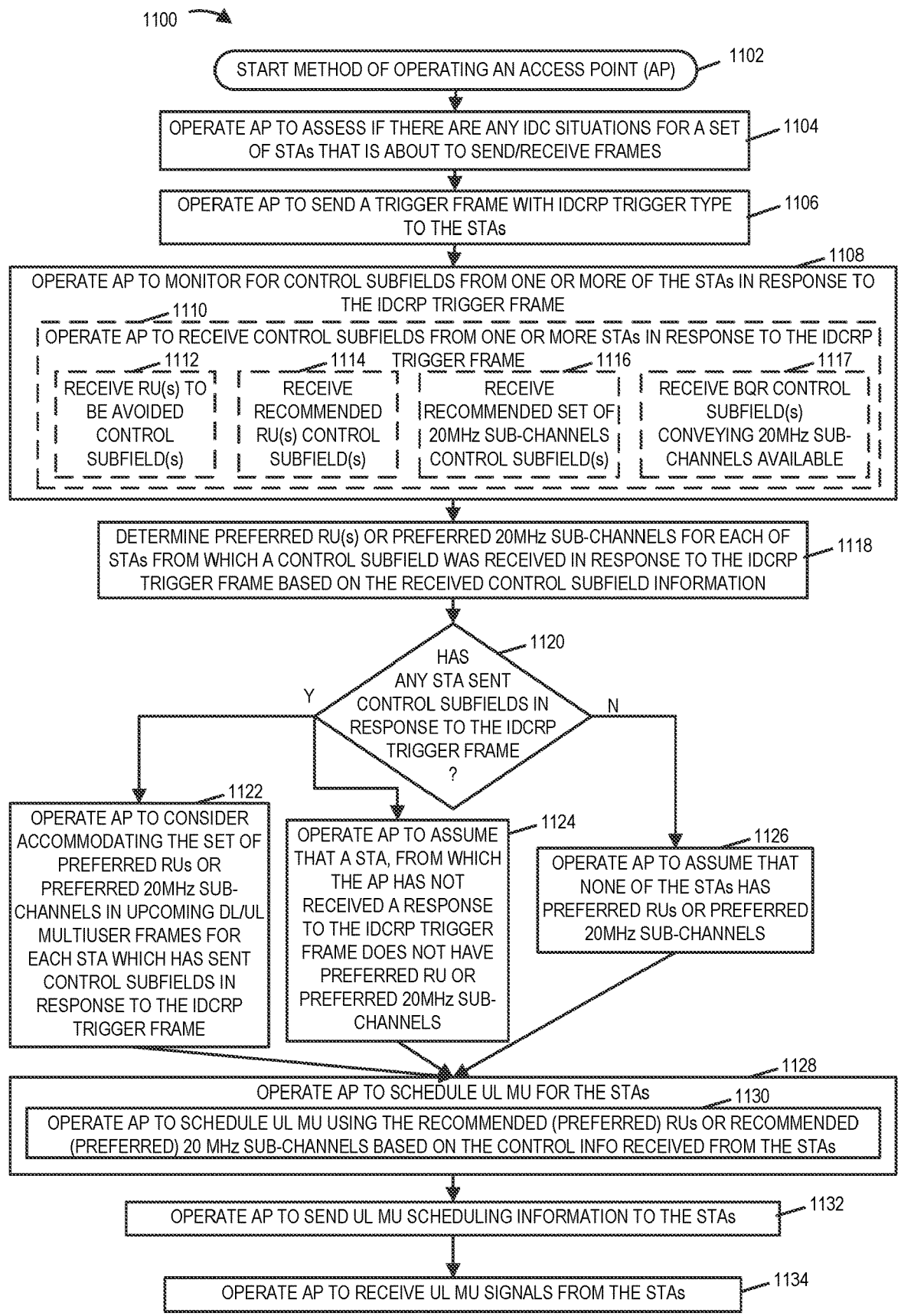
FIG. 11 is flowchart of an exemplary method of operating an access point (AP), e.g., a WiFi AP supporting IEEE 802.11ax/be and IDC features of the present invention, in accordance with an exemplary embodiment.

FIG. 11 is a flowchart 1100 of an exemplary method of operating an access point (AP) in accordance with an exemplary embodiment. Operation starts in step 1102 in which the AP is powered on and initialized and proceeds to step 1104.

In step 1104 the AP assesses if there are any IDC situations for a set of STAs that is about to send/receive frames. Operation proceeds from step 1104 to step 1106. In step 1106 the AP sends a trigger frame with IDCRP trigger type to the STAs. Operation proceeds from step 1106 to step 1108.

In step 1108 the AP monitors for control subfields from one or more of the STAs in response to the IDCRP trigger frame. Step 1108 may, and sometimes does, include step 1110 on which the AP receives control subfields from one or more of the STAs in response to the IDCRP trigger frame. Step 1110 includes one or more or all of step 1112, 1114, 1116, and 1117. In step 1112 the AP receives RU(s) to be avoided control subfield(s). In step 1114 the AP receives recommended RU(s) control subfield(s). In step 1116 the AP receives recommended set of 20 MHz sub-channels control subfield(s). In step 1117 the AP receives BQR control subfield(s) conveying 20 MHz channels available. Operation proceeds from step 1108 to step 1118.

In step 1118 the AP determines preferred RUs or preferred 20 MHZ sub-channels for each of the STAs from which a control sub-field was received in response to the IDCRP trigger frame based on the received control sub-field information. Operation proceeds from step 1118 to step 1120.

In step 1120 the access point determines if any STA has sent control subfields in response to the IDCRP trigger frame. If the AP determines that none of the STAs has sent a control subfield in response to the IDCRP (e.g., the AP has not received any control subfield in response to the IDCRP frame), operation proceeds from step 1120 to step 1126, in which the AP assumes the none of the STAs has preferred RUs or preferred 20 MHz sub-channels. However, if the AP determines that at least on STA has sent a control subfield in response to the IDCRP trigger frame, then operation proceeds from step 1120 to step 1122 and step 1124. In step 1122 the AP considers accommodating the set of preferred RUS or preferred 20 MHz sub-channels in DL/UL multiuser frames for each STA which has sent control sub-field in response to the IDCRP trigger frames. In step 1124 the AP assumes that a STA from which the AP has not received a response to the IDCRP trigger frame does not have preferred RUS or preferred 20 MHz sub-channels. Operation proceeds from steps 1122 and 1124 or step 1126 to step 1128.

In step 1128 the AP schedules uplink (UL) multiuser (MU) for the STAs. Step 1128 includes step 1130. In step 1130 the AP schedules UL MU using the recommended (preferred) RUs or recommended (preferred) 20 MHz sub-channels based on the control information received from the STA. Operation proceeds from step 1128 to step 1132.

In step 1132 the AP sends, e.g., transmits, UL MU scheduling information to the STAs. Operation proceeds from step 1132 to step 1134. In step 1134 the AP receives UL MU signals, e.g., UL MU data signals, from the STAs.

Figures 12, 12A, 12B:
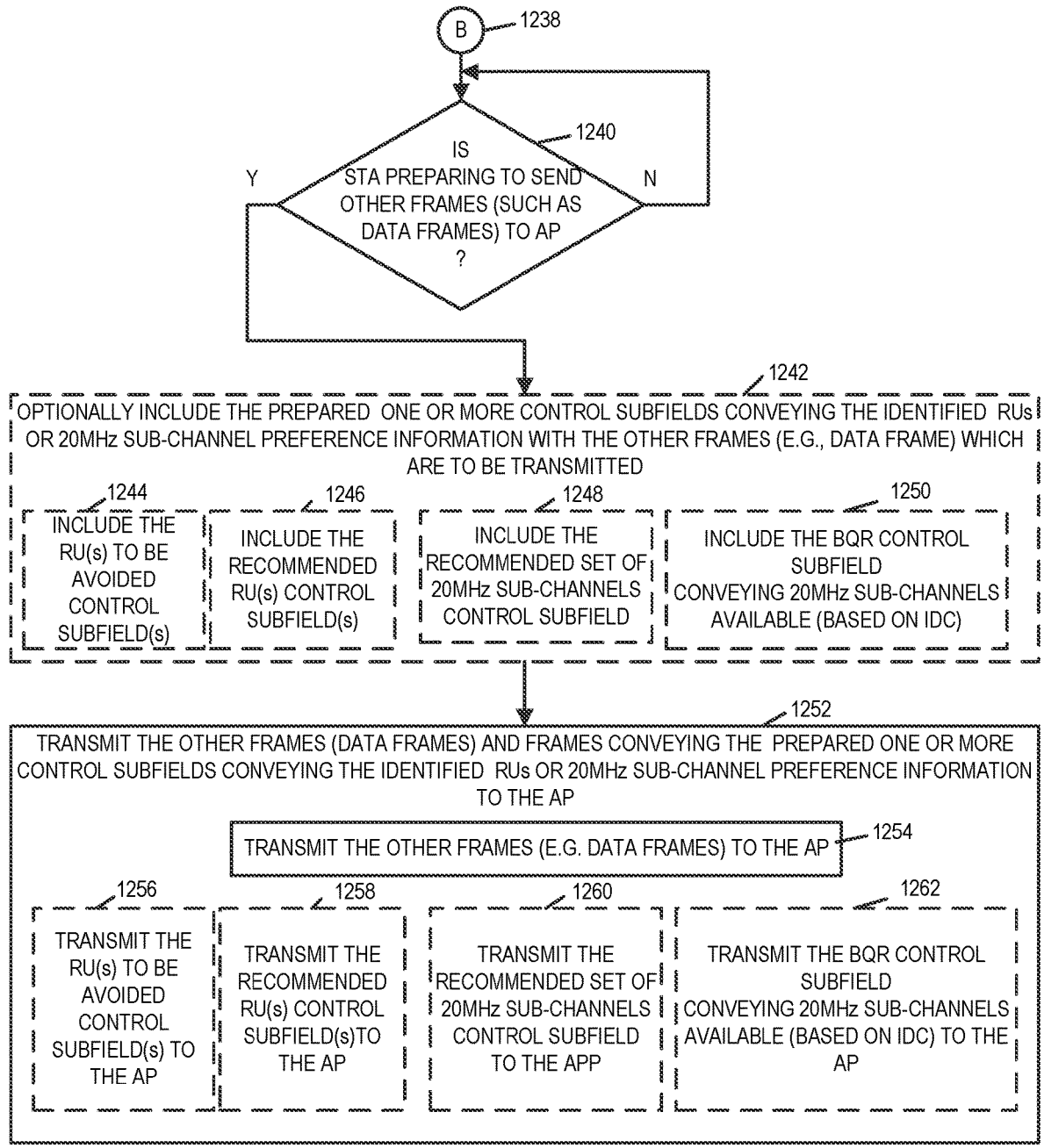
FIG. 12A is a first part of flowchart of an exemplary method of operating a station (STA), e.g., a STA included as part of wireless communications device including a cellular transceiver (e.g., supporting NR-U/LLA) and a WiFi transceiver, said STA supporting WiFi (e.g., IEEE 802.11ax/be) and IDC features of the present invention, in accordance with an exemplary embodiment.
FIG. 12B is a second part of flowchart of an exemplary method of operating a station (STA), e.g., a STA included as part of wireless communications device including a cellular transceiver and a WiFi transceiver, said STA supporting WiFi and IDC features of the present invention, in accordance with an exemplary embodiment.
FIG. 12 comprises the combination of FIG. 12A and FIG. 12B.
Figure 12A:
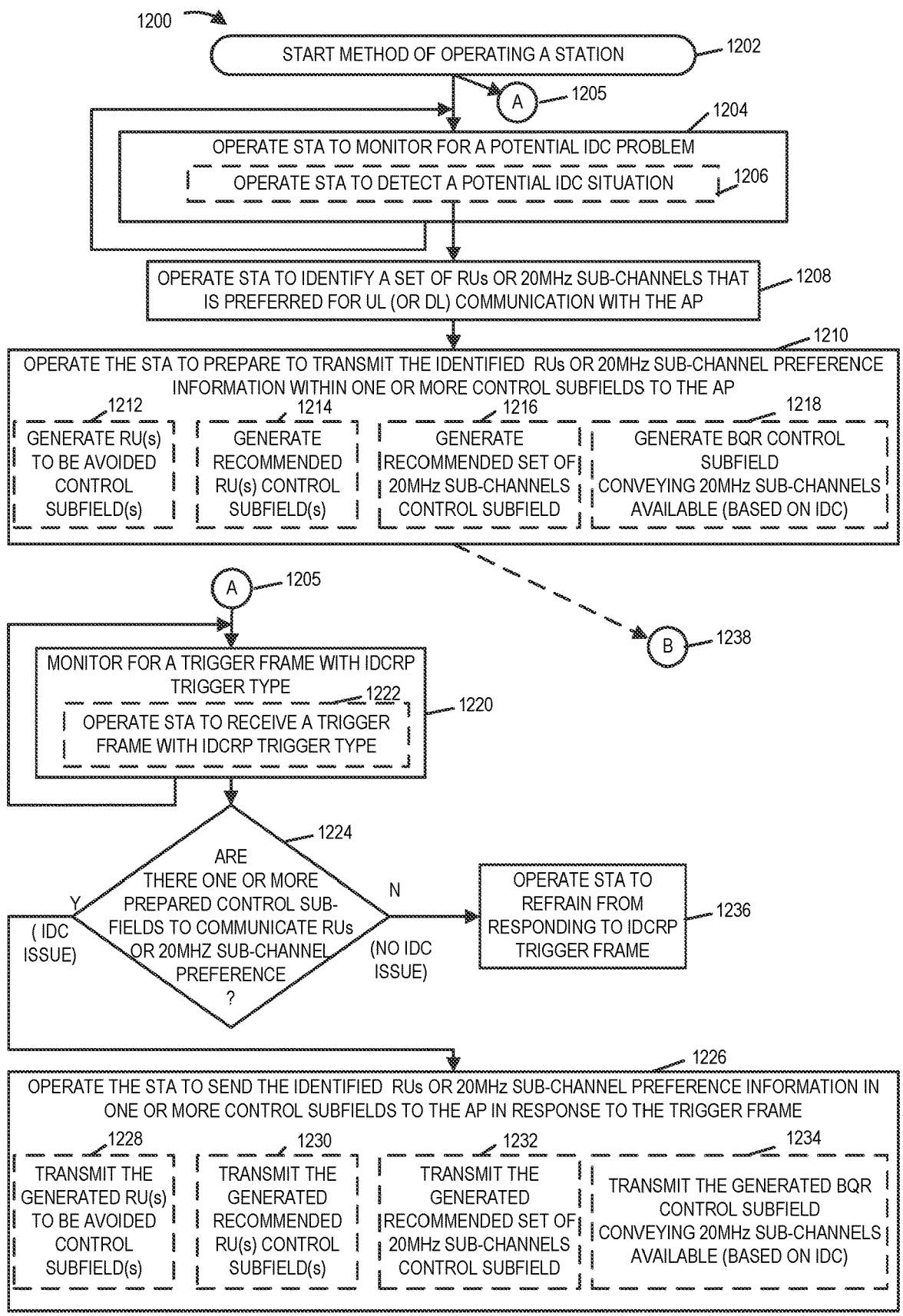

FIG. 12 is a flowchart 1200 of an exemplary method of operation a station (STA) in accordance with an exemplary embodiment. The STA is, e.g., part of a wireless communications device (e.g., a smartphone device) including a STA (supporting WiFi communications, e.g., 802.11ax/be) and a UE component (supporting 3GPP cellular communications, e.g., NR-U). Operation starts in step 1202 in which the STA is powered on and initialized. Operation proceeds from start step 1202 to step 1204, and via connecting node A 1205, to step 1220.

In step 1204 the STA is operated to monitor for a potential IDC problem. Step 1204 may, and sometimes does, include step 1206 in which the STA detects a potential IDC situation. Operation proceeds from step 1206 to step 1208. In step 1208 the STA identifies a set of resource units (RUs) or 20 MHz sub-channels that is preferred for UL (or DL) communications with the AP, e.g., RUs or 20 MHz sub-channels which are not expected to experience IDC problems. Operation proceeds from step 1208 to step 1210.

In step 1210 the STA prepares to transmit the identified RUs or 20 MHz sub-channel preference information within one or more control subfields to the AP. Step 1210 includes one or more or all of step 1212, 1214, 1216 or 1218. In step 1212 the STA generates RU(s) to be avoided sub-field(s). In step 1214 the STA generates recommended RU(s) subfield(s). In step 1216 the STA generates a recommended 20 MHz sub-channels control sub-field. In step 1218 the STA generates a BQR control sub-field conveying 20 MHz sub-channels available (based on IDC). In some embodiments, operation proceeds from step 1210, via connecting node B 1238 to step 1240.

Returning to step 1220, in step 1220 the STA monitors for a trigger frame with IDCRP trigger type from the AP. Step 1220 may, and sometimes does, include step 1222 in which the STA receives a trigger frame with IDCRP trigger type. Operation proceeds from step 1222 to step 1224. In step 1224, the STA determines if there are one or more prepared control sub-fields to communicate RUs or 20 MHz sub-channel preference. If there are one or more prepared control sub-fields to communicate RUs or 20 MHz sub-channel preference, e.g., indicating an IDC issue, then operation proceeds from step 1224 to step 1226. In step 1226 the STA sends the identified RUs or 20 MHz sub-channel preference information in one of more control sub-fields to the AP in response to the trigger frame with IDCRP type. Step 1226 includes one or more or all of step 1228, 1230, 1232 and 1234. In step 1228 the STA transmits the generated RUs to be avoided control sub-field(s) to the AP. In step 1230 the STA transmits the generated recommend RUs control sub-field(s) to the AP. In step 1232 the STA transmits the generated recommended set of 20 MHz sub-channels control sub-field to the AP. In step 1234 the STA transmits the generated BQR control subfield conveying 20 MHz sub-channels available (based on IDC) to the AP.

Retuning to step 1224, if there are not any prepared control sub-fields to communicate RUs or 20 MHz sub-channel preference, e.g., indicating no IDC issue, then operation proceeds from step 1224 to step 1236, in which the STA is operated to refrain from responding to the IDCRP trigger frame.

In some embodiments, operation may, and sometimes does, proceeds from step 1210, via connecting node B 1238, to step 1240. In step 1240 the STA checks if the STA is preparing to send other frames (such as data frames) to the AP. If the STA determines that the STA is preparing to sent other frames, e.g., data frames, to the AP, then operation proceeds from step 1240 to step 1242. In step 1242 the STA optionally includes the prepared one or more control subfield conveying the identified RUs or 20 MHz sub-channel preference information with the other frames, e.g., data frames, which are to be transmitted to the AP. Step 1242 includes one or more of all of step 1244, 1246, 1248, and 1250. In step 1244 the STA includes the RUs to be avoided control subfield(s). In step 1246 the STA includes the recommended RUs control subfield(s). In step 1248 the STA includes the recommended set of 20 MHz sub-channels control subfield. In step 1250 the STA includes the BQR control subfield conveying 20 MHz sub-channels available (based on IDC) information. Operation proceeds from step 142 to step 1252.

In step 1252 the STA transmits the other frames (e.g., data frames) and the frames conveying the prepared one or more control sub-fields conveying the identified RUs or 20 MHz sub-channel preference information to the AP. Step 1252 includes step 1254 and one or more or all of step 1256, 158, 1260 and 1262. In step 1254 the STA transmits the other frames (e.g., data frames) to the AP. In step 1256 the STA transmits the generated RUs to be avoided control sub-field(s) to the AP. In step 1258 the STA transmits the generated recommend RUs control sub-field(s) to the AP. In step 1260 the STA transmits the generated recommended set of 20 MHz sub-channels control sub-field to the AP. In step 1262 the STA transmits the generated BQR control subfield conveying 20 MHz sub-channels available (based on IDC) to the AP.

Figure 13:
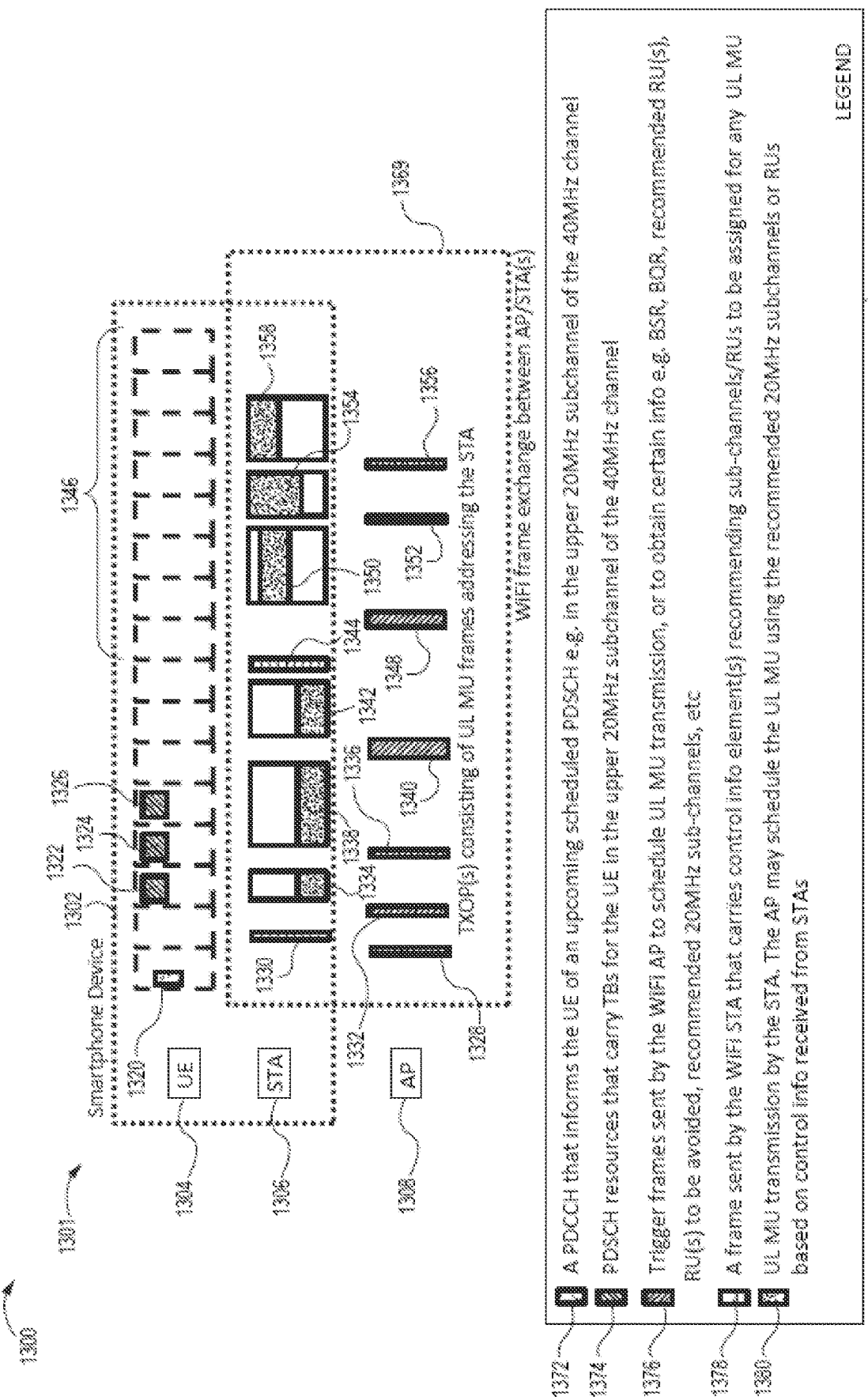
FIG. 13 is a drawing which illustrates an example in which in-device co-existence (IDC) control information is sent by a station (STA) of a wireless device, e.g. smartphone device, to a WiFi access point (AP) in response to a trigger frame requesting IDC information, and wherein the AP further receives UL MU signals from the STA, wherein the scheduling of UL MU by the AP uses the STA recommended 20 MHz subchannels or resource units (RUs) based on the received IDC control information, in accordance with an exemplary embodiment.

FIG. 13 is a drawing 1300 which illustrates an example in which in-device co-existence (IDC) control information is sent by a station (STA) of a wireless device, e.g. smartphone device, to a WiFi access point (AP) in response to a trigger frame requesting IDC control information, and wherein the AP further receives UL MU signals from the STA, wherein the scheduling of UL MU by the AP uses the STA recommended 20 MHz subchannels or resource units (RUs) based on the received IDC control information, in accordance with an exemplary embodiment.

Drawing 1300 includes a drawing 1301 illustrating an exemplary smartphone device 1302 including a user equipment component 1304 (e.g., for communicating with a 3GPP cellular base station supporting NR-U/LAA) and a station (STA) component 1306 (e.g. for communicating with a WiFi AP supporting 802.11ax/be, and further including IDC features in accordance with the present invention), and an exemplary access point 1308 (e.g., a WiFi AP supporting IEEE 802.11ax/be and further including IDC features in accordance with the present invention), and exemplary signaling.

Drawing 1300 further includes legend 1370. Legend 1370 includes rectangular block with dotted shading 1372, which is used to indicate a physical downlink control channel (PDCCH), which informs the UE 1304 of an upcoming scheduled physical downlink shared channel (PDSCH), e.g., in the upper 20 MHz sub-channel of the 40 MHz channel.

Legend 1370 further includes rectangular block with positive sloped line shading 1374, which is used to indicate physical downlink shared channel (PDSCH) resources that carry Transport Blocks (TBs) for the UE 1304 in the upper 20 MHz subchannel of the 40 MHz channel.

Legend 1370 further includes rectangular block with negative sloped line shading 1376, which is used to indicate trigger frames send by the WiFi AP to schedule UL MU transmission, or to obtain certain information, e.g., BSR, BQR, RUs recommended, RUs to be avoided, recommended set of 20 MHz sub-channels, etc. (See FIG. 10).

Legend 1370 further includes rectangular block with horizontal line shading 1378, which is used to indicate a frame send by the WiFi STA that carries control information element(s) recommending sub-channels/RUs to be assigned for any UL MU.

Legend 1370 further includes rectangular block with high density dotted shading 1380, which is used to identify UL MU transmission by the STA. The AP may, and sometimes does, schedule the UL MU using the recommended 20 MHz subchannels or RUs based on the control information received from STAs.

Dashed Block 1369 indicates a WiFi frame exchange between AP/STA(s).

Information communicated in the PDCCH 1320, sent from a cellular base station, e.g., a NR-U gNB, to the UE 1306 of smartphone device 1302 informs the UE 1306 of upcoming PDSCH (1322, 1324, 1326), in the upper 20 MHz subchannel of a 40 MHz channel.

In one embodiment trigger frame 1328 sent by AP 1308, e.g., a IDCRP type trigger frame request IDC information, and in response WiFi STA 1306 sends frame 1330 to the AP. Frame 1330 carries control information element(s) recommending that the lower 20 MHz subchannel be used and that the upper 20 MHz subchannel not be used.

The AP 1308 schedules UL MU using the recommended lower 20 MHz subchannel via trigger frame 1332. In response, STA 1306 sends UL MU transmission 1334 to the WiFi AP 1308 using the scheduled resources (lower 20 MHz subchannel).

The AP 1308 schedules additional UL MU using the recommended lower 20 MHz subchannel via trigger frame 1336. In response, STA 1306 sends UL MU transmission 1338 to the WiFi AP 1308 using the scheduled resources (lower 20 MHz subchannel).

The AP 1308 schedules additional UL MU using the recommended lower 20 MHz subchannel via trigger frame 1340. In response, STA 1306 sends UL MU transmission 1342 to the WiFi AP 1308 using the scheduled resources (lower 20 MHz subchannel).

STA 1306 sends frame 1344 to the AP 1308. Frame 1344 carries control information element(s) recommending sub-channels/RUs to be assigned for UL MU. In this example, for the upcoming time interval 1346 there are no anticipated IDC problems, as there are no expected PDSCH resources expected to be used by UE 1304 in time range 1346, thus the control information in frame 1344 indicates to the AP that it may schedule UL MU on any of the resources sub-channels (e.g., both upper and lower 20 MHz sub-channels are recommended.)

The AP 1308 schedules UL MU using some or all of the recommended subchannels (both upper and lower 20 MHz sub-channels are recommended and available to be used) via trigger frame 1348. In response, STA 1306 sends UL MU transmission 1350 to the WiFi AP 1308 using scheduled resources.

The AP 1308 schedules UL MU using some or all of the recommended subchannels (both upper and lower 20 MHz sub-channels are recommended and available to be used) via trigger frame 1352. In response, STA 1306 sends UL MU transmission 1354 to the WiFi AP 1308 using scheduled resources.

The AP 1308 schedules UL MU using some or all of the recommended subchannels (both upper and lower 20 MHz sub-channels are recommended and available to be used) via trigger frame 1356. In response, STA 1306 sends UL MU transmission 1358 to the WiFi AP 1308 using scheduled resources.

It should be appreciated that IDC has been avoided by limiting the STA WiFi UL MU transmissions in frames 1334, 1338 to the lower 20 MHz sub-channel since the upper 20 MHz sub-channel is being used by the UE 1304 to receive PDSCH signals.

In some embodiments, the 3GPP (NR-U/LAA) unit and WiFi (802.11ax/be) unit of wireless device, e.g., a smartphone, happen to operate at the same, overlapping or adjacent unlicensed channel(s). The associated WiFi AP send DL OFSMA/MU frames that addresses the 802.11ax/be unit of the wireless device. The NR-U/LAA unit of the wireless device may be engaged in an uplink transmission, e.g., physical uplink control channel (PUCCH), physical uplink shared channel (PUSCH) or sounding reference signals (SRS).

In order to minimize leakage from the NR-U/LAA transmitter to the 11ax/be receiver, the 11ax/be unit may, and sometimes does, suggest to its associated WiFi AP a subset of the unlicensed channel to be used by the AP for subsequent downlink transmission.

Any of the control subfields, used to communicate IDC information, from table 1000 of FIG. 10 may be, and sometimes are, used to identify a recommended set of RUs of 20 MHz subchannels for subsequent MU DL transmission by the AP. One or multiple of such subfields may be, and sometimes are, added to any data management or control (wrapper) frame that the non-AP (STA wireless device) sends to the AP.

Figure 14:
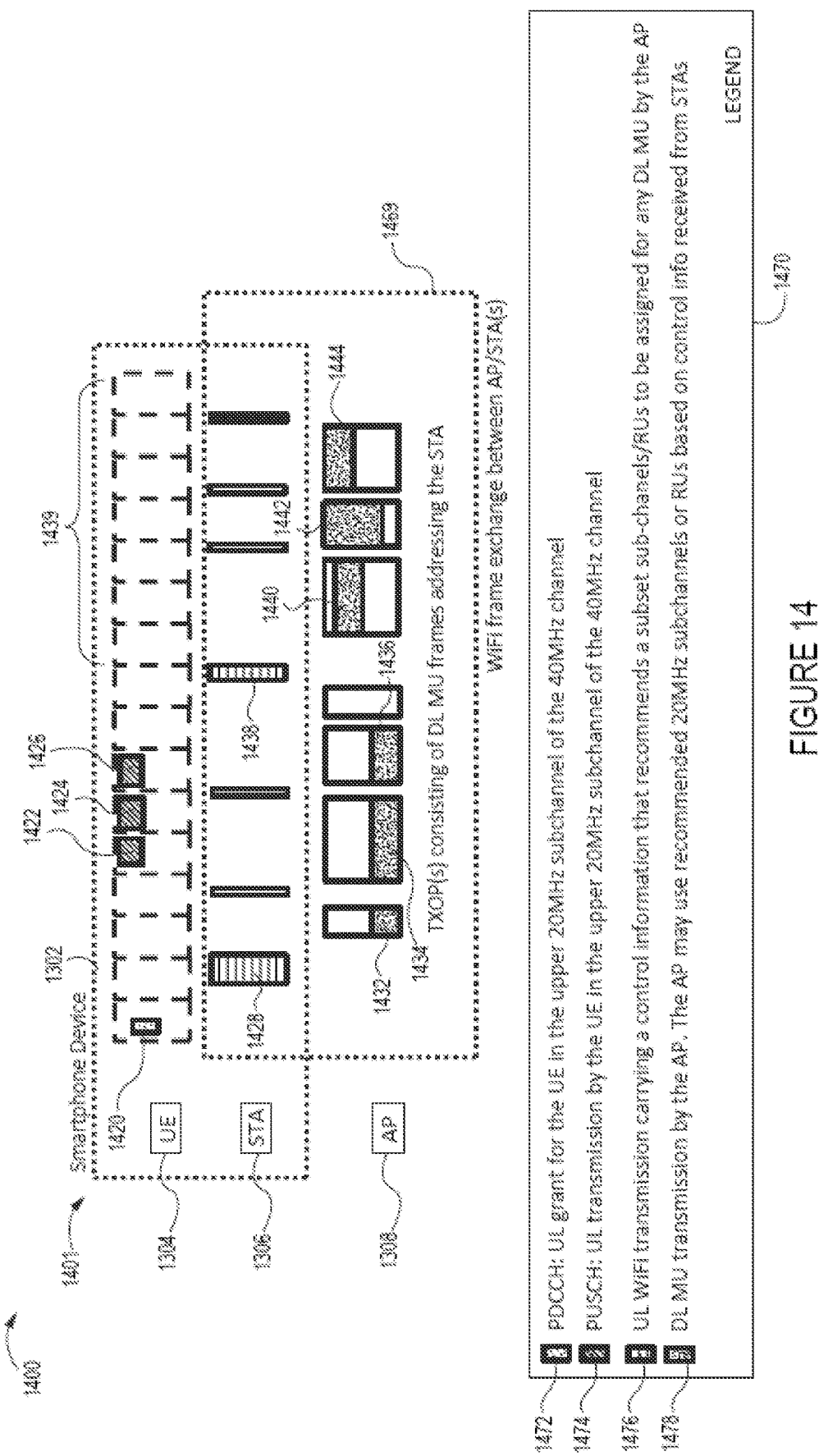
FIG. 14 is a drawing which illustrates an example in which in-device co-existence (IDC) control information is sent by a station (STA) of a wireless device, e.g. smartphone device, to a WiFi access point (AP), and wherein the AP uses the IDC control information from the STA to decide which 20 MHz sub-channels or resource units (RUs) are to be used for DL MU transmission, in accordance with an exemplary embodiment.

FIG. 14 is a drawing 1400 which illustrates an example in which in-device co-existence (IDC) control information is sent by a station (STA) of a wireless device, e.g., smartphone device, to a WiFi access point (AP), and wherein the AP uses the IDC control information from the STA to decide which 20 MHz sub-channels or resource units (RUs) are to be used for DL MU transmission, in accordance with an exemplary embodiment.

Drawing 1400 includes a drawing 1401 illustrating an exemplary smartphone device 1302 including a user equipment component 1304 (e.g., for communicating with a 3GPP cellular base station supporting NR-U/LAA) and a station (STA) component 1306 (e.g. for communicating with a WiFi AP supporting 802.11ax/be, and further including IDC features in accordance with the present invention), and an exemplary access point 1308 (e.g., a WiFi AP supporting IEEE 802.11ax/be and further including IDC features in accordance with the present invention), and exemplary signaling.

Drawing 1400 further includes legend 1470. Legend 1470 includes rectangular block with dotted shading 1472, which is used to indicate a physical downlink control channel (PDCCH), which conveys a UL grant for the UE in the upper 20 MHz subchannel of the 40 MHz channel.

Legend 1470 further includes rectangular block with positive sloped line shading 1474, which is used to indicate physical uplink shared channel (PUSCH) resources for UL transmission by the UE in the upper 20 MHz subchannel of the 40 MHz channel.

Legend 1470 further includes rectangular block with horizontal line shading 1476, which is used to indicate an UL WiFi transmission by the WiFi STA that carries control information element(s) that recommends a subset of sub-channels/RUs to be assigned for any DL MU by the AP.

Legend 1470 further includes rectangular block with high density dotted shading 1478, which is used to identify DL MU transmission by the AP. The AP may, and sometimes does use the recommended 20 MHz subchannels or RUs based on the control information received from STAs.

Dashed Block 1469 indicates a WiFi frame exchange between AP/STA(s).

Information communicated in the PDCCH 1420, sent from a cellular base station, e.g., a NR-U gNB, to the UE 1306 of smartphone device 1302 informs the UE 1306 of upcoming PUSCH (1422, 1424, 1426), in the upper 20 MHz subchannel of a 40 MHz channel.

UL WiFi transmission 1428 from STA 1306 carries control information element(s) recommending that the lower 20 MHz subchannel be used and that the upper 20 MHz subchannel not be used.

The AP 1308 performs DL MU transmissions (1432, 1434, 1436) using the recommended resources (the lower 20 MHz subchannel) identified from the received IDC control information of transmission 1428.

STA 1306 sends UL WiFi control transmission 1438 to the AP 1308. Frame 1438 carries control information element(s) recommending sub-channels/RUs to be assigned for DL MU. In this example, for the upcoming time interval 1439 there are no anticipated IDC problems, as there are no expected PUSCH resources expected to be used by UE 1304 in time range 1439, thus the control information in frame 1438 indicates to the AP that it may schedule DL MU on any of the resources sub-channels (e.g., both upper and lower 20 MHz sub-channels of the 40 MHz channel are recommended.)

The AP 1308 performs DL MU transmissions (1442, 1442, 1444) using some of the recommended resources (both upper and lower 20 MHz sub-channels of the 40 MHz channel are recommended and available to be used) identified from the received IDC control information of transmission 1438.

It should be appreciated that IDC has been avoided by limiting the WiFi DL MU transmissions in frames 1443, 1436 to the lower 20 MHz sub-channel since the upper 20 MHz sub-channel is being used by the UE 1304 to transmit UL signals in the PUSCH.

Figure 15:
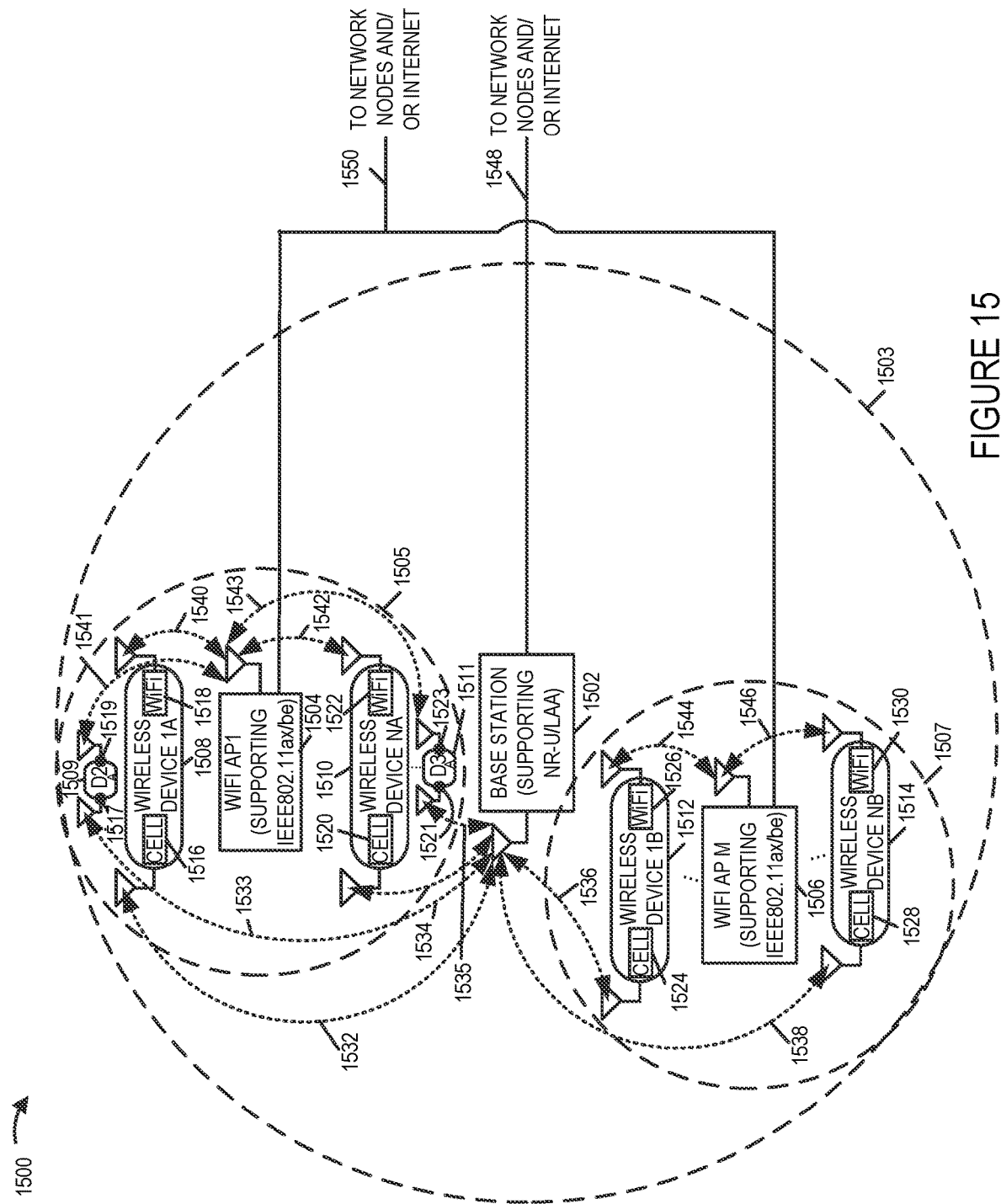
FIG. 15 is a drawing of an exemplary communications system in accordance with an exemplary embodiment.

FIG. 15 is a drawing of an exemplary communications system 1500 in accordance with an exemplary embodiments. Exemplary system 1500 includes a plurality of cellular base stations included 3GPP cellular base station 1502, supporting NR-U/LLA, a plurality of WiFi access points (WiFi AP 1 1504, ..., WiFi AP M 1506), supporting IEEE 802.11ax/be, and a plurality of wireless devices (wireless device 1A 1508, wireless device 2A 1509, wireless device 3A 1511, ..., wireless device NA 1510, wireless device 1B 1512, ..., wireless device NB 1512). At least some of the wireless devices (1508, 1509, 1511, ..., 1510, 1512, ..., 1514) are mobile wireless devices which may move throughout the system and be connected to different base stations and/or APs at different times. Each of the wireless devices (1508, 1509, 1511, ..., 1510, 1512, ..., 1514) includes a cellular transceiver and WiFi transceiver ((1516, 1518), (1517, 1519), (1521, 1523), ..., (1520, 1522), (1524, 1526), ..., (1528, 1530), respectively. The wireless devices (1508, 1509, 1511, ..., 1510, 1512, ..., 1514) may, and sometimes do, experience in-device coexistence problems, e.g. when using overlapping and/or adjacent spectrum for the cellular and WiFi communications.

Base station 1 1502 has a wireless coverage area 1503. WiFi APs (1504, ..., 1506) have corresponding wireless coverage areas (1505, ..., 1507), respectively. In the exemplary system 100 of FIG. 1, the WiFi coverage areas (1505, 1507) are within the cellular coverage area 1503.

Base station 1502 is coupled to network nodes, e.g., 3GPP network nodes, and/or the Internet, via backhaul communications link 1548. The WiFi APs (1504, ..., 1506) are coupled to network nodes and/or the Internet via backhaul communications link 1550.

In accordance with a feature of various embodiments, a wireless device (1508, 1509, 1511, ..., 1510, 1512, ..., 1514) determines whether or not there is an expected or existing IDC problems exist at the wireless device and communicates IDC information to an access point to which the wireless device is connected. In some embodiments, the IDC information identifies resources unit(s) and/or subchannels (e.g., 20 MHz subchannels) which are recommended or are to be avoided based on IDC. In some embodiments, the IDC information is communicated to the access point via one or more or all of: i) a resource unit(s) to be avoided control information subfield, ii) a recommended resource unit(s) control information subfield, iii) a recommended set of 20 MHz sub-channels control information subfield, or iv) a bandwidth query report (BQR) control information subfield.

In various embodiments, an access point (1504, ..., 1506) sends a trigger frame (e.g., an in device coexistence (IDC) report poll (IDCRP) trigger frame, a buffer status report poll (BSRP) trigger frame, or a bandwidth query report poll (BQRP) trigger frame, to wireless devices, which requests that the wireless devices report IDC information to the AP in response to the trigger frame. The AP uses received IDC information from the wireless devices in making scheduling decisions, e.g., to schedule UL MU, e.g., accommodating wireless devices RUs or sub-channel (e.g., 20 MHz sub-channel) preferences.

Figures 16, 16A, 16B, 16C:
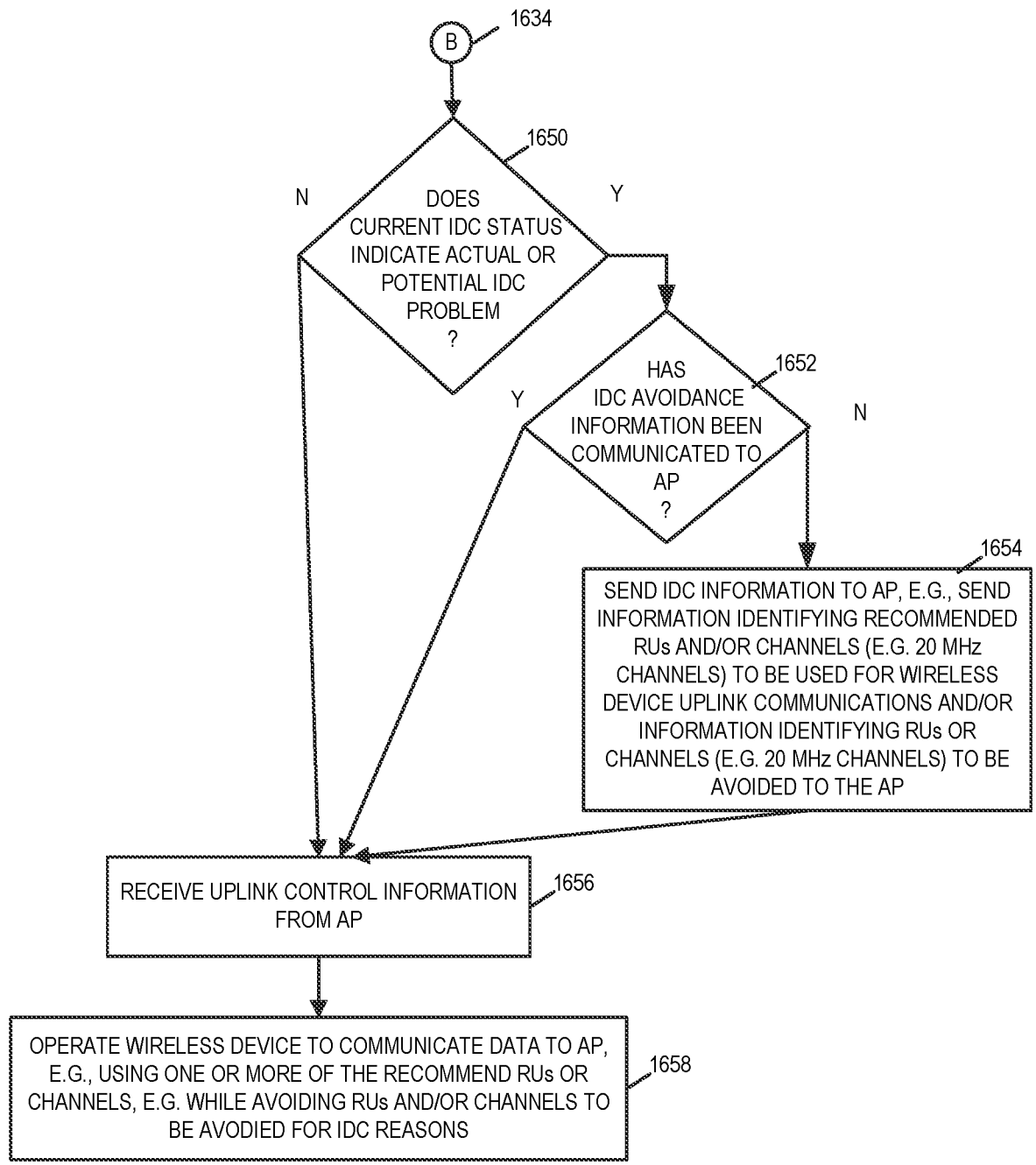
FIG. 16A is a first part of a flowchart of an exemplary method of operating a wireless device, e.g., a smartphone, including a cellular transceiver and a WiFi transceiver, in accordance with an exemplary embodiment.
FIG. 16B is a second part of a flowchart of an exemplary method of operating a wireless device, e.g., a smartphone, including a cellular transceiver and a WiFi transceiver, in accordance with an exemplary embodiment.
FIG. 16C is a third part of a flowchart of an exemplary method of operating a wireless device, e.g., a smartphone, including a cellular transceiver and a WiFi transceiver, in accordance with an exemplary embodiment.
FIG. 16 comprises the combination of FIG. 16A, FIG. 16B and FIG. 16C.
Figure 16A:
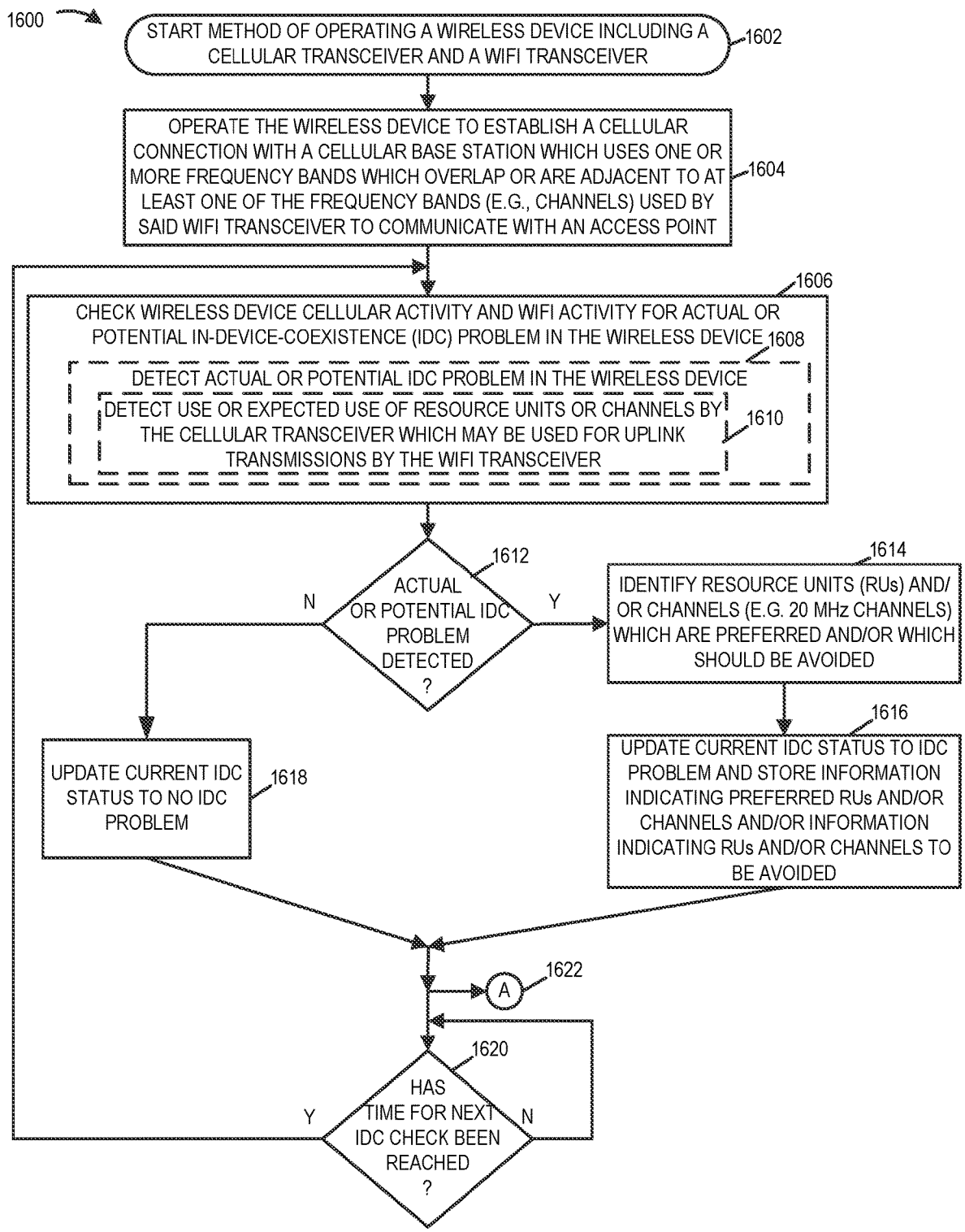
Figure 16B:
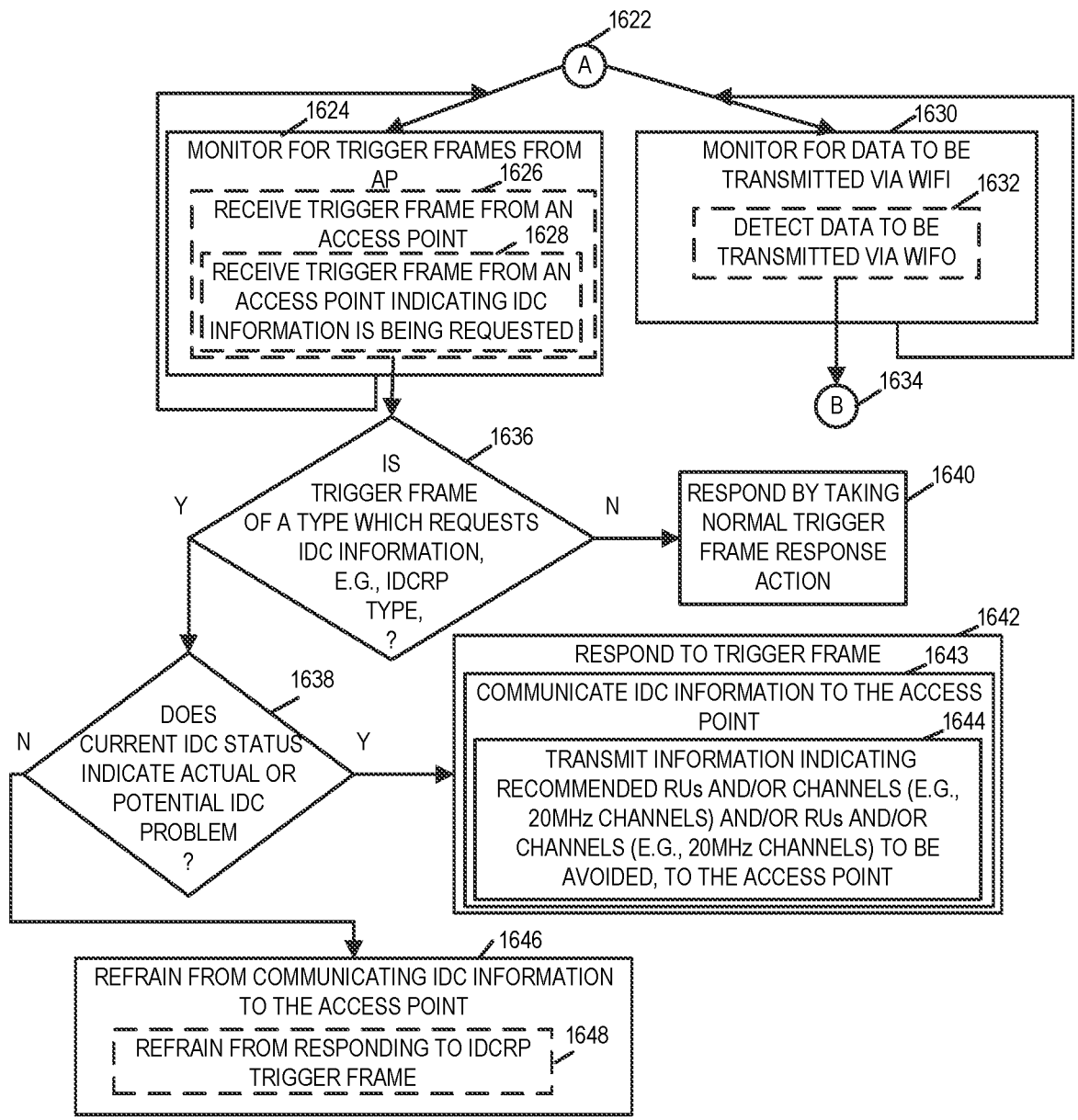

FIG. 16, comprising the combination of FIG. 16A, FIG. 16B and FIG. 16C, is a flowchart 1600 of an exemplary method of operating a wireless device, e.g., a smartphone, including a cellular transceiver and a WiFi transceiver, in accordance with an exemplary embodiment. In some embodiments, said WiFi transceiver is an 802.11ax and/or 802.11be transceiver. In some embodiments, said cellular transceiver is 3GPP NR-U/LAA transceiver unit. In some embodiments, said WiFi transceiver and said cellular transceiver both operate in unlicensed spectrum of a 5 GHZ band and/or 6 GHz band.

Operation of the exemplary method starts in step 1602 in which the wireless device is powered on and initialized. Operation proceeds from start step 1602 to step 1604. In step 1604 the wireless device establishers a cellular connection with a cellular base station which uses one or more frequency bands which overlap or are adjacent to at least one of the frequency bands (e.g., channels) used by the WiFi transceiver to communicate with an access point. Operation proceeds from step 1604 to step 1606.

In step 1606 the wireless device checks cellular activity and WiFi activity for an actual or potential in-device-coexistence (IDC) problem in the wireless device. Step 1606 may, and sometimes does, include step 1608, in which the wireless device detects an actual or problem in the wireless device. Step 1608 may, and sometimes does include step 1610 in which the wireless device detects use or expected use (e.g., as indicated by transmissions or a resource grant) of resource units (RUs) or channels, e.g., 20 MHz channels, by the cellular transceiver which may be used for uplink transmissions by the WiFi transceiver. Operation proceeds from step 1606 to step 1612.

In step 1612, if an actual or potential IDC problem was detected in step 1606, then in operation proceeds from step 1612 to step 1614. However, in step 1612, if an actual or potential IDC problem was not detected in step 1606, then operation proceeds from step 1612 to step 1618. Returning to step 1614, in step 1614 the wireless device identifies resource units (RUs) and/or channels (e.g., 20 MHZ channels) which are preferred and/or which should be avoided.

Operation proceeds from step 1614 to step 1616. In step 1616 the wireless device update current IDC status to IDC problem and stores information identifying preferred RUs and/or channels and/or information identifying RUs and/or channels to be avoided. Returning to step 1618 in step 1618 the wireless device updates current IDC status to no IDC problem. Operation proceeds from step 1616 or step 1618 to steps 1620 and via connecting node A 1622 to steps 1624 and 1630.

In step 1620 the wireless device determines is the time for the next IDC check has been reached. If the determination is that the time for the next IDC check has not been reached, then operation proceeds from the output of step 1620 to the input of step 1620 for another time check at a later time. However, if the determination of step 1620 is that the time for the next IDC check has been reached, then operation proceeds from the output of step 1620 to step 1606, in which the wireless device again checks wireless device cellular activity and WiFi activity for an actual or potential IDC problem in the wireless device.

Returning to step 1624, in step 1624, the wireless device monitors for trigger frames from the AP. Step 1624 is performed repetitively on an ongoing basis. Step 1624 may, and sometimes does, include step 1626 in which the wireless device receives a trigger frame from the access point. Step 1626 may, and sometimes does include step 1628 in which the wireless device receives a trigger frame from an access point (e.g., a WiFi AP) indicating IDC information is being requested. In some embodiments, the received trigger frame indicating IDC information is being requested is of the type In-Device Coexistence Report Poll (IDCRP). In some such embodiments, the received trigger frame is a new variant or trigger frame type and includes a control ID value in the range of 8 to 15 indicating IDC information is being requested. (Note values in the range of 8 to 15 were previously reserved bits.) In some embodiments, the received trigger frame (which is used to request IDC information) is of type BQRP (Bandwidth Query Report Poll) or BSRP (Buffer Status Report Poll) (e.g., the BQRP or BSRP of the present invention requests IDC information in addition to other information typically requested in prior versions of the report). Operation proceeds from step 1626 to step 1636.

In step 1636 the wireless device determines if the received trigger frame is a type which requests IDC information, e.g., an IDCRP type. If the received trigger frame type is not a type which requests IDC information, then operation proceeds from step 1636 to step 1640, in which the wireless device responds by taking normal trigger frame action. However, if the received trigger frame type is a type which request IDC information, then operation proceeds from step 1636 to step 1638.

In step 1638 the wireless device determines if the current IDC status indicates an actual or potential IDC problem. If the current IDC status indicates an actual or potential IDC problem, then operation proceeds from step 1638 to step 1642, in which the wireless device responds to the trigger frame. Step 1642 includes step 1643 in which the wireless device communicates IDC information to the access point. Step 1643 includes step 1644 in which the wireless device transmits information indicating recommended RUs and/or channels (e.g., 20 MHz channels) and/or information indicating RUs and/or channels (e.g., 20 MHz channels) to be avoided to the access point.

In some embodiments, the communicated IDC information includes one, more than one, or all of: i) resource units (RUs) which are preferred by the wireless device for IDC reasons (e.g., the identified preferred RUs); ii) channels (e.g., 20 MHZ sub-channels) which are preferred (e.g., the identified preferred channels) by the wireless device for IDC reasons; iii) resource units (RUs) to be avoided for use by the first wireless device for IDC reasons (e.g., the identified RUs to be avoided), iv) channels (e.g., 20 MHZ sub-channels) to be avoided for use by the wireless device for IDC reasons (e.g., the identified channels to be avoided).

In some embodiments, the communicated IDC information includes a list of one or more suggested unlicensed channels (e.g., 20 MHz subchannels) to be used by the AP for scheduling of wireless device UL MU transmission. In some such embodiments, the communicated IDC information is communicated in a control subfield identified by (e.g., including) a control ID value indicating that a specified channel associated with the control ID value is a recommended sub-channel.

In some embodiments, the communicated IDC information includes a list of one or more suggested RUs to be used by the AP for scheduling of wireless device UL MU transmission. In some such embodiments, the communicated IDC information is communicated in a control subfield identified by (e.g., including) a control ID value indicating that a specified RU associated with the control ID value is a recommend RU.

In some embodiments, the communicated IDC information includes a list of one or more suggested RUs not to be used by the AP for scheduling of wireless device UL MU transmission. In some such embodiments, the communicated IDC information is communicated in a control subfield identified by (e.g., including) a control ID value indicating that a specified RU associated with the control ID value is not to be used by the AP when scheduling the wireless device for uplink transmissions.

In some embodiments, the communicated IDC information is communicated in a bandwidth query report (BQR). In some embodiments, the BQR includes a bitmap indicating the subchannels available at the first wireless device transmitting the BQR. In some such embodiments, each bit in the bitmap corresponds to a subchannel (e.g. 20 MHz subchannel) within an operating channel; and the value of each bit in the bitmap indicates whether a subchannel is: i) idle and the subchannel does not cause an IDC issue or ii) busy or unavailable or the device has IDC issues to use this sub-channel (e.g., value of 1 indicates sub-channel is available to be used for WiFi UL MU; value of 0 indicates sub-channel is not to be used for WiFi UL MU due to being busy, unavailable or IDC issue.)

In some embodiments, the communicated IDC information includes information indicating recommended unlicensed spectrum to be used as an alternative to unlicensed spectrum being used by the wireless device to communicate with the AP (e.g., the wireless device suggests use of an alternative set of 20 MHZ channels and/or different frequency band to be used, e.g., 2.4 GHZ, 5 GHZ or 6 GHZ).

Returning to step 1638, if the current IDC status does not indicate an actual or potential IDC problem, then operation proceeds from step 1638 to step 1646. In step 1646 the wireless device is operated to refrain from communicating IDC information to the access point. In some embodiments, step 1646 includes step 1648 in which the wireless device refrains from responding to the received IDCRP trigger frame.

Returning to step 1630, in step 1630 the wireless device monitors for data to be transmitted via WiFi to the access point. Step 1630 is performed repetitively on an ongoing basis. Step 1630 may, and sometimes does, include step 1632 in which the wireless device detects data to be transmitted via WiFi. Operation proceeds from step 1632, via connecting node B 1634 to step 1650. In step 1650 the wireless device determines if the current IDC status indicates an actual or potential IDC problem. If the current IDC status does not indicate a problem, then operation proceeds from step 1650 to step 1656; however, if the current IDC status indicates a problem, then operation proceeds from step 1650 to step 1652. In step 1652, the wireless device determines whether or not IDC avoidance information has been communicated to the AP. If the stored IDC avoidance information has been already communicated to the AP (e.g., in response to a trigger frame), then operation proceeds from step 1652 to step 1656; however, if the stored IDC avoidance information has not been communicated to the AP, then operation proceeds from step 1652 to step 1654. In step 1654 the wireless device sends IDC information, e.g., information identifying RUs and/or channels (e.g., 20 MHz channels) to be used for wireless device uplink communications and/or information identifying RUs or channels (e.g., 20 MHz channels) to be avoided, to the AP. Operation proceeds from step 1654 to step 1656.

In step 1656 the wireless device receives uplink control information, e.g., assignment information, from the AP. Operation proceeds from step 1656 to step 1658. In step 1658 the wireless device communicates data to the AP, e.g., using one or more of the recommended RUs or channel, while avoiding. RUs and/or channels to be avoided for IDC reasons.

Figures 17, 17A, 17B:
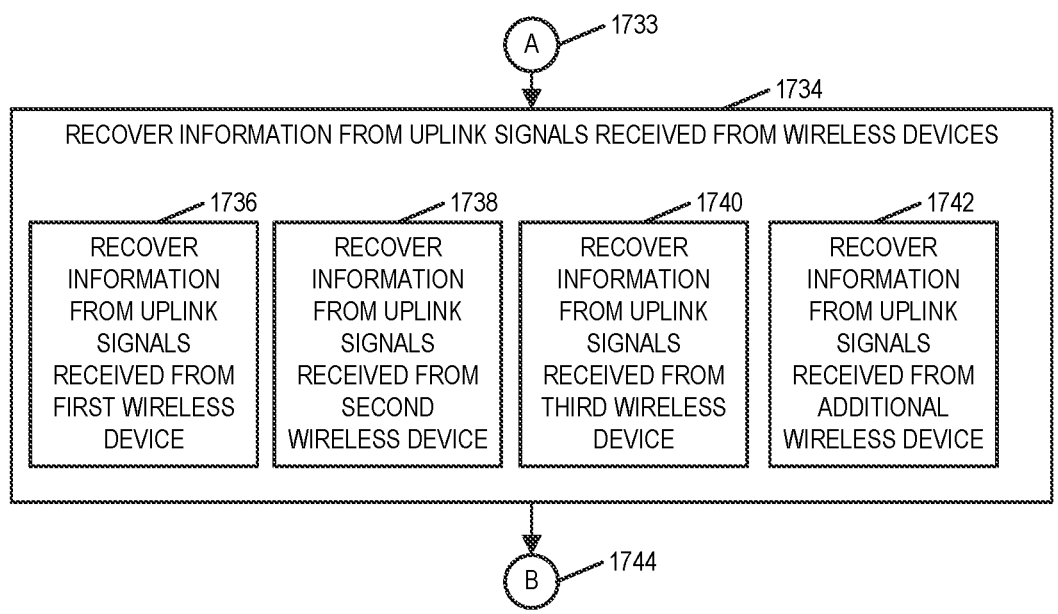
FIG. 17A is a first part of a flowchart of an exemplary method of operating an access point (AP) in accordance with an exemplary embodiment.
FIG. 17B is a second part of a flowchart of an exemplary method of operating an access point (AP) in accordance with an exemplary embodiment.
FIG. 17 comprises the combination of FIG. 17A and FIG. 17B.
Figure 17A:
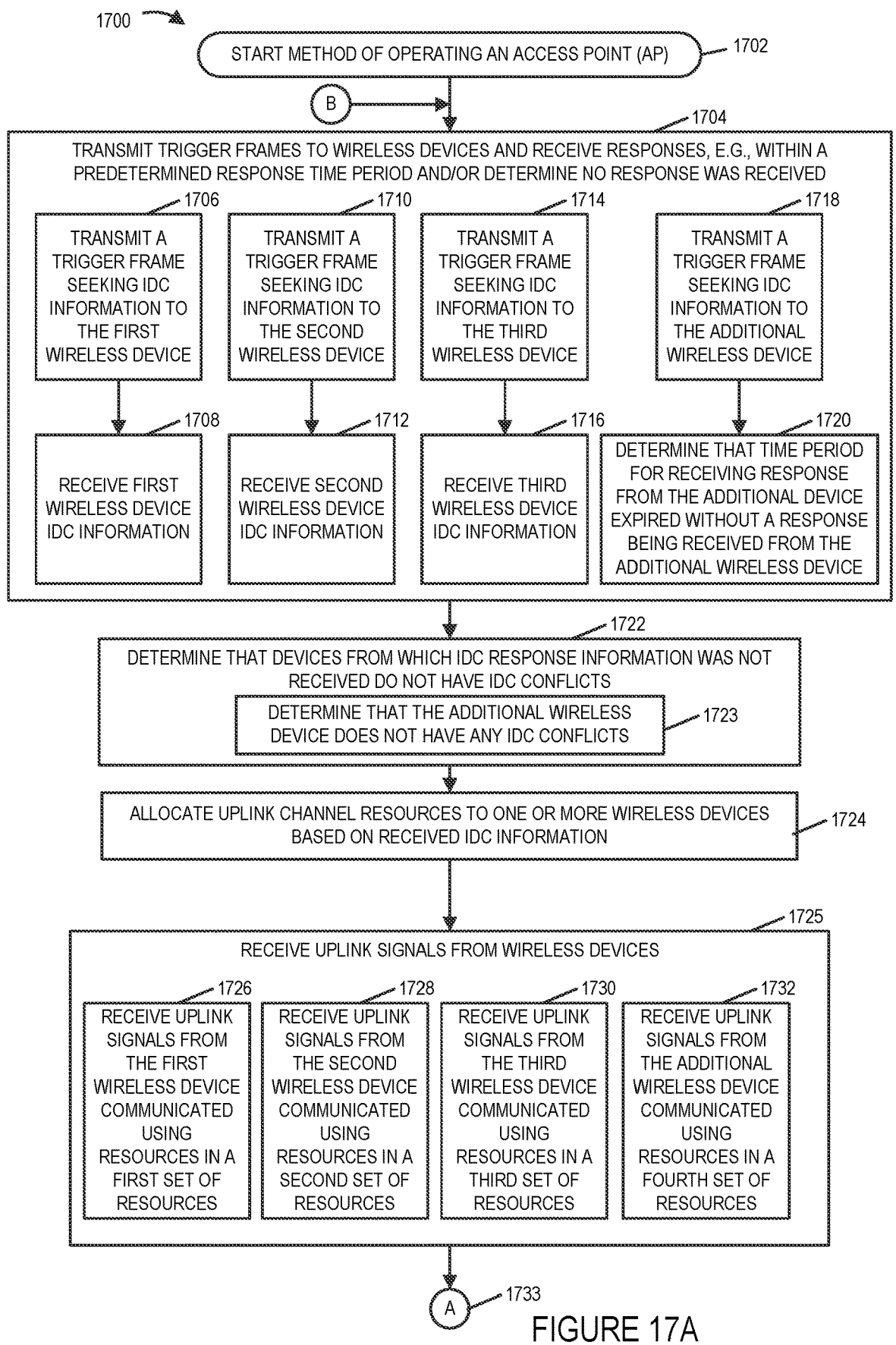

FIG. 17, comprising the combination of FIG. 17A and FIG. 17B is a flowchart 1700 of an exemplary method of operating an access point (AP), e.g., a WiFi AP supporting 802.11ax/be and IDC features in accordance with the present invention, in accordance with an exemplary embodiment.

Operation of the exemplary method starts in step 1702 in which the access point transmits trigger frame(s) to wireless devices and receives responses, e.g., within a predetermined response time period, and/or determines no response was received. Step 1704 includes steps 1706, 1708, 1710, 1712, 1714, 1716, 1718 and 1720.

In step 1706 the AP transmits a trigger frame seeking IDC information to a first wireless device. In some embodiments, transmitting the trigger frame to the first wireless device includes transmitting an IDC report poll (IDCRP) trigger frame. In some such embodiments, the IDC report poll trigger frame includes a trigger type subfield value in the range of 8 to 15, indicating that the trigger frame is an IDCRP trigger frame. Operation proceeds from step 1706 to step 1708, in which the AP receives first wireless device IDC information identifying (e.g., indicating to the base station) one or more of: i) resource units (RUs) which are preferred by the first wireless device for IDC reasons; ii) channels (e.g., 20 MHz sub-channels) which are preferred by the first wireless device for IDC reasons; iii) resource units (RUs) to be avoided by the first wireless device for IDC reasons, iv) channels (e.g., 20 MHz sub-channels) to be avoided by the first wireless device for IDC reasons.

In some embodiments, said step of receiving (1708) the first wireless device IDC information includes: receiving information including at least a first control ID value and a corresponding first control information subfield communicating first wireless device IDC information (see, e.g., FIG. 10, exemplary control ID values 7, 8, 9, 10, 11 and corresponding control information subfield content), said first control ID value indicating the type of IDC information communicated in a corresponding first control information subfield.

In some embodiments, said first wireless device IDC information further includes a duration information subfield indicating a duration (e.g., amount of time) for the first wireless device IDC information is to be used (e.g. how long it is remains valid and can be used by the AP in making uplink resource allocations to the second wireless device—this value is sometimes based on, e.g., coincides with, or matches the duration of a resource grant to the first wireless device that was made by a cellular base station).

In some embodiments, the first control ID value is a value (e.g., 7) indicating that the corresponding information subfield includes one or more RUs to be avoided and wherein the corresponding first control information subfield includes an identifier of an RU to be avoided or a list of identifiers of RUs to be avoided.

In some embodiments, the first control ID value is a value (e.g., 8) indicating that the corresponding information subfield includes one or more RUs which are preferred by the first wireless terminal for IDC reasons and wherein the corresponding first control information subfield includes an identifier of an RU which is preferred by the first wireless device or a list of identifiers of RUs which are preferred by the first wireless device.

In some embodiments, the first control ID value is a value (e.g., 9) indicating that the corresponding information subfield includes a set of sub-channels (e.g., a set of sub-channels potentially and in some cases including sub-channels which are not adjacent in frequency) which is a recommended set of subchannels and wherein the corresponding first control information subfield includes information identifying sub-channels which are preferred by the first wireless device for IDC reasons.

In some embodiments, the first control ID value is a value (e.g., 9) indicating that the corresponding first information subfield includes a set of sub-channels (e.g., a set of sub-channels potentially and in some cases including sub-channels which are not adjacent in frequency) which are being identified for IDC reasons.

In some such embodiment, the sub-channels included in said first corresponding sub-channel includes information identifying one or more sub-channels which are recommended for IDC reasons by the first wireless device or which are not recommended by the first wireless device.

In some such embodiments, the communicated IDC information includes an additional bit for each subchannel identified in the first information subfield, each additional bit indicating whether the identified sub-channel to which the additional bit corresponds is a recommended sub-channel or a sub-channel which is not recommended.

In some embodiments, the step of receiving (1708) the first wireless device IDC information includes: receiving information including multiple control ID values and corresponding control information subfields communicating first wireless device IDC information, said first control ID value being one of said multiple control ID values, said multiple ID values further including a second control ID value indicating i) that the corresponding information subfield includes one or more RUs which are preferred by the first wireless terminal for IDC reasons or ii) indicating that the corresponding first information subfield includes a set of sub-channels (e.g., a set of sub-channels potentially and in some cases including sub-channels which are not adjacent in frequency) which are being identified for IDC reasons (e.g., the received IDC information from the first wireless device may include some, all or any combination of the different types of IDC information listed in FIG. 10 and thus may an sometimes does include one, more or all of the IDC relates types of control values represented by control ID values 7, 8, 9 10, and 11 and the information corresponding to such values, e.g., control information subfield content).

In step 1710 the AP transmits a trigger frame seeking IDC information to a second wireless device. Operation proceeds from step 1710 to step 1712, in which the AP receives second wireless device IDC information identifying (e.g., indicating to the base station) one or more of: i) resource units (RUs) which are preferred by the second wireless device for IDC reasons; ii) channels (e.g., 20 MHz sub-channels) which are preferred by the second wireless device for IDC reasons; iii) resource units (RUs) to be avoided by the second wireless device for IDC reasons, iv) channels (e.g., 20 MHz sub-channels) to be avoided by the second wireless device for IDC reasons, said second wireless device information being different from said first wireless device information (as with the first wireless device information the second wireless device information may include one or more fields of IDC information communicating different types of IDC information based on the second wirelesses devices current operating conditions and expectations regarding cellular transmitter or receiver use at the second wireless device). In some embodiments, said second wireless device IDC information further includes a duration information subfield (identified, e.g., by control ID values 11) indicating a duration (e.g., amount of time) for the second wireless device IDC information is to be used (e.g. how long it is remains valid and can be used by the AP in making uplink resource allocations to the second wireless device—this value is sometimes based on, e.g., coincides or matches, the duration of a resource grant to the second wireless device that was made by a cellular base station).

In step 1714 the AP transmits a trigger frame seeking IDC information to a third wireless device. Operation proceeds from step 1714 to step 1716, in which the AP receives third wireless device IDC information identifying (e.g., indicating to the base station) one or more of: i) resource units (RUs) which are preferred by the third wireless device for IDC reasons; ii) channels (e.g., 20 MHZ sub-channels) which are preferred by the third wireless device for IDC reasons; iii) resource units (RUs) to be avoided by the third wireless device for IDC reasons, iv) channels (e.g., 20 MHZ sub-channels) to be avoided by the third wireless device for IDC reasons, said third wireless device information being different from said first and second wireless device information (as with the first wireless device information and second wireless device information, the third wireless device information may include one or more fields of IDC information communicating different types of IDC information based on the third wirelesses devices current operating conditions and expectations regarding cellular transmitter or receiver use at the third wireless device.

In step 1718 the AP transmits a trigger frame seeking IDC information to an additional wireless device. Operation proceeds from step 1718 to step 1720, in which the AP determines that the time period for receiving a response from the additional wireless device has expired with a response being received from the additional wireless device.

In some embodiments, the same trigger frame seeking IDC information is transmitted to one or more or all of: the first, second, third, and additional wireless devices (in steps 1708, 1710, 1714, 1716), e.g., as a multicast signal. Operation proceeds from step 1704 to step 1722.

In step 1722 the AP determine that devices from which IDC response information was not received does not have any IDC conflicts. Step 1722 includes step 1723 in which the AP determines that the additional wireless device does not have any IDC conflicts based on the fact that a response to the trigger frame was not received. Operation proceeds from step 1722 to step 1724.

In step 1724 the AP allocates channel resources to one or more wireless devices based on the received IDC information, said one or more wireless devices including said first wireless device, said received IDC information including said first wireless device in-device coexistence (IDC) information. In some embodiments, said step of allocating (1724) uplink channel resources to one or more wireless devices based on received IDC information includes allocating resources to the additional wireless device without regard to possible IDC conflicts in the additional device.

In some embodiments, said step of allocating (1724) uplink channel resources to one or more wireless devices based on received IDC information includes: allocating a first set of RUs to the first wireless device to be used during a first time period, said first set of RUs including at least some RUs indicated by the first wireless device IDC information to be RUs preferred by the first wireless device.

In some embodiments, allocating (1724) uplink channel resources to one or more wireless devices based on received IDC information includes: intentionally omitting from the first set of RUs allocated to the first wireless device to be used during the first time period RUs which are indicated by the first wireless device IDC information to be RUs to be avoided by the first wireless device.

In some embodiments, allocating (1724) uplink channel resources to one or more wireless devices based on received IDC information includes: allocating a second set of RUs to the second wireless device to be used during the first time period, said second set of RUs including at least some RUs indicated by the second wireless device IDC information to be RUs preferred by the second wireless device.

In some embodiments, allocating (1724) uplink channel resources to one or more wireless devices based on received IDC information includes: omitting from the first second set of RUs allocated to the second wireless device to be used during the first time period RUs which are indicated by the second wireless device IDC information to be RUs to be avoided by the second wireless device.

In some embodiments, allocating (1724) uplink channel resources to one or more wireless devices based on received IDC information includes allocating a third set of RUs to the third wireless device to be used during the first time period, said third set of RUs including at least some RUs indicated by the third wireless device IDC information to be preferred RUs, said third set of RU's including different RUs than those included in the first and second sets of RUs.

In some embodiments, allocating (1724) uplink channel resources to one or more wireless devices based on received IDC information includes: omitting, from the third set of RUs allocated to the third wireless device to be used during the first time period, RUs which are indicated by the third wireless device IDC information to be RUs to be avoided by the third wireless device.

In some embodiments, allocating (1724) uplink channel resources to one or more wireless devices based on received IDC information includes: allocating a first set of RUs to the first wireless device to be used during a first time period, said first set of RUs intentionally omitting RUs which are indicated by the first wireless device IDC information to be RUs to be avoided by the first wireless device.

In some embodiments, allocating (1724) uplink channel resources to one or more wireless devices based on received IDC information includes: allocating a second set of RUs to the second wireless device to be used during the first time period, said second set of RUs intentionally omitting RUs which are indicated by the second wireless device IDC information to be RUs to be avoided by the first wireless device.

In some embodiments, allocating (1724) uplink channel resources to one or more wireless devices based on received IDC information includes: allocating a third set of RUs to the third wireless device to be used during the first time period, said third set of RUs intentionally omitting RUs which are indicated by the third wireless device IDC information to be RUs to be avoided by the first wireless device.

In some embodiments, allocating (1724) uplink channel resources to one or more wireless devices based on received IDC information includes: allocating a first set of sub-channels to the first wireless device to be used during a first time period, said first set of sub-channels including at least some sub-channels indicated by the first wireless device IDC information to be sub-channels preferred by the first wireless device.

In some embodiments, allocating (1724) uplink channel resources to one or more wireless devices based on received IDC information includes: intentionally omitting from the first set of sub-channels allocated to the first wireless device to be used during the first time period sub-channels which are indicated by the first wireless device IDC information to be sub-channels to be avoided by the first wireless device.

In some embodiments, allocating (1724) uplink channel resources to one or more wireless devices based on received IDC information includes: allocating a second set of sub-channels to the second wireless device to be used during the first time period, said second set of sub-channels including at least some sub-channels indicated by the second wireless device IDC information to be RUs preferred by the second wireless device.

In some embodiments, allocating (1724) uplink channel resources to one or more wireless devices based on received IDC information includes: omitting from the second set of sub-channels allocated to the second wireless device to be used during the first time period sub-channels which are indicated by the second wireless device IDC information to be sub-channels to be avoided by the second wireless device.

In some embodiments, allocating (1724) uplink channel resources to one or more wireless devices based on received IDC information includes allocating a third set of sub-channels to the third wireless device to be used during the first time period, said third set of sub-channels including at least some sub-channels indicated by the third wireless device IDC information to be preferred sub-channels, said third set of sub-channels including different sub-channels than those included in the first and second sets of sub-channels.

In some embodiments, allocating (1724) uplink channel resources to one or more wireless devices based on received IDC information includes: omitting, from the third set of sub-channels allocated to the third wireless device to be used during the first time period, sub-channels which are indicated by the third wireless device IDC information to be sub-channels to be avoided by the third wireless device.

Operation proceeds from step 1724 to step 1725. In step 1725 the AP receives uplink signals from wireless devices. Step 1725 includes steps 1726, 1728, 1730 and 1732.

In step 1726 the AP receives uplink signal from the first wireless communications device communicated (e.g., during a first period of time) using resources in a first set of resources. In step 1728 the AP receives uplink signal from the second wireless communications device communicated (e.g., during the first period of time) using resources in a second set of resources. In step 1730 the AP receives uplink signal from the first wireless communications device communicated (e.g., during the first period of time) using resources in a third set of resources. In step 1732 the AP receives uplink signal from the additional wireless communications device communicated (e.g., during the first period of time) using resources in a fourth set of resources. Operation proceeds from step 1725, via connecting node A 1733 to step 1734.

In step 1734 the AP recovers information from uplink signals received from wireless devices. Step 1734 includes steps 1736, 1738, 1740 and 1742. In step 1736 the AP recovers information from uplink signals received from the first wireless device. In step 1738 the AP recovers information from uplink signals received from the second wireless device. In step 1740 the AP recovers information from uplink signals received from the third wireless device. In step 1742 the AP recovers information from uplink signals received from the additional wireless device.

Figure 18:
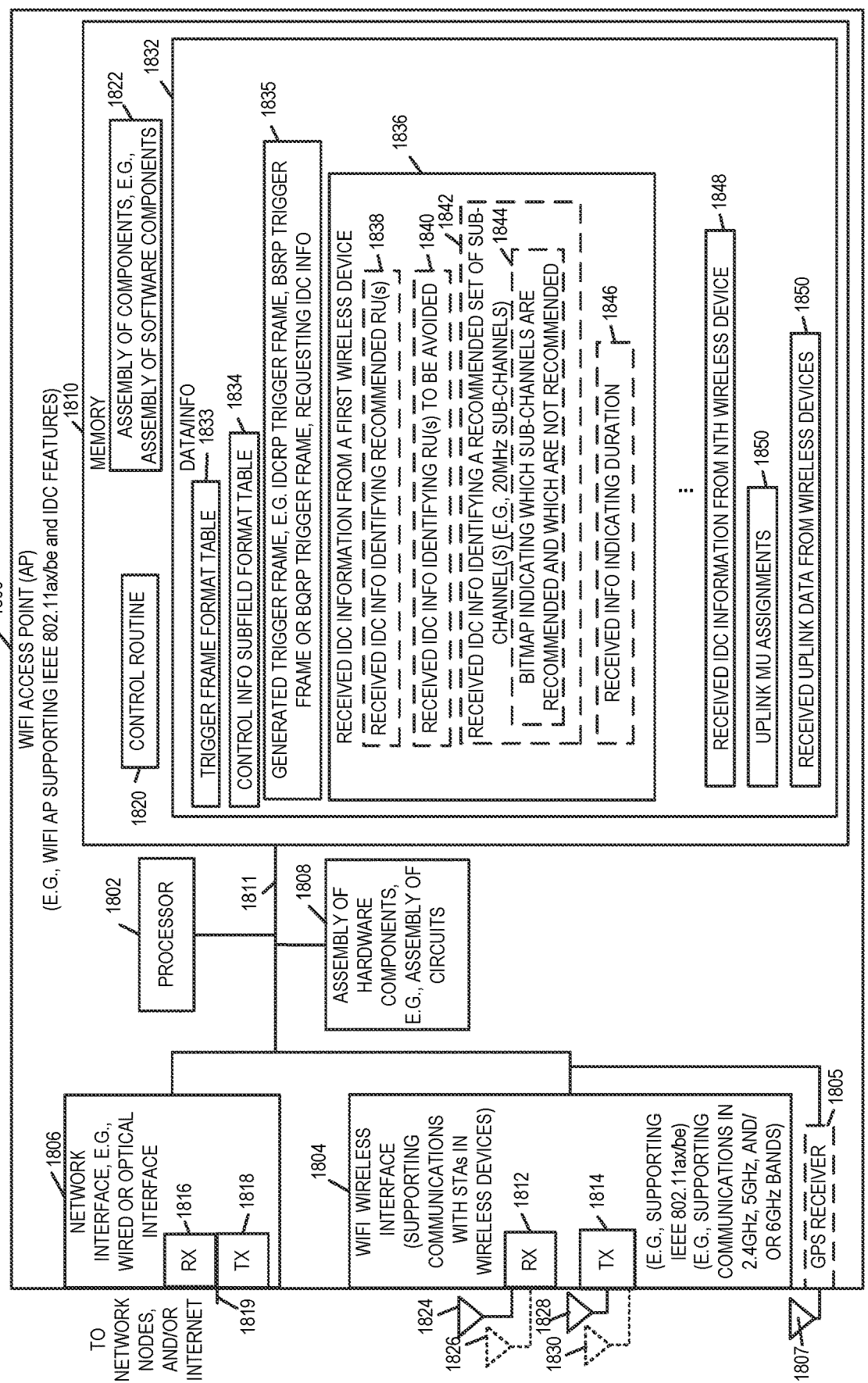
FIG. 18 is a drawing of an exemplary WiFi access point (AP), e.g., a WiFi access point supporting IEEE 802.11ax/be and IDC features of the present invention, in accordance with an exemplary embodiment.

FIG. 18 is a drawing of an exemplary WiFi access point (AP) 1800, e.g., a WiFi access point supporting IEEE 802.11ax/be and IDC features of the present invention, in accordance with an exemplary embodiment. Exemplary AP 1800 includes a processor 1802, e.g., a CPU, a WiFi wireless interface 1804, supporting wireless communication with stations (STAs) in wireless devices, a network interface 1806, e.g., a wired or optical interface, an assembly of hardware components 1808, e.g., an assembly of circuits, and memory 1810 coupled together via a bus 1911 over which the various elements may interchange data and information. In some embodiments, the AP 1800 further includes a GPS receiver 1805 coupled to GPS antenna 1807, via which the GPS receiver 1805 receives GPS signals from satellites. The GPS receiver 1805 is coupled to bus 1811. In some embodiments, the GPS receiver 1405 determines the AP's geo-location and height. In other embodiments, the AP's geo-location and height are determined during installation and installed in the memory 1810 of the AP 1800.

Network interface 1806 includes a receiver 1816 and a transmitter 1818. The receiver 1816 and transmitter 1818 are coupled via output interface connector 1819 and a backhaul other network nodes, and/or the Internet.

WiFi wireless interface 1804 includes a wireless receiver 1812 coupled to one or more receive antennas or antenna elements (1824, . . . , 1826) and a wireless transmitter 1814 coupled to one or more transmit antennas or antenna elements (1828, . . . , 1830). In some embodiments, WiFi interface 1804 supports IEEE 802.11ax/be and IDC features in accordance with the present invention. In some embodiments, wireless interface 1804 supports communications in one or more or all of: 2.4 GHz band, 5 GHz band and 6 GHz band, e.g. using unlicensed spectrum. Exemplary uplink signals received by wireless receiver 1812 includes uplink signals conveying IDC control information, and uplink data signals. Exemplary signals transmitted by wireless transmitter 1814 include signals conveying trigger based frames, e.g. a in-device coexistence report poll (IDCRP) trigger frame, and assignments signals conveying assignments for uplink MU resources.

Memory 1810 includes a control routine 1820, e.g., for control basic functions of the AP 1400, e.g., memory read/write, etc. initialization, etc., an assembly of components 1822, e.g., an assembly of software components 1822, and data/information 1832.

Data/information 1832 include a trigger frame format table 1833, e.g., used to generate trigger frames to be sent to wireless devices (e.g., STAs), a control information subfield format table 1834, e.g., used to decode received signals conveying control information subfields from wireless devices (e.g., STAs). An exemplary trigger frame format table is table 900 of FIG. 9. An exemplary control information subfield format table is table 1000 of FIG. 10.

Data/information 1832 further includes a generated trigger frame, e.g., an IDCRP trigger frame, a BSPR trigger frame, or a BQRP trigger frame requesting IDC information and received IDC information from a plurality of wireless devices (received IDC information from a first wireless device 1836, . . . , received IDC information from an Nth wireless device. Received IDC information from a first wireless device 1836 includes one or more or all of: received IDC information identifying recommended resource unit(s) (RU(s)) 1838, received IDC information identifying RU(s) to be avoided 1840, received IDC information identifying a recommended set of sub-channels, e.g., 20 MHz sub-channels 1842, and received information including duration 1846 for which the IDC information is considered relevant and/or is to be used. In some embodiments, the received IDC information identifying a recommended set of subchannels 1842 includes a bitmap indicating which sub-channels are recommended and which are not recommended. Data/information 1832 further includes uplink multi-user (UL MU) assignments 1850, e.g., which take into consideration received IDC information from wireless devices, and received uplink data from wireless devices 1850.

Figure 19:
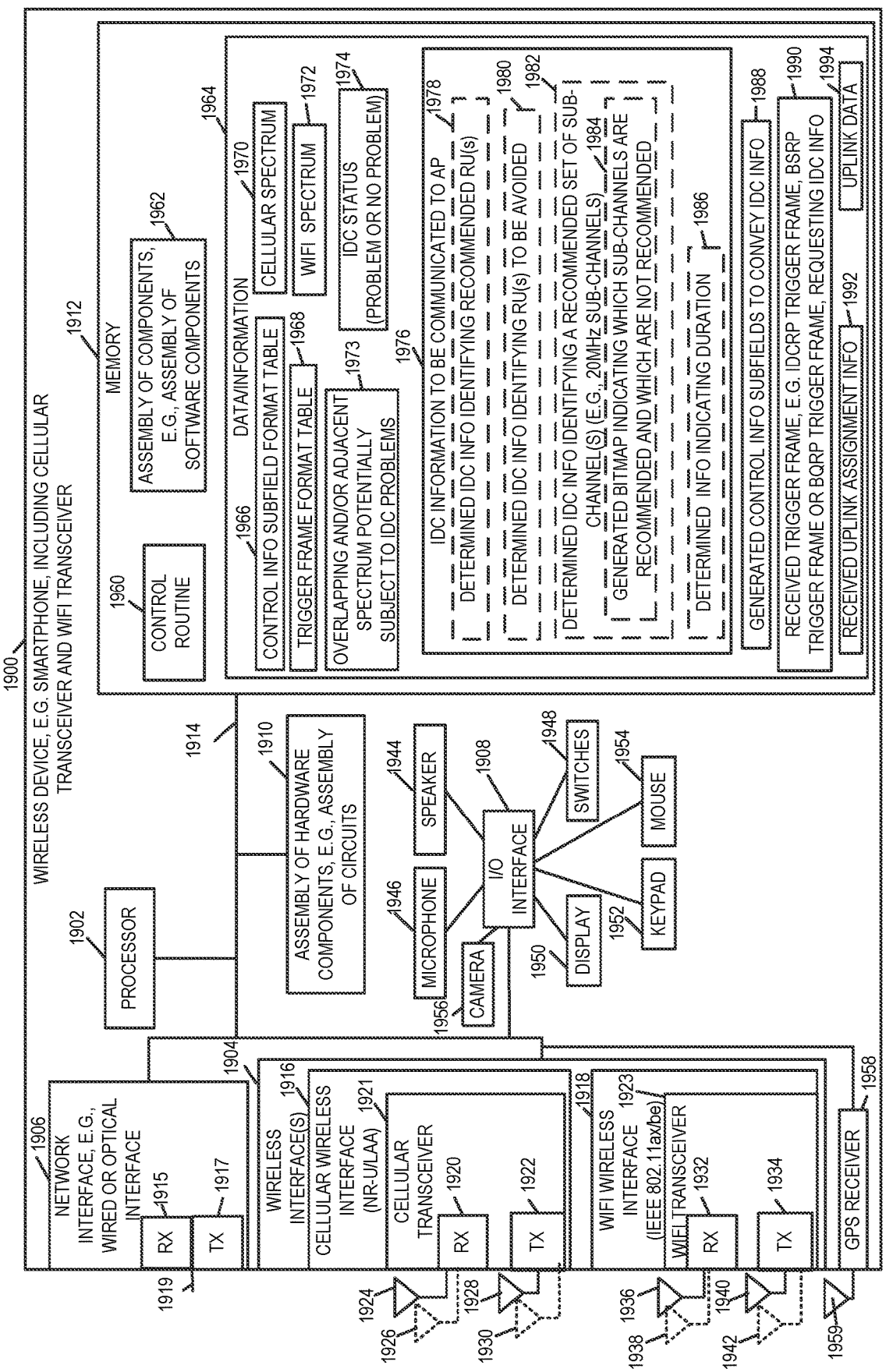
FIG. 19 is a drawing of an exemplary wireless device including a cellular transceiver and a WiFi transceiver, e.g., a wireless device including a cellular transceiver which supports 3GPP NR-U/LAA and a WiFi transceiver which supports IEEE 802.11ax/be, and IDC features of the present invention, in accordance with the exemplary embodiment.

FIG. 19 is a drawing of an exemplary wireless device 1900 including a cellular transceiver 1921 and a WiFi transceiver 1923, e.g., a wireless device including a cellular transceiver which supports 3GPP NR-U/LAA and a WiFi transceiver which supports IEEE 802.11ax/be, and IDC features of the present invention, in accordance with the exemplary embodiment.

Exemplary STA 1900 includes a processor 1902, e.g., a CPU, wireless interface(s) 1904, a network interface 1906, a GPS receiver 1958, an I/O interface 1908, an assembly of hardware components 1910, e.g., an assembly of circuits, and memory 1912, coupled together via a bus 1914 over which the various elements may interchange data and information.

Wireless interface(s) 1904 includes cellular wireless interface 1916 and WiFi wireless interface 1918. In some embodiments, the wireless interfaces 1916, 1918 supports wireless communications in unlicensed 6 GHz. In some embodiments, the wireless interfaces 1916, 1918 supports wireless communications in unlicensed 5 GHz. Spectrum used, by the wireless device 1900, for cellular communications, e.g., NR-U communications and spectrum used, by the wireless device 1900, for WiFi communications, e.g., IEEE 802.11ax/be based communications, may be overlapping or adjacent, e.g., potentially resulting in IDC issues. Wireless device 1900 may, and sometimes does determine that there is expected or actual in-device coexistence (IDC) problems between the cellular and WiFi communications. Cellular wireless interface 1916, e.g., a wireless interface for communicating with a NR-U gNB or LAA gNB, includes a cellular transceiver 1921 including a cellular wireless receiver 1920 and cellular wireless transmitter 1922. Wireless receiver 1920 is coupled to one or more receive antennas or antenna elements (1924, . . . , 1926) via which the wireless device 1900 can receive downlink signals, e.g., from a NRU gNB. Wireless transmitter 1934 is coupled to one or more transmit antennas or antenna elements (1928, . . . , 1930) via which the wireless device 1900 can transmit uplink signals, e.g., to an NRU gNB.

WiFi wireless interface 1918, e.g., a wireless interface for communicating with a WiFi AP using 802.11ax/be based protocols or similar protocols, includes WiFi transceiver 1923 which includes wireless receiver 1932 and wireless transmitter 1934. In some embodiments, the WiFi transceiver 1923 supports operation in one of a 2.4 GHz band, a 5 GHz band, or a 6 GHz band. In some embodiments, the WiFi transceiver supports operation in two or more of a 2.4 GHz band, a 5 GHz band, or a 6 GHz band. In some such embodiments, the WiFi transceiver 1923 supports multi-link operation. Wireless WiFi receiver 1932 is coupled to one or more receive antennas or antenna elements (1936, . . . , 1938) via which the wireless device 1900 can receive downlink signals, e.g., from a WiFi AP. Wireless WiFi transmitter 1934 is coupled to one or more transmit antennas or antenna elements (1940, . . . , 1942) via which the wireless transmitter 1934 can transmit uplink signals, e.g., to a WiFi AP.

Network interface 1906, e.g., a wired or optical interface, includes a receiver 1915 and a transmitter 1917. The receiver 1915 and transmitter 1917 are coupled to connector 1919 via which the network interface 1906 can be coupled to a wired or optical link to a local network and/or the Internet, e.g., when the wireless device 1900 is at a site where such a link is available.

Wireless device 1900 further includes a plurality of I/O devices (speaker 1944, microphone 1946, switches 1948, display 1950, e.g., a touchscreen display, keypad 1952, mouse 1954 and camera 1956) coupled to I/O interface 1908, which couples each of the I/O devices to bus 1914 and to other elements in wireless device 1900.

Memory 1912 includes a control routine 1960 for performing basic control operations, e.g., read/write operation, controlling I/O devices, etc., an assembly of components 1962, e.g., an assembly of software components, and data/information 1964.

Data/information 1964 includes a control information subfield format table 1966, e.g., table 1000 of FIG. 10, e.g., for generating control information subfields including control information subfields conveying IDC information, in uplink signals to an AP, a trigger frame format table 1968, e.g., table 900 of FIG. 9, e.g., for decoding received trigger frames, e.g., including a received IDCRP trigger frame requesting the wireless device 1900 to send IDC information. Data/information 1964 further includes information identifying cellular spectrum 1970, e.g. NR-U spectrum being used by the wireless device 1900 to communicated with a cellular base station, WiFi spectrum 1972, e.g., WiFi spectrum being used by the wireless device 1900 to communicate with a WiFi AP, information identifying overlapping or adjacent spectrum potentially subject to IDC problems 1973, and IDC status (or state) information 1974, e.g., indicating an IDC problem exists or indicating no IDC problem exists.

Data/information 1964 further includes IDC information to be communicated to an AP 1976, generated control information subfield(s) to convey IDC information 1988, a received trigger frame 1990, e.g., an IDCRP trigger frame, a BSRP trigger frame. or a BQRP trigger frame, requesting that the wireless device 1900 send IDC information to the AP, received uplink assignment information 1992, and uplink data 1994 to be transmitted to the AP. IDC information to be communicated to the AP 1976 includes determined IDC information identifying recommended resource unit(s) (RU(s)) 1978, determined IDC information identifying RU(s) to be avoided 1980, determined IDC information identifying a recommended set of sub-channels, e.g., 20

MHz sub-channels 1982, and determined information including duration 1986 for which the reported IDC information is considered relevant and/or is to be used. In some embodiments, the determined IDC information identifying a recommended set of subchannels 1982 includes a bitmap indicating which sub-channels are recommended and which are not recommended.

Figure 20:
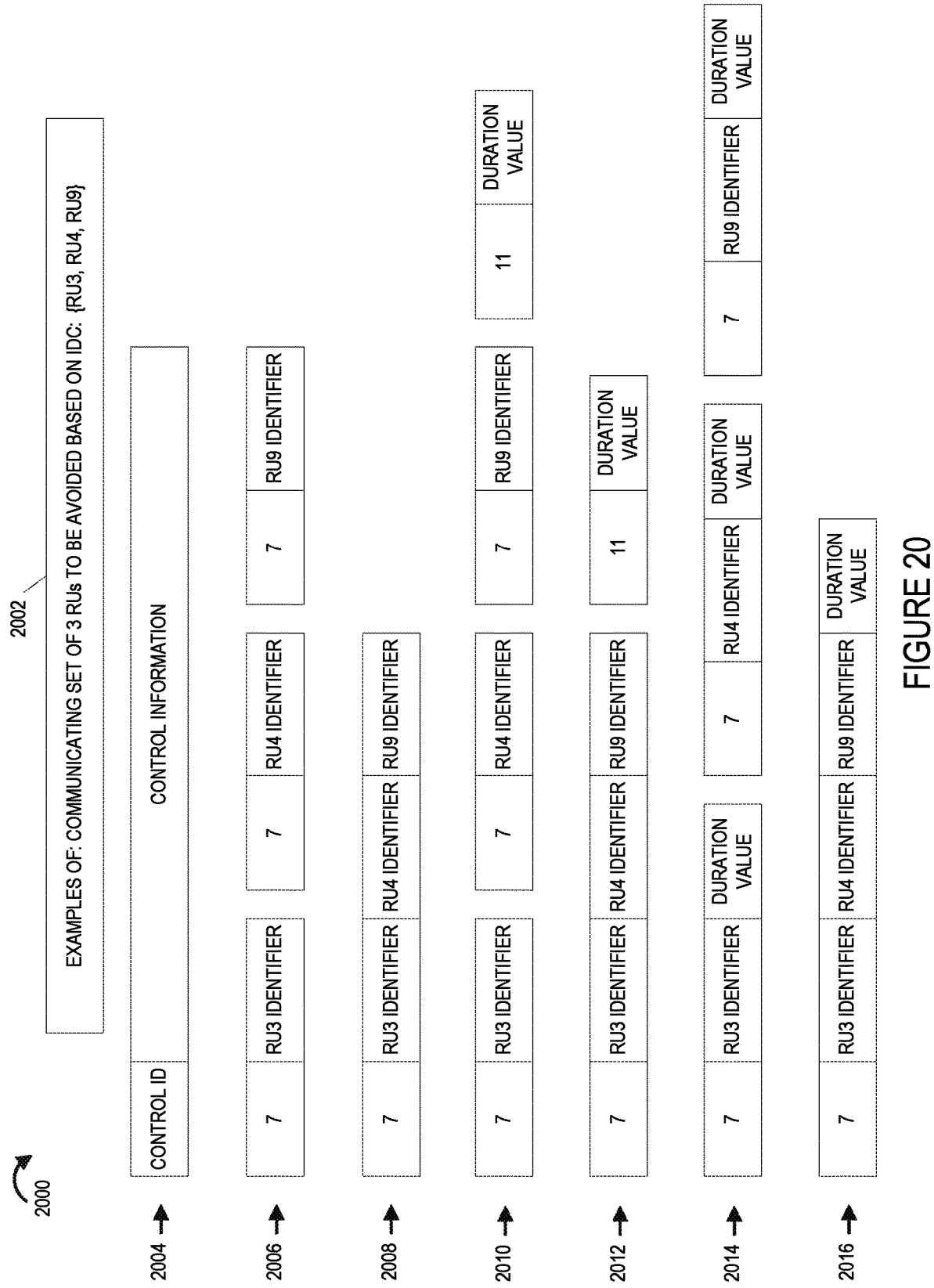
FIG. 20 is a drawing illustrating examples of communicating control subfields communicating in-device coexistence (IDC) information indicating resource units to be avoided and optionally indicating corresponding duration information, in accordance with various exemplary embodiments.

FIG. 20 is a drawing 2000 illustrating examples of communicating control subfields communicating in-device coexistence (IDC) information indicating resource units to be avoided and optionally indicating corresponding duration information, in accordance with various exemplary embodiments. The examples of FIG. 20 involve communicating control information indicating 3 indexed resource units (RUs) to be avoided, which is the set of RUs={RU3, RU4, RU9}, as indicated by box 2002.

Row 2004 illustrates the basic control subfield format, which includes a control ID portion (e.g., 4 bits) and a control information portion. (See FIG. 7). Table 1000 of FIG. 10 lists control ID values and corresponding control information meanings. In the example of FIG. 20, control ID value=7 is used to indicate that the following control information field will include RU(s) to be avoided, and control ID value=11 is used to indicate that the following control information field will include duration information.

In the example, of row 2006, each RU to be avoided is indicated independently. In the example of row 2008, the set of RUs to be avoided are indicated as a list.

In the example of row 2010 each RU to be avoided is indicated independently, and then a duration information subfield is included. In the example of row 2012, the set of RUs to be avoided are indicated as a list, and then a duration information subfield is included.

In the example of row 2014, each RU to be avoided is indicated independently with a duration value control information subfield appended at the end. In the example of row 2016, the set of RUs to be avoided are indicated as a list, with a duration control information subfield appended at the end.

Figure 21:
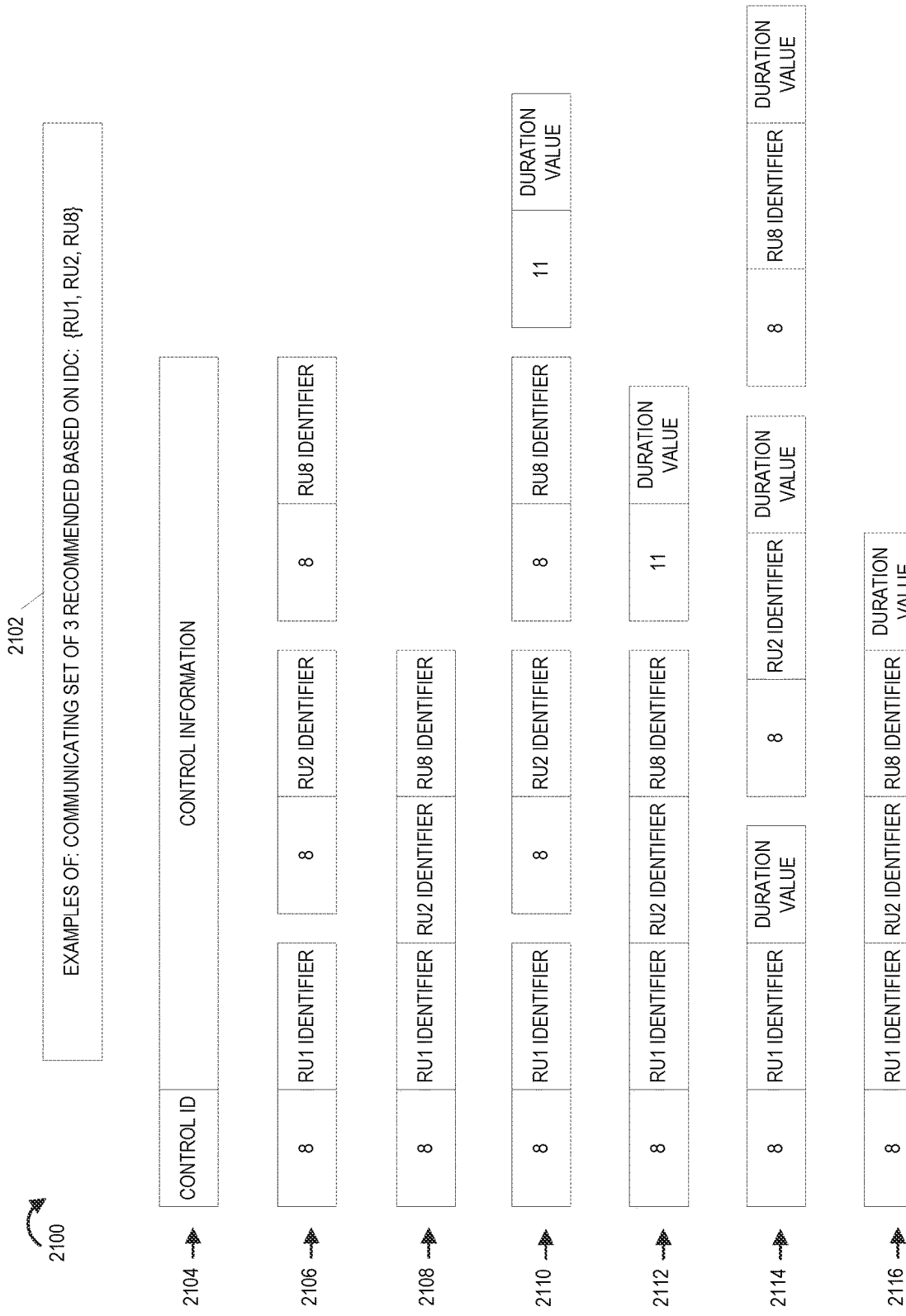
FIG. 21 is a drawing illustrating examples of communicating control subfields communicating in-device coexistence (IDC) information indicating recommended resource units to be used and optionally indicating corresponding duration information, in accordance with various exemplary embodiments.

FIG. 21 is a drawing 2100 illustrating examples of communicating control subfields communicating in-device coexistence (IDC) information indicating recommended resource units to be used and optionally indicating corresponding duration information, in accordance with various exemplary embodiments. The examples of FIG. 21 involve communicating control information indicating 3 indexed recommended resource units (RUs) to be used, which is the set of RUs={RU1, RU2, RU8}, as indicated by box 2102

Row 2104 illustrates the basic control subfield format, which includes a control ID portion (e.g., 4 bits) and a control information portion. (See FIG. 7). Table 1000 of FIG. 10 lists control ID values and corresponding control information meanings. In the example of FIG. 21, control ID value=8 is used to indicate that the following control information field will include recommended RU(s) to be used, and control ID value=11 is used to indicate that the following control information field will include duration information.

In the example, of row 2106, each recommend RU is indicated independently. In the example of row 2108, the set of recommended RUs to be used are indicated as a list.

In the example of row 2110 each recommended RU is indicated independently, and then a duration information subfield is included. In the example of row 2212, the set of recommended RUs to be used are indicated as a list, and then a duration information subfield is included.

In the example, of row 2114, each recommended RU to be used is indicated independently with a duration value control information subfield appended at the end. In the example of row 2116, the set of recommended RUs to be used are indicated as a list, with a duration control information subfield appended at the end.

Figure 22:
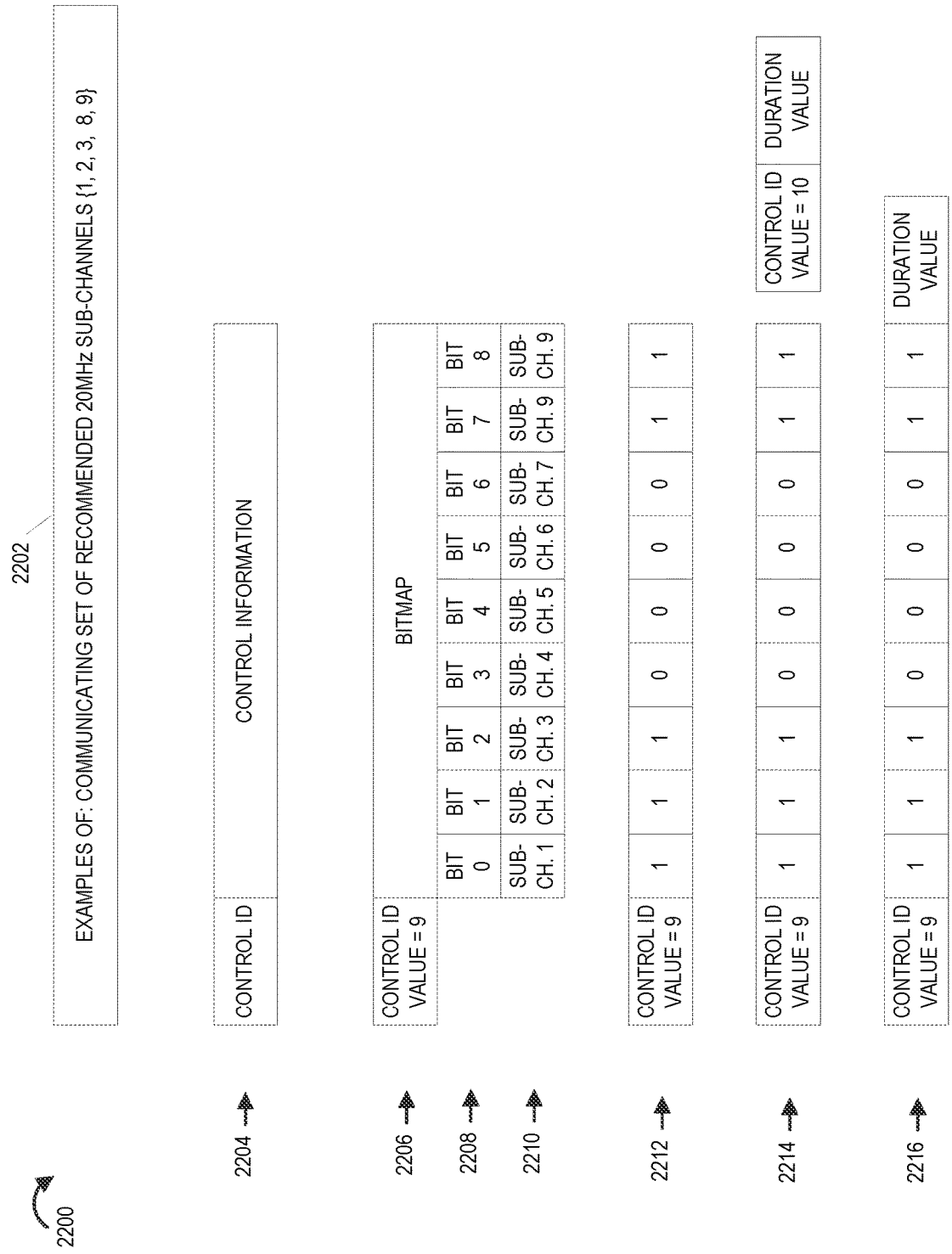
FIG. 22 is a drawing illustrating examples of communicating control subfields communicating in-device coexistence (IDC) information indicating a set of recommended 20 MHz sub-channels and optionally indicating corresponding duration information, in accordance with various exemplary embodiments.

FIG. 22 is a drawing 2200 illustrating examples of communicating control subfields communicating in-device coexistence (IDC) information indicating a set of recommended 20 MHz sub-channels and optionally indicating corresponding duration information, in accordance with various exemplary embodiments. The examples of FIG. 22 involve communicating control information indicating the set of recommended sub-channels={1, 2, 3, 8, 9}, as indicated by box 2202.

Row 2004 illustrates the basic control subfield format, which includes a control ID portion (e.g., 4 bits) and a control information portion. (See FIG. 7). Table 1000 of FIG. 10 lists control ID values and corresponding control information meanings. In the example of FIG. 22, control ID value=9 is used to indicate that the following control information field will include a recommended set of 20 MHz sub-channels, and control ID value=11 is used to indicate that the following control information field will include duration information.

Row 2206 indicates that a control ID value=9 will be followed by a 9 bit bitmap. Rows 2208 lists each bit of the bitmap, and row 2210 lists each corresponding sub-channel, respectively. Thus, bit 0 maps to sub-channel 1; bit 1 maps to sub-channel 2; bit 3 maps to sub-channel 4; bit 4 maps to sub-channel 5; bit 5 maps to sub-channel 6; bit 6 maps to sub-channel 7; bit 7 maps to sub-channel 8; and bit 8 maps to sub-channel 9.

In the example, of row 2212, the control ID value=9 is followed by the bitmap pattern of 111000011, indicating that sub-channels 1, 2, 3, 8, and 9 are recommended and sub-channels 4, 5, 6, 7 and not recommended.

In the example, of row 2214, the control ID value=9 is followed by the bitmap pattern of 111000011, indicating that sub-channels 1, 2, 3, 8, and 9 are recommended and sub-channels 4, 5, 6, 7 and not recommended. Then a duration information subfield (including control ID value=11 and control information conveying a duration value is communicated.

In the example, of row 2216, the control ID value=9 is followed by the bitmap pattern of 111000011, indicating that sub-channels 1, 2, 3, 8, and 9 are recommended and sub-channels 4, 5, 6, 7 and not recommended, and a control information subfield conveying a duration value is appended at the end.

FIG. 23 is a drawing 2300 illustrating various examples of communicating control subfields communicating in-device coexistence (IDC) information indicating recommended unlicensed spectrum, optionally indicating recommended sub-channels within the recommended unlicensed spectrum (as indicated by box 2302), in accordance with various exemplary embodiments.

Row 2304 illustrates the basic control subfield format, which includes a control ID portion (e.g., 4 bits) and a control information portion. (See FIG. 7). Table 1000 of FIG. 10 lists control ID values and corresponding control information meanings. In the example of FIG. 23, control ID value=10 is used to indicate that the following control information field will include information indicating recommended unlicensed spectrum (one of 2.4 GHz, 5 GHz, or 6 GHz) and optionally including a bitmap indicating recommended sub-channels within the recommended spectrum, and control ID value=11 is used to indicate that the following control information field will include duration information.

Row 2306 indicates that a control ID value=90 will be followed by 2 bit of control information indicating the recommended unlicensed spectrum, and optionally by a 9 bit sub-channel bitmap used to indicate which sub-channels within the recommended spectrum are recommended and which are not recommended. Row 2308 lists each bit of the bitmap, and row 2310 lists each corresponding sub-channel, respectively. Thus, bit 0 maps to sub-channel 1; bit 1 maps to sub-channel 2; bit 3 maps to sub-channel 4; bit 4 maps to sub-channel 5; bit 5 maps to sub-channel 6; bit 6 maps to sub-channel 7; bit 7 maps to sub-channel 8; and bit 8 maps to sub-channel 9.

In the example of row 2312 the control ID value=10 is followed by 2 spectrum ID bits=00, indicating that 2.4 GHz unlicensed spectrum is being recommended to be used.

In the example of row 2314 the control ID value=10 is followed by 2 spectrum ID bits=01, indicating that 5 GHz unlicensed spectrum is being recommended to be used.

In the example of row 2316 the control ID value=10 is followed by 2 spectrum ID bits=10, indicating that 6 GHz unlicensed spectrum is being recommended to be used.

In the example of row 2318 the control ID value=10 is followed by 2 spectrum ID bits=10, indicating that 6 GHz unlicensed spectrum is being recommended to be used, and is followed by the bitmap pattern of 000111101, indicating that sub-channels 4, 5, 6, 7, and 9 of the 6 GHz unlicensed spectrum are recommended and channels 1, 2, 3, and 8 of the 6 GHz unlicensed spectrum are not recommended.

In some embodiments, a control subfield conveying duration information is communicated following the recommended unlicensed spectrum control subfield. In some embodiments, a subfield conveying a recommended duration is appended to the end of the recommended unlicensed spectrum control subfield.

Wi-Fi is used to refer to a family of wireless network protocols, based on the IEEE 802.11 family of standards, which are commonly used for local area networking of devices and Internet access, allowing nearby digital devices to exchange data by radio wave.

A transceiver is a combined radio transmitter and receiver commonly implemented as a single unit. In a transceiver the transmitter and receiver components sometimes, but not always, share some circuit components.

First Numbered List of Exemplary Method Embodiments

Method Embodiment 1. A method of operating a first wireless device including a cellular transceiver and a WiFi transceiver, the method comprising: detecting (1608) an actual or potential in-device coexistence (IDC) problem in said first wireless device; performing (1614) one or more of: i) identifying resource units (RUs) which are preferred for IDC reasons; ii) identifying channels (e.g., 20 MHZ sub-channels) which are preferred for IDC reasons; iii) identifying resource units (RUs) to be avoided for IDC reasons, iv) identifying channels (e.g., 20 MHZ sub-channels) to be avoided for IDC reasons; and communicating (1643) IDC information to an access point.

Method Embodiment 1A. The method of Method Embodiment 1, wherein the identified resource units are for subsequent uplink or downlink multiuser communications.

Method Embodiment 1B. The method of Method Embodiment 1, wherein the identified channels are channels to be used for subsequent uplink or downlink multiuser communications.

Method Embodiment 1C. The method of Method Embodiment 1, wherein the identified resource units to be avoided in subsequent uplink or downlink multiuser communications.

Method Embodiment 1D. The method of Method Embodiment 1, wherein the identified channels to be avoided are in subsequent uplink or downlink communications.

Method Embodiment 2. The method of Method Embodiment 1, wherein the communicated IDC information includes one, more than one, or all of: i) resource units (RUs) which are preferred by the first wireless device for IDC reasons (e.g., the identified preferred RUs); ii) channels (e.g., 20 MHZ sub-channels) which are preferred (e.g., the identified preferred channels) by the first wireless device for IDC reasons; iii) resource units (RUs) to be avoided for use by the first wireless device for IDC reasons (e.g., the identified RUs to be avoided), iv) channels (e.g., 20 MHZ sub-channels) to be avoided for use by the first wireless device for IDC reasons (e.g., the identified channels to be avoided for IDC reasons).

Method Embodiment 3. The method of Method Embodiment 2, further comprising: establishing (1604) prior to detecting an actual or potential in-device coexistence problem a connection with a cellular base station which uses one or more frequency bands which overlap or are adjacent at least one frequency bands (e.g., channels) used by said WiFi transceiver to communicate signal to said access point.

Method Embodiment 3A. The method of Method Embodiment 3, wherein said WiFi transceiver is an 802.11ax and/or 802.11be transceiver.

Method Embodiment 3AA. The method of Method Embodiment 3A, wherein said cellular transceiver is 3GPP NR-U/LAA transceiver unit.

Method Embodiment 3AAA. The method of Method Embodiment 1AA, wherein said WiFi transceiver and said cellular transceiver both operate in unlicensed spectrum of a 5 GHZ band and/or 6 GHz band.

Method Embodiment 4. The method of Method Embodiment 3, wherein detecting (1608) an actual or potential in-device coexistence (IDC) problem in said first wireless device includes detecting (1610) use or expected use (e.g., as indicated by transmissions or a resource grant) of resource units or channels by the cellular transceiver which may be used for uplink transmissions by the WiFi transceiver.

Method Embodiment 5. The method of Method Embodiment 2, further comprising: receiving (1628), at the WiFi transceiver, a trigger frame from an access point (e.g., a WiFi access point) indicating IDC information is being requested; and responding (1642) to the trigger frame by communicating (1643) IDC information to the access point.

Method Embodiment 5A. The method of Method Embodiment 5, wherein said received trigger frame is of the type In-Device Coexistence Report Poll (IDCRP).

Method Embodiment 5A1. The method of Method Embodiment 5, wherein said received trigger frame is of type BQRP (Bandwidth Query Report Poll) or BSRP (Buffer Status Report Poll).

Method Embodiment 5B. The method of Method Embodiment 5A wherein the received trigger frame includes a control ID value in the range of 8 to 15 indicating IDC information is being requested. [See trigger type subfield encoding table FIG. 3 which shows existing trigger type variants and reserved control ID values are in the range of 8-15 which means the control value to indicate something new must be in this range].

Method Embodiment 5C. The method of Method Embodiment 5, wherein the communicated IDC information includes a list of one or more suggested unlicensed channels (e.g., 20 MHz subchannels) to be used by the AP for scheduling of first wireless device UL MU transmission.

Method Embodiment 5D. The method of Method Embodiment 5C, wherein the communicated IDC information is communicated in a control subfield identified by (e.g., including) a control ID value indicating that a specified channel associated with the control ID value is a recommended sub-channel.

Method Embodiment 5E. The method of Method Embodiment 5, wherein the communicated IDC information includes a list of one or more suggested RUs to be used by the AP for scheduling of first wireless device UL MU transmission.

Method Embodiment 5F. The method of Method Embodiment 5E, wherein the communicated IDC information is communicated in a control subfield identified by (e.g., including) a control ID value indicating that a specified RU associated with the control ID value is a recommend RU.

Method Embodiment 5G. The method of Method Embodiment 5, wherein the communicated IDC information includes a list of one or more suggested RUs not to be used by the AP for scheduling of first wireless device UL MU transmission or DL MU transmission.

Method Embodiment 5H. The method of Method Embodiment 5G, wherein the communicated IDC information is communicated in a control subfield identified by (e.g., including) a control ID value indicating that a specified RU associated with the control ID value is not to be used by the AP when scheduling the first wireless device for uplink transmissions.

Method Embodiment 6. The method of Method Embodiment 2, wherein the communicated IDC information is communicated in a bandwidth query report (BQR).

Method Embodiment 6A. The method of Method Embodiment 6, wherein the BQR includes a bitmap indicating the subchannels available at the first wireless device transmitting the BQR.

Method Embodiment 6B. The method of Method Embodiment 6, wherein each bit in the bitmap corresponds to a subchannel (e.g. 20 MHz subchannel) within an operating channel; and wherein the value of each bit in the bitmap indicates whether a subchannel is: i) idle and the subchannel does not cause an IDC issue or ii) busy or unavailable or the device has IDC issues to use this sub-channel (e.g., value of 1 indicates sub-channel is available to be used for WiFi UL MU or WiFi DL MU; value of 0 indicates sub-channel is not to be used for WiFi UL MU due to being busy, unavailable or IDC issue.)

Method Embodiment 7. The method of Method Embodiment 2, wherein the communicated IDC information includes information indicating recommended unlicensed spectrum to be used as an alternative to unlicensed spectrum being used by the first wireless device to communicate with the AP (e.g., the wireless device suggests use of an alternative set of 20 MHZ channels and/or different frequency band to be used, e.g., 2.4 GHZ, 5 GHZ or 6 GHZ). Suggestions of preferred 2.4/5/6 GHz band are applicable for 11 be multi-link STA/Aps. Such suggestion may and sometimes do occur when a STA finds no RU or no suitable 20 MHz channel within the original band that the AP and STA are expected to use to exchange DL MU and UL MU frames.

First Numbered List of Exemplary Apparatus Embodiments

Apparatus Embodiment 1. A first wireless device (1508 or 1900) including a cellular transceiver (1516 or 1921) and a WiFi transceiver (1518 or 1923), the first wireless device (1508 or 1900) comprising: a processor (1902) configured to operate the first wireless device to: detect (1608) an actual or potential in-device coexistence (IDC) problem in said first wireless device; perform (1614) one or more of: i) identifying resource units (RUs) which are preferred for IDC reasons; ii) identifying channels (e.g., 20 MHZ sub-channels) which are preferred for IDC reasons; iii) identifying resource units (RUs) to be avoided for IDC reasons, iv) identifying channels (e.g., 20 MHZ sub-channels) to be avoided for IDC reasons; and communicate (1643) IDC information to an access point (1504 or 1800).

Apparatus Embodiment 1A. The first wireless device of Apparatus Embodiment 1, wherein the identified resource units are for subsequent uplink or downlink multiuser communications.

Apparatus Embodiment 1B. The first wireless device of Apparatus Embodiment 1, wherein the identified channels are channels to be used for subsequent uplink or downlink multiuser communications.

Apparatus Embodiment 1C. The first wireless device of Apparatus Embodiment 1, wherein the identified resource units to be avoided in subsequent uplink or downlink multiuser communications.

Apparatus Embodiment 1D. The first wireless device of Apparatus Embodiment 1, wherein the identified channels to be avoided are in subsequent uplink or downlink communications.

Apparatus Embodiment 2. The first wireless device (1508 or 1900) of Apparatus Embodiment 1, wherein wherein the communicated IDC information includes one, more than one, or all of: i) resource units (RUs) which are preferred by the first wireless device for IDC reasons (e.g., the identified preferred RUs); ii) channels (e.g., 20 MHZ sub-channels) which are preferred (e.g., the identified preferred channels) by the first wireless device for IDC reasons; iii) resource units (RUs) to be avoided for use by the first wireless device for IDC reasons (e.g., the identified RUs to be avoided), iv) channels (e.g., 20 MHZ sub-channels) to be avoided for use by the first wireless device for IDC reasons (e.g., the identified channels to be avoided for IDC reasons).

Apparatus Embodiment 3. The first wireless device (1508 or 1900) of Apparatus Embodiment 2, wherein said processor (1902) is further configured to operate the first wireless device to: establish (1604), prior to detecting an actual or potential in-device coexistence problem, a connection with a cellular base station (1502) which uses one or more frequency bands which overlap or are adjacent at least one frequency bands (e.g., channels) used by said WiFi transceiver to communicate signal to said access point.

Apparatus Embodiment 3A. The first wireless device (1508 or 1900) of Apparatus Embodiment 3, wherein said WiFi transceiver (1518 or 1923) is an 802.11ax and/or 802.11be transceiver.

Apparatus Embodiment 3AA. The first wireless device (1508 or 1900) of Apparatus Embodiment 3A, wherein said cellular transceiver (1516 or 1921) is 3GPP NR-U/LAA transceiver unit.

Apparatus Embodiment 3AAA. The first wireless device (1508 or 1900) of Apparatus Embodiment 1AA, wherein said WiFi transceiver (1518 or 1923) and said cellular transceiver (1516 or 1921) both operate in unlicensed spectrum of a 5 GHZ band and/or 6 GHz band.

Apparatus Embodiment 4. The first wireless device (1508 or 1900) of Apparatus Embodiment 3, wherein said processor (1902) is configured to: operate the first wireless device to detect (1610) use or expected use (e.g., as indicated by transmissions or a resource grant) of resource units or channels by the cellular transceiver which may be used for uplink transmissions by the WiFi transceiver, as part of being configured to operate the first wireless device to detect (1608) an actual or potential in-device coexistence (IDC) problem in said first wireless device.

Apparatus Embodiment 5. The first wireless device (1508 or 1900) of Apparatus Embodiment 2, wherein said processor (1902) is further configured to operate the first wireless device to: receive (1628), at the WiFi transceiver, a trigger frame from an access point (e.g., a WiFi access point) indicating IDC information is being requested; and respond (1642) to the trigger frame by communicating (1643) IDC information to the access point.

Apparatus Embodiment 5A. The first wireless device (1508 or 1900) of Apparatus Embodiment 5, wherein said received trigger frame is of the type In-Device Coexistence Report Poll (IDCRP).

Apparatus Embodiment 5A1. The first wireless device (1508 or 1900) of Apparatus Embodiment 5, wherein said received trigger frame is of type BQRP (Bandwidth Query Report Poll) or BSRP (Buffer Status Report Poll).

Apparatus Embodiment 5B. The first wireless device (1508 or 1900) of Apparatus Embodiment 5A wherein the received trigger frame includes a control ID value in the range of 8 to 15 indicating IDC information is being requested. [See trigger type subfield encoding table FIG. 3 which shows existing trigger type variants and reserved control ID values are in the range of 8-15 which means the control value to indicate something new must be in this range].

Apparatus Embodiment 5C. The first wireless device (1508 or 1900) of Apparatus Embodiment 5, wherein the communicated IDC information includes a list of one or more suggested unlicensed channels (e.g., 20 MHz subchannels) to be used by the AP for scheduling of first wireless device UL MU transmission.

Apparatus Embodiment 5D. The first wireless device (1508 or 1900) of Apparatus Embodiment 5C, wherein the communicated IDC information is communicated in a control subfield identified by (e.g., including) a control ID value indicating that a specified channel associated with the control ID value is a recommended sub-channel.

Apparatus Embodiment 5E. The first wireless device (1508 or 1900) of Apparatus Embodiment 5, wherein the communicated IDC information includes a list of one or more suggested RUs to be used by the AP for scheduling of first wireless device UL MU transmission.

Apparatus Embodiment 5F. The first wireless device (1508 or 1900) of Apparatus Embodiment 5E, wherein the communicated IDC information is communicated in a control subfield identified by (e.g., including) a control ID value indicating that a specified RU associated with the control ID value is a recommend RU.

Apparatus Embodiment 5G. The first wireless device (1508 or 1900) of Apparatus Embodiment 5, wherein the communicated IDC information includes a list of one or more suggested RUs not to be used by the AP for scheduling of first wireless device UL MU transmission.

Apparatus Embodiment 5H. The first wireless device (1508 or 1900) of Apparatus Embodiment 5G, wherein the communicated IDC information is communicated in a control subfield identified by (e.g., including) a control ID value indicating that a specified RU associated with the control ID value is not to be used by the AP when scheduling the first wireless device for uplink transmissions.

Apparatus Embodiment 6. The first wireless device (1508 or 1900) of Apparatus Embodiment 2, wherein the communicated IDC information is communicated in a bandwidth query report (BQR).

Apparatus Embodiment 6A. The first wireless device (1508 or 1900) of Apparatus Embodiment 6, wherein the BQR includes a bitmap indicating the subchannels available at the first wireless device transmitting the BQR.

Apparatus Embodiment 6B. The first wireless device (1508 or 1900) of Apparatus Embodiment 6, wherein each bit in the bitmap corresponds to a subchannel (e.g. 20 MHz subchannel) within an operating channel; and wherein the value of each bit in the bitmap indicates whether a subchannel is: i) idle and the subchannel does not cause an IDC issue or ii) busy or unavailable or the device has IDC issues to use this subchannel (e.g., value of 1 indicates sub-channel is available to be used for WiFi UL MU; value of 0 indicates sub-channel is not to be used for WiFi UL MU due to being busy, unavailable or IDC issue.)

Apparatus Embodiment 7. The first wireless device (1508 or 1900) of Apparatus Embodiment 2, wherein the communicated IDC information includes information indicating recommended unlicensed spectrum to be used as an alternative to unlicensed spectrum being used by the first wireless device to communicate with the AP (e.g., the wireless device suggests use of an alternative set of 20 MHZ channels and/or different frequency band to be used, e.g., 2.4 GHZ, 5 GHZ or 6 GHZ).

Second Numbered List of Exemplary Method Embodiments

Method Embodiment 1. A method of operating an access point, the method comprising: transmitting (1706) a trigger frame to a first wireless device (e.g., first STA) to trigger transmission of in-device coexistence (IDC) information to the access point; receiving (1708) from the first wireless device, first wireless device IDC information identifying (e.g., indicating to the access point) one or more of: i) resource units (RUs) which are preferred by the first wireless device for IDC reasons; ii) channels (e.g., 20 MHz sub-channels) which are preferred by the first wireless device for IDC reasons; iii) resource units (RUs) to be avoided by the first wireless device for IDC reasons, iv) channels (e.g., 20 MHz sub-channels) to be avoided by the first wireless device for IDC reasons; and allocating (1724) uplink channel resources to one or more wireless devices based on received IDC information, said one or more wireless devices including said first wireless device, said received IDC information including said first wireless device in-device coexistence (IDC) information.

Method Embodiment 2. The method of Method Embodiment 1, wherein transmitting (1706) the trigger frame to the first wireless device includes transmitting an IDC report poll (IDCRP) trigger frame.

Method Embodiment 2A. The method of Method Embodiment 2, wherein the IDC report poll trigger frame includes a trigger type subfield value in the range of 8 to 15, indicating that the trigger frame is an IDCRP trigger frame.

Method Embodiment 2AB. The method of Method Embodiment 1, further comprising: transmitting (1718) an additional trigger frame to an additional wireless device (e.g., a fourth wireless device) to trigger transmission of in-device coexistence (IDC) information to the access point; determining (1720) that a response to the additional trigger frame was not received (e.g., in a predetermined period of time); determining (1723) that the additional wireless device does not have any in-device coexistence conflicts based on the fact that a response to the additional trigger frame was not received; and wherein allocating (1724) uplink channel resources to one or more wireless devices based on received IDC information includes allocating resources to the additional wireless device without regard to possible IDC conflicts in the additional device.

Method Embodiment 3. The method of Method Embodiment 1, wherein receiving (1708) the first wireless device IDC information includes: receiving information including at least a first control ID value and a corresponding first control information subfield communicating first wireless device IDC information (see, e.g., FIG. 10, exemplary control ID values 7, 8, 9, 10, 11 and corresponding control information subfield content), said first control ID value indicating the type of IDC information communicated in a corresponding first control information subfield.

Method Embodiment 3AB The method of Method Embodiment 1, wherein receiving (1708) the first wireless device IDC information includes: receiving information suggesting use of a different band (e.g., a 2.4, 5 or 6 GHz band).

Method Embodiment 3AA. The method of Method Embodiment 3, wherein said first wireless device IDC information further includes a duration information subfield indicating a duration (e.g., amount of time) for the first wireless device IDC information is to be used (e.g. how long it is remains valid and can be used by the AP in making uplink resource allocations to the second wireless device—this value is sometimes based on, e.g., coincides with, or matches the duration of a resource grant to the first wireless device that was made by a cellular base station).

Method Embodiment 3A. The method of Method Embodiment 3, wherein the first control ID value is a value (e.g., 7) indicating that the corresponding information subfield includes one or more RUs to be avoided and wherein the corresponding first control information subfield includes an identifier of an RU to be avoided or a list of identifiers of RUs to be avoided.

Method Embodiment 3B. The method of Method Embodiment 3, wherein the first control ID value is a value (e.g., 8) indicating that the corresponding information subfield includes one or more RUs which are preferred by the first wireless terminal for IDC reasons and wherein the corresponding first control information subfield includes an identifier of an RU which is preferred by the first wireless device or a list of identifiers of RUs which are preferred by the first wireless device.

Method Embodiment 3C. The method of Method Embodiment 3, wherein the first control ID value is a value (e.g., 9) indicating that the corresponding information subfield includes a set of sub-channels (e.g., a set of sub-channels potentially and in some cases including sub-channels which are not adjacent in frequency) which is a recommended set of subchannels and wherein the corresponding first control information subfield includes information identifying sub-channels which are preferred by the first wireless device for IDC reasons.

Method Embodiment 3D. The method of Method Embodiment 3, wherein the first control ID value is a value (e.g., 9) indicating that the corresponding first information subfield includes a set of sub-channels (e.g., a set of sub-channels potentially and in some cases including sub-channels which are not adjacent in frequency) which are being identified for IDC reasons.

Method Embodiment 3E. The method of Method Embodiment 3D, wherein sub-channels included in said first corresponding sub-channel includes information identifying one or more sub-channels which are recommended for IDC reasons by the first wireless device or which are not recommended by the first wireless device.

Method Embodiment 3F. The method of Method Embodiment 3E, wherein the communicated IDC information includes an additional bit for each subchannel identified in the first information subfield, each additional bit indicating whether the identified sub-channel to which the additional bit corresponds is a recommended sub-channel or a sub-channel which is not recommended.

Method Embodiment 3G. The method of Method Embodiment 3, wherein receiving (1708) the first wireless device IDC information includes: receiving information including multiple control ID values and corresponding control information subfields communicating first wireless device IDC information, said first control ID value being one of said multiple control ID values, said multiple ID values further including a second control ID value indicating i) that the corresponding information subfield includes one or more RUs which are preferred by the first wireless terminal for IDC reasons or ii) indicating that the corresponding first information subfield includes a set of sub-channels (e.g., a set of sub-channels potentially and in some cases including sub-channels which are not adjacent in frequency) which are being identified for IDC reasons (e.g., the received IDC information from the first wireless device may include some, all or any combination of the different types of IDC information listed in FIG. 10 and thus may an sometimes does include one, more or all of the IDC relates types of control values represented by control ID values 7, 8, 9 10, and 11 and the information corresponding to such values, e.g., control information subfield content).

Method Embodiment 4. The method of Method Embodiment 3, further comprising: receiving (1712) from a second wireless device, second wireless device IDC information identifying (e.g., indicating to the base station) one or more of: i) resource units (RUs) which are preferred by the second wireless device for IDC reasons; ii) channels (e.g., 20 MHz sub-channels) which are preferred by the second wireless device for IDC reasons; iii) resource units (RUs) to be avoided by the second wireless device for IDC reasons, iv) channels (e.g., 20 MHz sub-channels) to be avoided by the second wireless device for IDC reasons, said second wireless device information being different from said first wireless device information (as with the first wireless device information the second wireless device information may include one or more fields of IDC information communicating different types of IDC information based on the second wirelesses devices current operating conditions and expectations regarding cellular transmitter or receiver use at the second wireless device).

Method Embodiment 4A. The method of Method Embodiment 4, further comprising: receiving (1716) from a third wireless device, third wireless device IDC information identifying (e.g., indicating to the base station) one or more of: i) resource units (RUs) which are preferred by the third wireless device for IDC reasons; ii) channels (e.g., 20 MHZ sub-channels) which are preferred by the third wireless device for IDC reasons; iii) resource units (RUs) to be avoided by the third wireless device for IDC reasons, iv) channels (e.g., 20 MHZ sub-channels) to be avoided by the third wireless device for IDC reasons, said third wireless device information being different from said first and second wireless device information (as with the first wireless device information and second wireless device information, the third wireless device information may include one or more fields of IDC information communicating different types of IDC information based on the third wirelesses devices current operating conditions and expectations regarding cellular transmitter or receiver use at the third wireless device).

Method Embodiment 4AA. The method of Method Embodiment 4, wherein said second wireless device IDC information further includes a duration information subfield (identified, e.g., by control ID values 11) indicating a duration (e.g., amount of time) for the second wireless device IDC information is to be used (e.g. how long it is remains valid and can be used by the AP in making uplink resource allocations to the second wireless device—this value is sometimes based on, e.g., coincides or matches, the duration of a resource grant to the second wireless device that was made by a cellular base station).

Method Embodiment 5. The method of Method Embodiment 4, wherein allocating (1724) uplink channel resources to one or more wireless devices based on received IDC information includes: allocating a first set of RUs to the first wireless device to be used during a first time period, said first set of RUs including at least some RUs indicated by the first wireless device IDC information to be RUs preferred by the first wireless device.

Method Embodiment 5A. The method of Method Embodiment 5, wherein allocating (1724) uplink channel resources to one or more wireless devices based on received IDC information includes: intentionally omitting from the first set of RUs allocated to the first wireless device to be used during the first time period RUs which are indicated by the first wireless device IDC information to be RUs to be avoided by the first wireless device.

Method Embodiment 6. The method of Method Embodiment 5, wherein allocating (1724) uplink channel resources to one or more wireless devices based on received IDC information includes: allocating a second set of RUs to the second wireless device to be used during the first time period, said second set of RUs including at least some RUs indicated by the second wireless device IDC information to be RUs preferred by the second wireless device.

Method Embodiment 5A. The method of Method Embodiment 5, wherein allocating (1724) uplink channel resources to one or more wireless devices based on received IDC information includes: omitting from the first second set of RUs allocated to the second wireless device to be used during the first time period RUs which are indicated by the second wireless device IDC information to be RUs to be avoided by the second wireless device.

Method Embodiment 7. The method of Method Embodiment 5, wherein allocating (1724) uplink channel resources to one or more wireless devices based on received IDC information includes allocating a third set of RUs to the third wireless device to be used during the first time period, said third set of RUs including at least some RUs indicated by the third wireless device IDC information to be preferred RUs, said third set of RU's including different RUs than those included in the first and second sets of RUs.

Method Embodiment 7A. The method of Method Embodiment 6A, wherein allocating (1724) uplink channel resources to one or more wireless devices based on received IDC information includes: omitting, from the third set of RUs allocated to the third wireless device to be used during the first time period, RUs which are indicated by the third wireless device IDC information to be RUs to be avoided by the third wireless device.

Method Embodiment 8. The method of Method Embodiment 7, further comprising: receiving (1726) uplink signals from the first wireless device communicated during the first time period on the first set of RUs; receiving (1728) uplink signals from the second wireless device communicated during said first time period using the second set of RUs; and receiving (1730) uplink signals from the third wireless device communicated during said first time period using the third set of RUs.

Method Embodiment 8A. The method of Method Embodiment 7, further comprising: recovering (1734) information from the uplink signals received from the first, second and third wireless devices during the first time period.

Method Embodiment 9. The method of Method Embodiment 4, wherein allocating (1724) uplink channel resources to one or more wireless devices based on received IDC information includes: allocating a first set of RUs to the first wireless device to be used during a first time period, said first set of RUs intentionally omitting RUs which are indicated by the first wireless device IDC information to be RUs to be avoided by the first wireless device.

Method Embodiment 9B. The method of Method Embodiment 9, wherein allocating (1724) uplink channel resources to one or more wireless devices based on received IDC information includes: allocating a second set of RUs to the second wireless device to be used during the first time period, said second set of RUs intentionally omitting RUs which are indicated by the second wireless device IDC information to be RUs to be avoided by the first wireless device.

Method Embodiment 9C. The method of Method Embodiment 9, wherein allocating (1724) uplink channel resources to one or more wireless devices based on received IDC information includes: allocating a third set of RUs to the third wireless device to be used during the first time period, said third set of RUs intentionally omitting RUs which are indicated by the third wireless device IDC information to be RUs to be avoided by the first wireless device.

Method Embodiment 10. The method of Method Embodiment 3D, wherein allocating (1724) uplink channel resources to one or more wireless devices based on received IDC information includes: allocating a first set of sub-channels to the first wireless device to be used during a first time period, said first set of sub-channels including at least some sub-channels indicated by the first wireless device IDC information to be sub-channels preferred by the first wireless device.

Method Embodiment 10A. The method of Method Embodiment 5, wherein allocating (1724) uplink channel resources to one or more wireless devices based on received IDC information includes: intentionally omitting from the first set of sub-channels allocated to the first wireless device to be used during the first time period sub-channels which are indicated by the first wireless device IDC information to be sub-channels to be avoided by the first wireless device.

Method Embodiment 11. The method of Method Embodiment 10, wherein allocating (1724) uplink channel resources to one or more wireless devices based on received IDC information includes: allocating a second set of sub-channels to the second wireless device to be used during the first time period, said second set of sub-channels including at least some sub-channels indicated by the second wireless device IDC information to be RUs preferred by the second wireless device.

Method Embodiment 11A. The method of Method Embodiment 11, wherein allocating (1724) uplink channel resources to one or more wireless devices based on received IDC information includes: omitting from the second set of sub-channels allocated to the second wireless device to be used during the first time period sub-channels which are indicated by the second wireless device IDC information to be sub-channels to be avoided by the second wireless device.

Method Embodiment 12. The method of Method Embodiment 11, wherein allocating (1724) uplink channel resources to one or more wireless devices based on received IDC information includes allocating a third set of sub-channels to the third wireless device to be used during the first time period, said third set of sub-channels including at least some sub-channels indicated by the third wireless device IDC information to be preferred sub-channels, said third set of sub-channels including different sub-channels than those included in the first and second sets of sub-channels.

Method Embodiment 13. The method of Method Embodiment 12, wherein allocating (1724) uplink channel resources to one or more wireless devices based on received IDC information includes: omitting, from the third set of sub-channels allocated to the third wireless device to be used during the first time period, sub-channels which are indicated by the third wireless device IDC information to be sub-channels to be avoided by the third wireless device.

Second Numbered List of Exemplary Apparatus Embodiments

Apparatus Embodiment 1. An access point (1504 or 1800), the access point (1504 or 1800) comprising: a processor (1802) configured to: operate the access point to transmit (1706) a trigger frame to a first wireless device (e.g., first STA) (1508) to trigger transmission of in-device coexistence (IDC) information to the access point; operate the access point to receive (1708) from the first wireless device (1508), first wireless device IDC information identifying (e.g., indicating to the access point) one or more of: i) resource units (RUs) which are preferred by the first wireless device for IDC reasons; ii) channels (e.g., 20 MHz sub-channels) which are preferred by the first wireless device for IDC reasons; iii) resource units (RUs) to be avoided by the first wireless device for IDC reasons, iv) channels (e.g., 20 MHz sub-channels) to be avoided by the first wireless device for IDC reasons; and allocate (1724) uplink channel resources to one or more wireless devices (1508, 1509, 1511, 1510) based on received IDC information, said one or more wireless devices including said first wireless device (1508), said received IDC information including said first wireless device in-device coexistence (IDC) information.

Apparatus Embodiment 2. The access point (1504 or 1800) of Apparatus Embodiment 1, wherein said processor (1802) is configured to operate the access point to transmit an IDC report poll (IDCRP) trigger frame, as part of being configured to operate the access point to transmit (1706) the trigger frame to the first wireless device.

Apparatus Embodiment 2A. The access point of Apparatus Embodiment 2, wherein the IDC report poll trigger frame includes a trigger type subfield value in the range of 8 to 15, indicating that the trigger frame is an IDCRP trigger frame.

Apparatus Embodiment 2AB. The access point of Apparatus Embodiment 1, wherein said processor (1802) is further configured to: operate the access point to transmit (1718) an additional trigger frame to an additional wireless device (e.g., a fourth wireless device) (1510) to trigger transmission of in-device coexistence (IDC) information to the access point; determine (1720) that a response to the additional trigger frame was not received (e.g., in a predetermined period of time); determine (1723) that the additional wireless device does not have any in-device coexistence conflicts based on the fact that a response to the additional trigger frame was not received; and wherein said processor 1802 is configured to allocate resources to the additional wireless device without regard to possible IDC conflicts in the additional device, as part of being configured to allocate (1724) uplink channel resources to one or more wireless devices based on received IDC information.

Apparatus Embodiment 3. The access point (1504 or 1800) of Apparatus Embodiment 1, wherein said processor (1802) is configured to: operate the access point to receive information including at least a first control ID value and a corresponding first control information subfield communicating first wireless device IDC information (see, e.g., FIG. 10, exemplary control ID values 7, 8, 9, 10, 11 and corresponding control information subfield content), said first control ID value indicating the type of IDC information communicated in a corresponding first control information subfield, as part of being configured to operate the access point to receive (1708) the first wireless device IDC information.

Apparatus Embodiment 3AA. The access point (1504 or 1800) of Apparatus Embodiment 3, wherein said first wireless device IDC information further includes a duration information subfield indicating a duration (e.g., amount of time) for the first wireless device IDC information is to be used (e.g. how long it is remains valid and can be used by the AP in making uplink resource allocations to the second wireless device—this value is sometimes based on, e.g., coincides with, or matches the duration of a resource grant to the first wireless device that was made by a cellular base station).

Apparatus Embodiment 3A. The access point (1504 or 1800) of Apparatus Embodiment 3, wherein the first control ID value is a value (e.g., 7) indicating that the corresponding information subfield includes one or more RUs to be avoided and wherein the corresponding first control information subfield includes an identifier of an RU to be avoided or a list of identifiers of RUs to be avoided.

Apparatus Embodiment 3B. The access point (1504 or 1800) of Apparatus Embodiment 3, wherein the first control ID value is a value (e.g., 8) indicating that the corresponding information subfield includes one or more RUs which are preferred by the first wireless terminal for IDC reasons and wherein the corresponding first control information subfield includes an identifier of an RU which is preferred by the first wireless device or a list of identifiers of RUs which are preferred by the first wireless device.

Apparatus Embodiment 3C. The access point (1504 or 1800) of Apparatus Embodiment 3, wherein the first control ID value is a value (e.g., 9) indicating that the corresponding information subfield includes a set of sub-channels (e.g., a set of sub-channels potentially and in some cases including sub-channels which are not adjacent in frequency) which is a recommended set of subchannels and wherein the corresponding first control information subfield includes information identifying sub-channels which are preferred by the first wireless device for IDC reasons.

Apparatus Embodiment 3D. The access point (1504 or 1800) of Apparatus Embodiment 3, wherein the first control ID value is a value (e.g., 9) indicating that the corresponding first information subfield includes a set of sub-channels (e.g., a set of sub-channels potentially and in some cases including sub-channels which are not adjacent in frequency) which are being identified for IDC reasons.

Apparatus Embodiment 3E. The access point (1504 or 1800) of Apparatus Embodiment 3D, wherein sub-channels included in said first corresponding sub-channel includes information identifying one or more sub-channels which are recommended for IDC reasons by the first wireless device or which are not recommended by the first wireless device.

Apparatus Embodiment 3F. The access point (1504 or 1800) of Apparatus Embodiment 3E, wherein the communicated IDC information includes an additional bit for each subchannel identified in the first information subfield, each additional bit indicating whether the identified sub-channel to which the additional bit corresponds is a recommended sub-channel or a sub-channel which is not recommended.

Apparatus Embodiment 3G. The access point (1504 or 1800) of Apparatus Embodiment 3, wherein said processor (1802) is configured to operate the access point to receive information including multiple control ID values and corresponding control information subfields communicating first wireless device IDC information, said first control ID value being one of said multiple control ID values, said multiple ID values further including a second control ID value indicating i) that the corresponding information subfield includes one or more RUs which are preferred by the first wireless terminal for IDC reasons or ii) indicating that the corresponding first information subfield includes a set of sub-channels (e.g., a set of sub-channels potentially and in some cases including sub-channels which are not adjacent in frequency) which are being identified for IDC reasons (e.g., the received IDC information from the first wireless device may include some, all or any combination of the different types of IDC information listed in FIG. 10 and thus may an sometimes does include one, more or all of the IDC relates types of control values represented by control ID values 7, 8, 9 10, and 11 and the information corresponding to such values, e.g., control information subfield content), as part of being configured to operate the access point to receive (1708) the first wireless device IDC information.

Apparatus Embodiment 4. The access point (11504 or 1800) of Apparatus Embodiment 3, wherein said processor (1802) is further configured to: operate the access point to receive (1712) from a second wireless device (1509), second wireless device IDC information identifying (e.g., indicating to the base station) one or more of: i) resource units (RUs) which are preferred by the second wireless device for IDC reasons; ii) channels (e.g., 20 MHz sub-channels) which are preferred by the second wireless device for IDC reasons; iii) resource units (RUs) to be avoided by the second wireless device for IDC reasons, iv) channels (e.g., 20 MHz sub-channels) to be avoided by the second wireless device for IDC reasons, said second wireless device information being different from said first wireless device information (as with the first wireless device information the second wireless device information may include one or more fields of IDC information communicating different types of IDC information based on the second wirelesses devices current operating conditions and expectations regarding cellular transmitter or receiver use at the second wireless device).

Apparatus Embodiment 4A. The access point (1504 or 1800) of Apparatus Embodiment 4, wherein said processor (1802) is further configured to operate the access point to: receive (1716) from a third wireless device (1511), third wireless device IDC information identifying (e.g., indicating to the base station) one or more of: i) resource units (RUs) which are preferred by the third wireless device for IDC reasons; ii) channels (e.g., 20 MHZ sub-channels) which are preferred by the third wireless device for IDC reasons; iii) resource units (RUs) to be avoided by the third wireless device for IDC reasons, iv) channels (e.g., 20 MHZ sub-channels) to be avoided by the third wireless device for IDC reasons, said third wireless device information being different from said first and second wireless device information (as with the first wireless device information and second wireless device information, the third wireless device information may include one or more fields of IDC information communicating different types of IDC information based on the third wirelesses devices current operating conditions and expectations regarding cellular transmitter or receiver use at the third wireless device).

Apparatus Embodiment 4AA. The access point (1504 or 1800) of Apparatus Embodiment 4, wherein said second wireless device IDC information further includes a duration information subfield (identified, e.g., by control ID values 11) indicating a duration (e.g., amount of time) for the second wireless device IDC information is to be used (e.g. how long it is remains valid and can be used by the AP in making uplink resource allocations to the second wireless device—this value is sometimes based on, e.g., coincides or matches, the duration of a resource grant to the second wireless device that was made by a cellular base station).

Apparatus Embodiment 5. The access point (1504 or 1800) of Apparatus Embodiment 4, wherein said processor is configured to: allocate a first set of RUs to the first wireless device (1508) to be used during a first time period, said first set of RUs including at least some RUs indicated by the first wireless device IDC information to be RUs preferred by the first wireless device, as part of being configured to allocate (1724) uplink channel resources to one or more wireless devices based on received IDC information.

Apparatus Embodiment 5A. The access point (1504 or 1800) of Apparatus Embodiment 5, wherein said processor (1802) is configured to: intentionally omit from the first set of RUs allocated to the first wireless device to be used during the first time period RUs which are indicated by the first wireless device IDC information to be RUs to be avoided by the first wireless device, as part of being configured to allocate (1724) uplink channel resources to one or more wireless devices based on received IDC information.

Apparatus Embodiment 6. The access point (1504 or 1800) of Apparatus Embodiment 5, wherein said processor is configured to: allocate a second set of RUs to the second wireless device (1509) to be used during the first time period, said second set of RUs including at least some RUs indicated by the second wireless device IDC information to be RUs preferred by the second wireless device, as part of being configured to allocate (1724) uplink channel resources to one or more wireless devices based on received IDC information.

Apparatus Embodiment 5A. The access point (1504 or 1800) of Apparatus Embodiment 5, wherein said processor (1802) is configured to: omit from the first second set of RUs allocated to the second wireless device (1509) to be used during the first time period RUs which are indicated by the second wireless device IDC information to be RUs to be avoided by the second wireless device, as part of being configured to allocate (1724) uplink channel resources to one or more wireless devices based on received IDC information.

Apparatus Embodiment 7. The access point (1504 or 1800) of Apparatus Embodiment 5, wherein said processor (1802) is configured to: allocate a third set of RUs to the third wireless device (1511) to be used during the first time period, said third set of RUs including at least some RUs indicated by the third wireless device IDC information to be preferred RUs, said third set of RU's including different RUs than those included in the first and second sets of RUs, as part of being configured to allocate (1724) uplink channel resources to one or more wireless devices based on received IDC information includes Apparatus Embodiment 7A. The access point (1504 or 1800) of Apparatus Embodiment 6A, wherein said processor (1802) is configured to: omit, from the third set of RUs allocated to the third wireless device (1511) to be used during the first time period, RUs which are indicated by the third wireless device IDC information to be RUs to be avoided by the third wireless device, as part of being configured to allocate (1724) uplink channel resources to one or more wireless devices based on received IDC information.

Apparatus Embodiment 8. The access point (1504 or 1800) of Apparatus Embodiment 7, wherein said processor (1802) is further configured to: operate the access point to receive (1726) uplink signals from the first wireless device (1508) communicated during the first time period on the first set of RUs; operate the access point to receive (1728) uplink signals from the second wireless device communicated during said first time period using the second set of RUs; and operate the access point to receive (1730) uplink signals from the third wireless device (1511) communicated during said first time period using the third set of RUs.

Apparatus Embodiment 8A. The access point (1504 or 1800) of Apparatus Embodiment 7, wherein said processor (1802) is further configured to: operate the access point to recover (1734) information from the uplink signals received from the first, second and third wireless devices (1508, 1509, 1511) during the first time period.

Apparatus Embodiment 9. The access point (1504 or 1800) of Apparatus Embodiment 4, wherein said processor (1802) is configured to: allocate a first set of RUs to the first wireless device (1508) to be used during a first time period, said first set of RUs intentionally omitting RUs which are indicated by the first wireless device IDC information to be RUs to be avoided by the first wireless device, as part of being configured to allocate (1724) uplink channel resources to one or more wireless devices based on received IDC information includes:

Apparatus Embodiment 9B. The access point (1504 or 1800) of Apparatus Embodiment 9, wherein said processor (1802) is configured to: allocate a second set of RUs to the second wireless device (1509) to be used during the first time period, said second set of RUs intentionally omitting RUs which are indicated by the second wireless device IDC information to be RUs to be avoided by the first wireless device, as part of being configured to allocate (1724) uplink channel resources to one or more wireless devices based on received IDC information.

Apparatus Embodiment 9C. The access point (1504 or 1800) of Apparatus Embodiment 9, wherein said processor (1802) is configured to: allocate a third set of RUs to the third wireless device (1511) to be used during the first time period, said third set of RUs intentionally omitting RUs which are indicated by the third wireless device IDC information to be RUs to be avoided by the first wireless device, as part of being configured to allocate (1724) uplink channel resources to one or more wireless devices based on received IDC information.

Apparatus Embodiment 10. The access point (1504 or 1800) of Apparatus Embodiment 3D, wherein said processor (1802) is configured to: allocate a first set of sub-channels to the first wireless device (1508) to be used during a first time period, said first set of sub-channels including at least some sub-channels indicated by the first wireless device IDC information to be sub-channels preferred by the first wireless device, as part of being configured to allocate (1724) uplink channel resources to one or more wireless devices based on received IDC information.

Apparatus Embodiment 10A. The access point (1504 or 1800) of Apparatus Embodiment 5, wherein said processor (1802) is configured to: intentionally omit from the first set of sub-channels allocated to the first wireless device (1508) to be used during the first time period sub-channels which are indicated by the first wireless device IDC information to be sub-channels to be avoided by the first wireless device, as part of being configured to allocate (1724) uplink channel resources to one or more wireless devices based on received IDC information.

Apparatus Embodiment 11. The access point (1504 or 1800) of Apparatus Embodiment 10, wherein said processor (1802) is configured to: allocate a second set of sub-channels to the second wireless device (1509) to be used during the first time period, said second set of sub-channels including at least some sub-channels indicated by the second wireless device IDC information to be RUs preferred by the second wireless device, as part of being configured to allocate (1724) uplink channel resources to one or more wireless devices based on received IDC information.

Apparatus Embodiment 11A. The access point (1504 or 1800) of Apparatus Embodiment 11, wherein said processor (1802) is configured to: omit from the second set of sub-channels allocated to the second wireless device (1509) to be used during the first time period sub-channels which are indicated by the second wireless device IDC information to be sub-channels to be avoided by the second wireless device, as part of being configured to allocate (1724) uplink channel resources to one or more wireless devices based on received IDC information.

Apparatus Embodiment 12. The access point (1504 or 1800) of Apparatus Embodiment 11, wherein said processor (1802) is configured to: allocate a third set of sub-channels to the third wireless device (1511) to be used during the first time period, said third set of sub-channels including at least some sub-channels indicated by the third wireless device IDC information to be preferred sub-channels, said third set of sub-channels including different sub-channels than those included in the first and second sets of sub-channels, as part of being configured to: allocate (1724) uplink channel resources to one or more wireless devices based on received IDC information.

Apparatus Embodiment 13. The access point (1504 or 1800) of Apparatus Embodiment 12, wherein said processor (1802) is configured to: omit, from the third set of sub-channels allocated to the third wireless device (1511) to be used during the first time period, sub-channels which are indicated by the third wireless device IDC information to be sub-channels to be avoided by the third wireless device, as part of being configured to allocate (1724) uplink channel resources to one or more wireless devices based on received IDC information.

Numbered List of Non-Transitory

Computer Readable Medium Embodiments

Non-transitory Computer Readable Medium Embodiment 1. A non-transitory computer readable medium (1912) including machine executable instructions which when executed by a processor (1902) of a wireless device (1900), e.g., a smart cellphone, including a cellular transceiver and a WiFi transceiver, control the wireless device (1900) to perform the steps of: detecting (1608) an actual or potential in-device coexistence (IDC) problem in said first wireless device; performing (1614) one or more of: i) identifying resource units (RUs) which are preferred for IDC reasons; ii) identifying channels (e.g., 20 MHZ sub-channels) which are preferred for IDC reasons; iii) identifying resource units (RUs) to be avoided for IDC reasons, iv) identifying channels (e.g., 20 MHZ sub-channels) to be avoided for IDC reasons; and communicating (1643) IDC information to an access point.

Non-transitory Computer Readable Medium Embodiment 2. A non-transitory computer readable medium (1810) including machine executable instructions which when executed by a processor (1802) of an access point (1800) control the access point (1800) to perform the steps of: transmitting (1706) a trigger frame to a first wireless device (e.g., first STA) to trigger transmission of in-device coexistence (IDC) information to the access point; receiving (1708) from the first wireless device, first wireless device IDC information identifying (e.g., indicating to the access point) one or more of: i) resource units (RUs) which are preferred by the first wireless device for IDC reasons; ii) channels (e.g., 20 MHz sub-channels) which are preferred by the first wireless device for IDC reasons; iii) resource units (RUs) to be avoided by the first wireless device for IDC reasons, iv) channels (e.g., 20 MHz sub-channels) to be avoided by the first wireless device for IDC reasons; and allocating (1724) uplink channel resources to one or more wireless devices based on received IDC information, said one or more wireless devices including said first wireless device, said received IDC information including said first wireless device in-device coexistence (IDC) information.

Various embodiments are directed to apparatus, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), a Spectrum Access System (SAS), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, SAS, an AFC system, cable networks, cloud networks, nodes, servers, cloud service servers, customer premises equipment devices, controllers, network monitoring nodes and/or servers and/or cable or network equipment devices. Various embodiments are directed to communications network which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices such a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, SAS, a AFC system, etc., said device including a processor configured to implement one, multiple or all of the steps of one or more methods of the invention.

In some embodiments, the processor or processors, e.g., CPUs, of one or more devices, e.g., communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME, a SAS, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as e.g., an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a communications nodes such as e.g., an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, security device, a AFC system, MNVO base station, e.g., a CBSD, an MNO cellular base station, e.g., an eNB or a gNB, a HSS server, a UE device, a SAS or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating an access point, the method comprising:
    transmitting a trigger frame to a first wireless device to trigger transmission of in-device coexistence (IDC) information to the access point;
    receiving from the first wireless device, first wireless device IDC information, said first wireless device IDC information including at least a first control ID value and a corresponding first control information subfield communicating first wireless device IDC information, said first control ID value indicating the type of IDC information communicated in the corresponding first control information subfield, information included in the received first wireless device IDC information identifying one or more of: i) resource units (RUs) which are preferred by the first wireless device for IDC reasons; ii) channels which are preferred by the first wireless device for IDC reasons; iii) RUs to be avoided by the first wireless device for IDC reasons, iv) channels to be avoided by the first wireless device for IDC reasons; and
    allocating uplink channel resources to one or more wireless devices based on received IDC information, said one or more wireless devices including said first wireless device, said received IDC information including said first wireless device IDC information.

2. The method of claim 1, wherein transmitting the trigger frame to the first wireless device includes transmitting an IDC report poll (IDCRP) trigger frame.

3. The method of claim 1, wherein the received first wireless device IDC information includes information indicating said resource RUs which are preferred by the first wireless device for IDC reasons.

4. The method of claim 1, further comprising:
    receiving from a second wireless device, second wireless device IDC information identifying one or more of: i) RUs which are preferred by the second wireless device for IDC reasons; ii) channels which are preferred by the second wireless device for IDC reasons; iii) RUs to be avoided by the second wireless device for IDC reasons, iv) channels to be avoided by the second wireless device for IDC reasons, said second wireless device IDC information being different from said first wireless device IDC information.

5. The method of claim 4, wherein allocating uplink channel resources to one or more wireless devices based on received IDC information includes:
    allocating a first set of RUs to the first wireless device to be used during a first time period, said first set of RUs including at least some RUs indicated by the first wireless device IDC information to be RUs preferred by the first wireless device.

6. The method of claim 5, wherein allocating uplink channel resources to one or more wireless devices based on received IDC information includes:
 allocating a second set of RUs to the second wireless device to be used during the first time period, said second set of RUs including at least some RUs indicated by the second wireless device IDC information to be RUs preferred by the second wireless device.

7. The method of claim 5, wherein allocating uplink channel resources to one or more wireless devices based on received IDC information includes allocating a third set of RUs to a third wireless device to be used during the first time period, said third set of RUs including at least some RUs indicated by third wireless device IDC information to be preferred RUs, said third set of RU's including different RUs than those included in the first and second sets of RUs.

8. The method of claim 7, further comprising:
 receiving uplink signals from the first wireless device communicated during the first time period on the first set of RUs;
 receiving uplink signals from the second wireless device communicated during said first time period using the second set of RUs; and
 receiving uplink signals from the third wireless device communicated during said first time period using the third set of RUs.

9. The method of claim 4, wherein allocating uplink channel resources to one or more wireless devices based on received IDC information includes: allocating a first set of RUs to the first wireless device to be used during a first time period, said first set of RUs intentionally omitting RUs which are indicated by the first wireless device IDC information to be RUs to be avoided by the first wireless device.

10. The method of claim 1, wherein allocating uplink channel resources to one or more wireless devices based on received IDC information includes:
 allocating a first set of sub-channels to the first wireless device to be used during a first time period, said first set of sub-channels including at least some sub-channels indicated by the first wireless device IDC information to be sub-channels preferred by the first wireless device.

11. The method of claim 10, wherein allocating uplink channel resources to one or more wireless devices based on received IDC information includes:
 allocating a second set of sub-channels to a second wireless device to be used during the first time period, said second set of sub-channels including at least some sub-channels indicated by second wireless device IDC information to be RUs preferred by the second wireless device.

12. The method of claim 11, wherein allocating uplink channel resources to one or more wireless devices based on received IDC information includes allocating a third set of sub-channels to a third wireless device to be used during the first time period, said third set of sub-channels including at least some sub-channels indicated by third wireless device IDC information to be preferred sub-channels, said third set of sub-channels including different sub-channels than those included in the first and second sets of sub-channels.

13. The method of claim 12, wherein allocating uplink channel resources to one or more wireless devices based on received IDC information includes:
 omitting, from the third set of sub-channels allocated to the third wireless device to be used during the first time period, sub-channels which are indicated by the third wireless device IDC information to be sub-channels to be avoided by the third wireless device.

14. An access point, the access point comprising:
 a processor configured to:
  operate the access point to transmit a trigger frame to a first wireless device to trigger transmission of in-device coexistence (IDC) information to the access point;
  operate the access point to receive from the first wireless device, first wireless device IDC information, said first wireless device IDC information including at least a first control ID value and a corresponding first control information subfield communicating first wireless device IDC information, said first control ID value indicating the type of IDC information communicated in the corresponding first control information subfield, information included in the received first wireless device IDC information identifying one or more of: i) resource units (RUs) which are preferred by the first wireless device for IDC reasons; ii) channels which are preferred by the first wireless device for IDC reasons; iii) RUs to be avoided by the first wireless device for IDC reasons, iv) channels to be avoided by the first wireless device for IDC reasons; and
  allocate uplink channel resources to one or more wireless devices based on received IDC information, said one or more wireless devices including said first wireless device, said received IDC information including said first wireless device IDC information.

15. The access point of claim 14, wherein said processor is configured to operate the access point to transmit an IDC report poll (IDCRP) trigger frame, as part of being configured to operate the access point to transmit the trigger frame to the first wireless device.

16. The access point of claim 14, wherein said first wireless device IDC information includes information indicating said RUs which are preferred by the first wireless device for IDC reasons.

17. The access point of claim 14, wherein said processor is further configured to:
 operate the access point to receive from a second wireless device, second wireless device IDC information identifying one or more of: i) RUs which are preferred by the second wireless device for IDC reasons; ii) channels which are preferred by the second wireless device for IDC reasons; iii) RUs to be avoided by the second wireless device for IDC reasons, iv) channels to be avoided by the second wireless device for IDC reasons, said second wireless device IDC information being different from said first wireless device IDC information.

18. The access point of claim 17, wherein said processor is configured to:
 allocate a first set of RUs to the first wireless device to be used during a first time period, said first set of RUs including at least some RUs indicated by the first wireless device IDC information to be RUs preferred by the first wireless device, as part of being configured to allocate uplink channel resources to one or more wireless devices based on received IDC information.

19. The access point of claim 18, wherein said processor is configured to:

allocate a second set of RUs to the second wireless device to be used during the first time period, said second set of RUs including at least some RUs indicated by the second wireless device IDC information to be RUs preferred by the second wireless device, as part of being configured to allocate uplink channel resources to one or more wireless devices based on received IDC information.

20. A non-transitory computer readable medium including machine executable instructions which when executed by a processor of an access point control the access point to perform the steps of:

transmitting a trigger frame to a first wireless device to trigger transmission of in-device coexistence (IDC) information to the access point;

receiving from the first wireless device, first wireless device IDC information, said first wireless device IDC information including at least a first control ID value and a corresponding first control information subfield communicating first wireless device IDC information, said first control ID value indicating the type of IDC information communicated in the corresponding first control information subfield, information included in the received first wireless device IDC information identifying one or more of: i) resource units (RUs) which are preferred by the first wireless device for IDC reasons; ii) channels which are preferred by the first wireless device for IDC reasons; iii) RUs to be avoided by the first wireless device for IDC reasons, iv) channels to be avoided by the first wireless device for IDC reasons; and allocating uplink channel resources to one or more wireless devices based on received IDC information, said one or more wireless devices including said first wireless device, said received IDC information including said first wireless device IDC information.

* * * * *